(12) United States Patent
Lamartino et al.

(10) Patent No.: US 7,255,554 B2
(45) Date of Patent: Aug. 14, 2007

(54) COOLING AIR SYSTEM FOR A PATTY-FORMING APPARATUS

(75) Inventors: Salvatore Lamartino, Orland Park, IL (US); Glenn Sandberg, New Lenox, IL (US)

(73) Assignee: Formax, Inc., Mokena, IL (US)

( * ) Notice: Subject to any disclaimer, the term of this patent is extended or adjusted under 35 U.S.C. 154(b) by 84 days.

(21) Appl. No.: 10/942,627

(22) Filed: Sep. 16, 2004

(65) Prior Publication Data

US 2005/0092187 A1   May 5, 2005

Related U.S. Application Data

(60) Provisional application No. 60/571,368, filed on May 14, 2004, provisional application No. 60/515,585, filed on Oct. 29, 2003, provisional application No. 60/503,354, filed on Sep. 16, 2003.

(51) Int. Cl.
*A22C 7/00* (2006.01)

(52) U.S. Cl. .................. 425/547; 425/190; 426/512

(58) Field of Classification Search ............. 425/547, 425/190; 426/512
See application file for complete search history.

(56) References Cited

U.S. PATENT DOCUMENTS

| | | | |
|---|---|---|---|
| 4,054,967 A | 10/1977 | Sandberg et al. | |
| 4,062,262 A | 12/1977 | Odell | |
| RE30,096 E | 9/1979 | Richards | |
| 4,182,003 A | 1/1980 | Lamartino et al. | |
| 4,527,970 A * | 7/1985 | Murley | 425/404 |
| 4,705,928 A * | 11/1987 | Nakanishi | 219/681 |
| 4,996,743 A | 3/1991 | Janssen | |
| 5,172,682 A | 12/1992 | Luebke et al. | |
| 5,666,868 A | 9/1997 | Diete et al. | |
| 6,370,796 B1 * | 4/2002 | Zucker | 34/428 |
| 6,428,303 B2 * | 8/2002 | Lindee et al. | 425/215 |

OTHER PUBLICATIONS

Sketch of admitted prior art air cooling system, no date.

* cited by examiner

*Primary Examiner*—Robert Davis
*Assistant Examiner*—Maria Veronica Ewald
(74) *Attorney, Agent, or Firm*—The Law Office of Randall T. Erickson, P.C.

(57) ABSTRACT

A cooling air system is provided for a patty-forming apparatus having a machine base that includes an enclosing wall and contains equipment within the machine base that generates heat, such as electric motors, electrical and control equipment. The machine base includes an air inlet opening and an air outlet opening through the enclosing wall. At least one air fan is arranged to move outside air from the air inlet opening to the air outlet opening. A first air damper is arranged to close the air inlet opening. A second air damper is arranged to close the air outlet opening. The first and second air dampers are configured to automatically close if power is interrupted to the apparatus. The dampers each includes a cover or plate and at least one inlet pneumatic cylinder that elevates the cover above the inlet or outlet opening when energized, allowing outside air to pass through the machine base. Springs are arranged such that when the pneumatic cylinders are de-energized, the springs urge the covers onto the openings to close up the machine base.

26 Claims, 64 Drawing Sheets

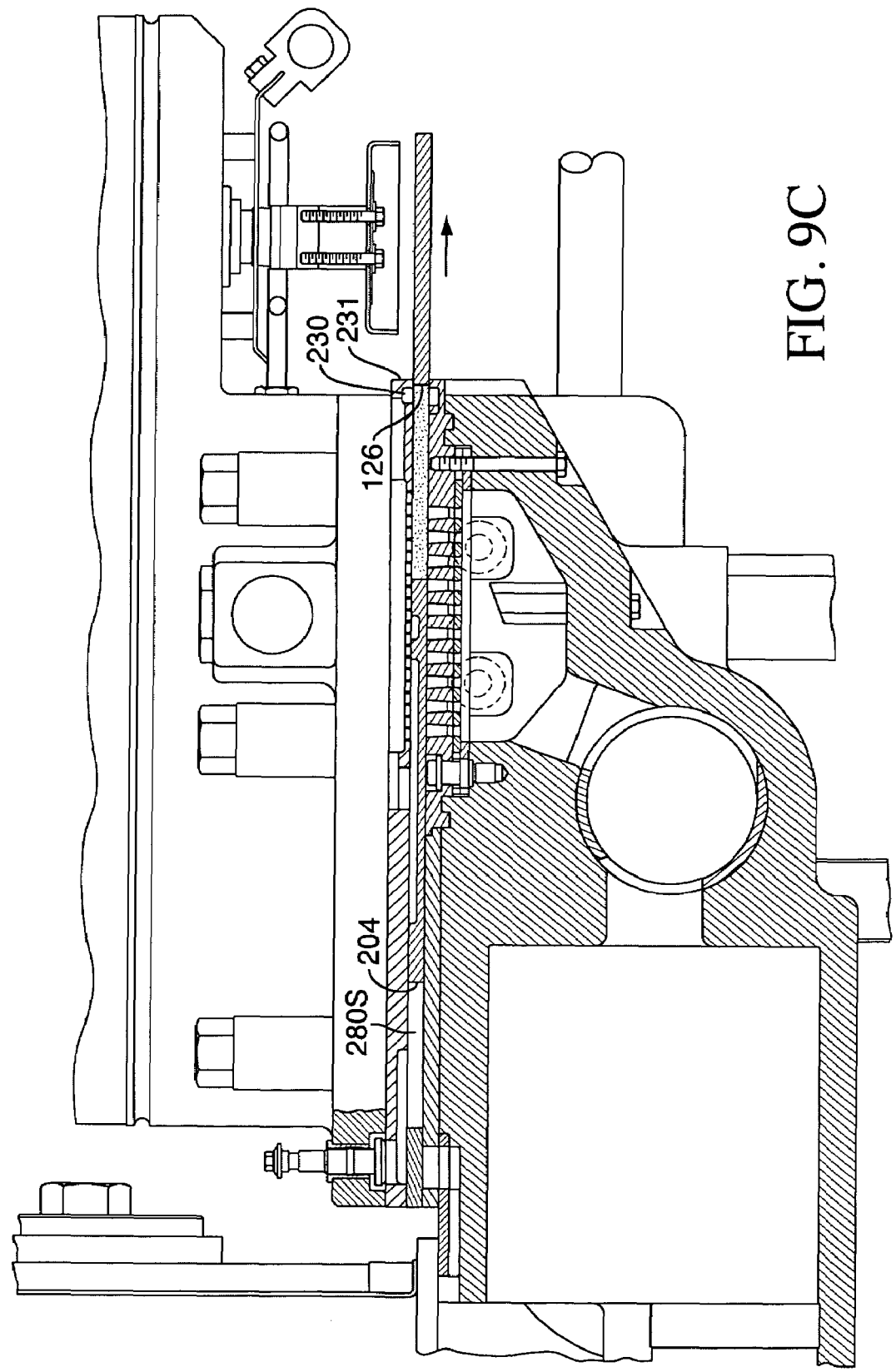

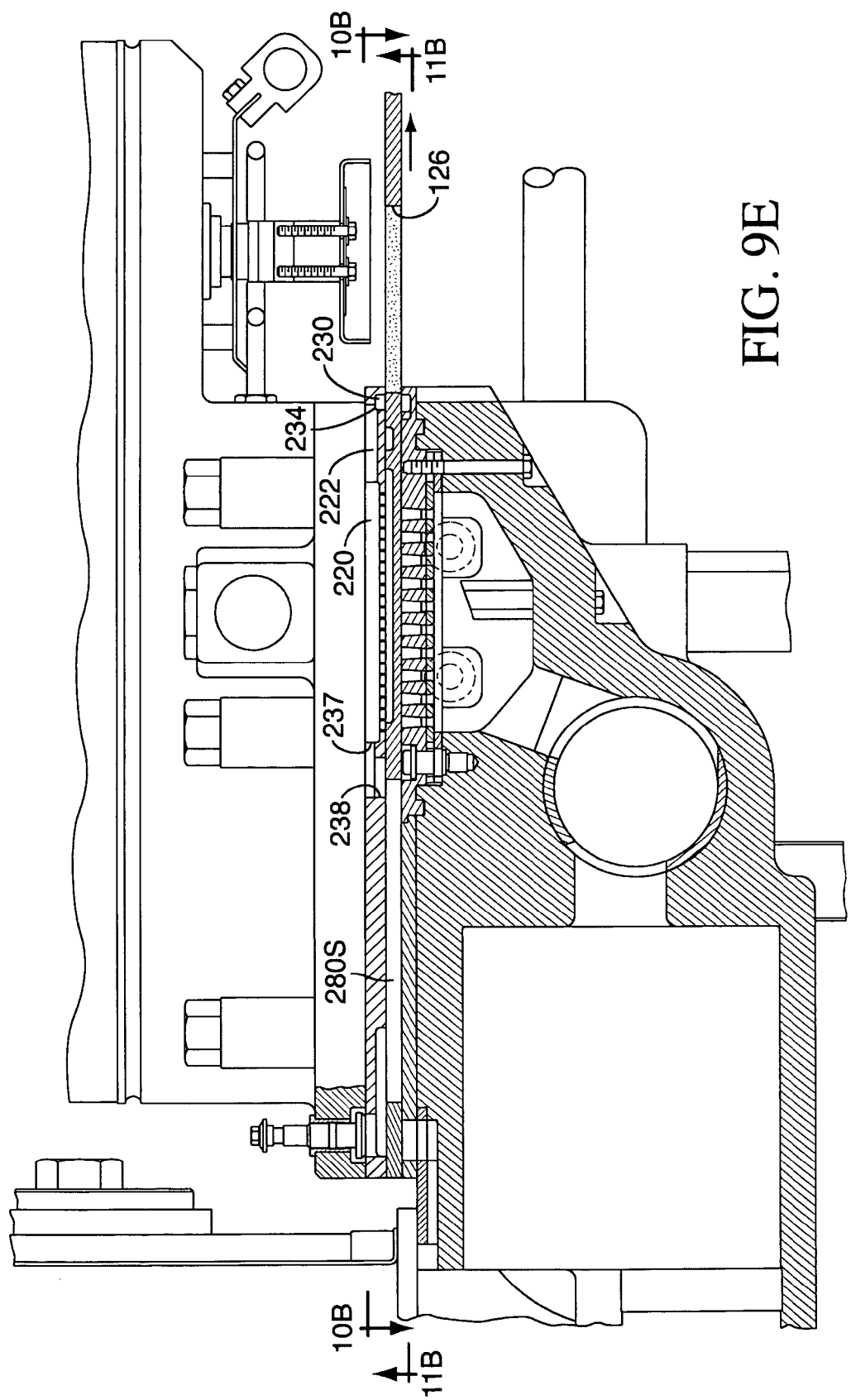

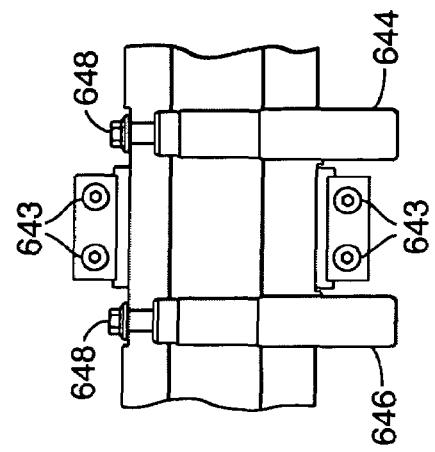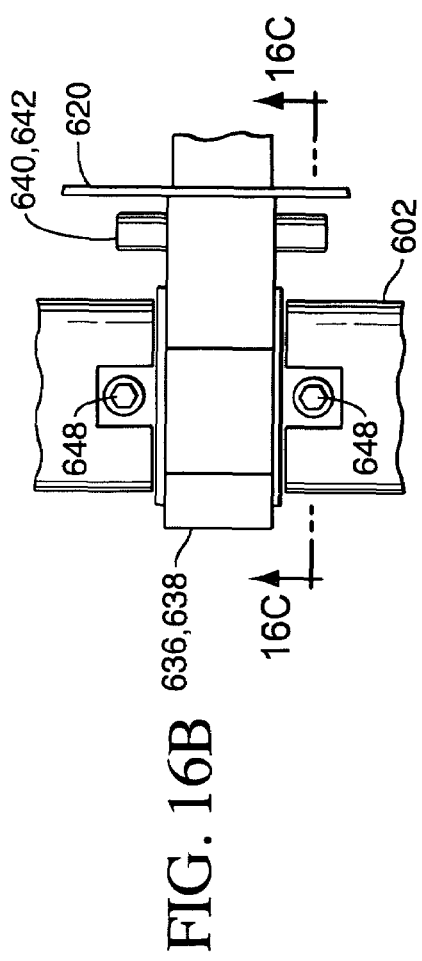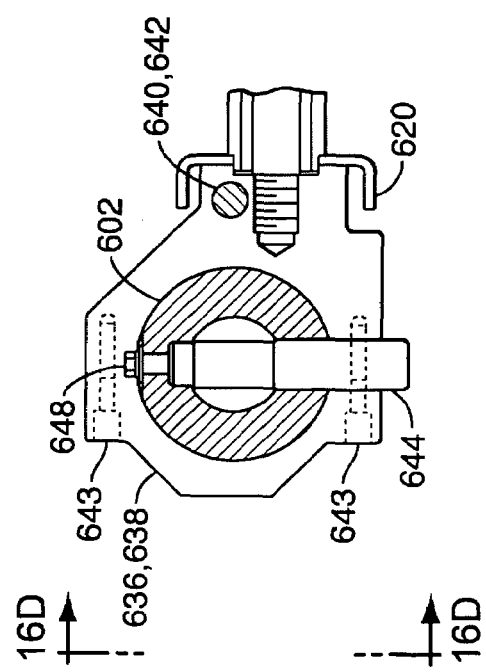

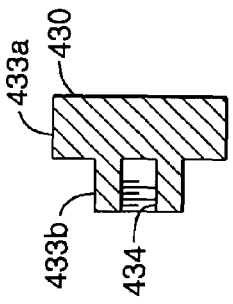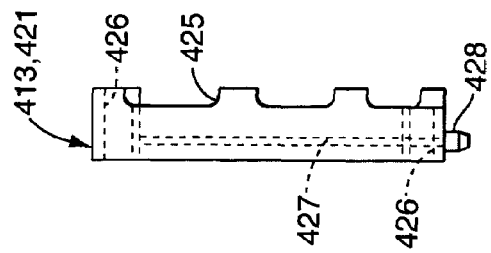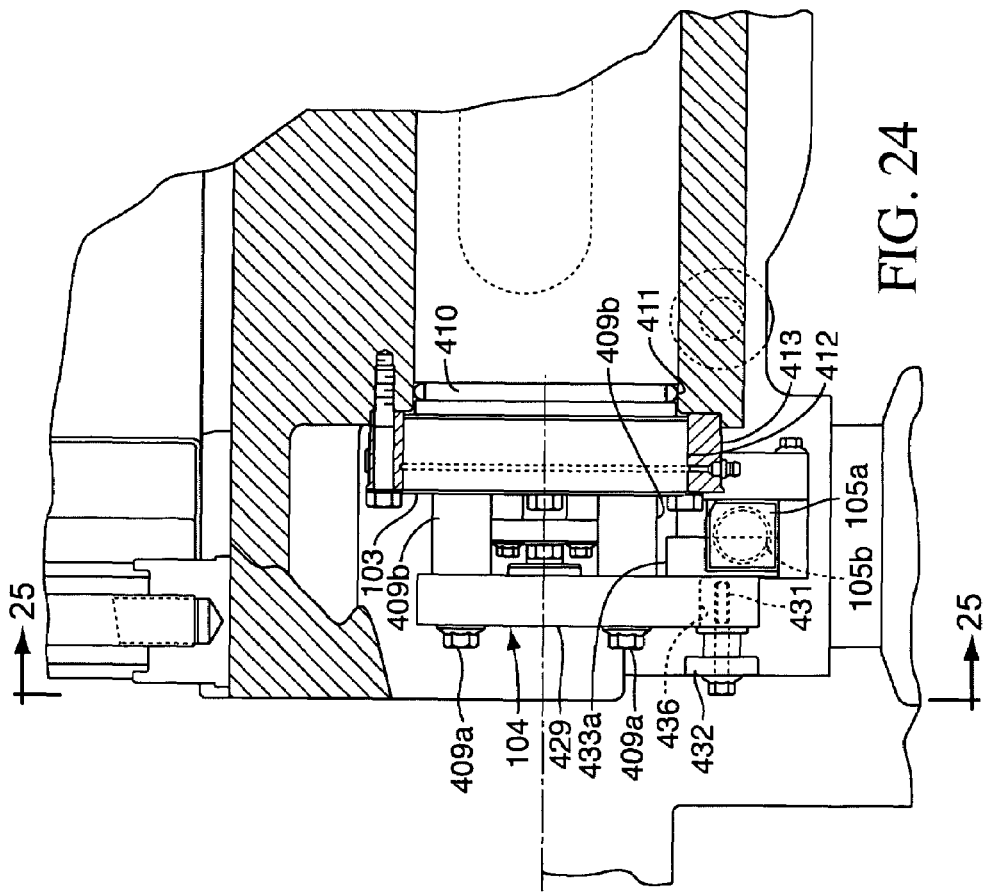

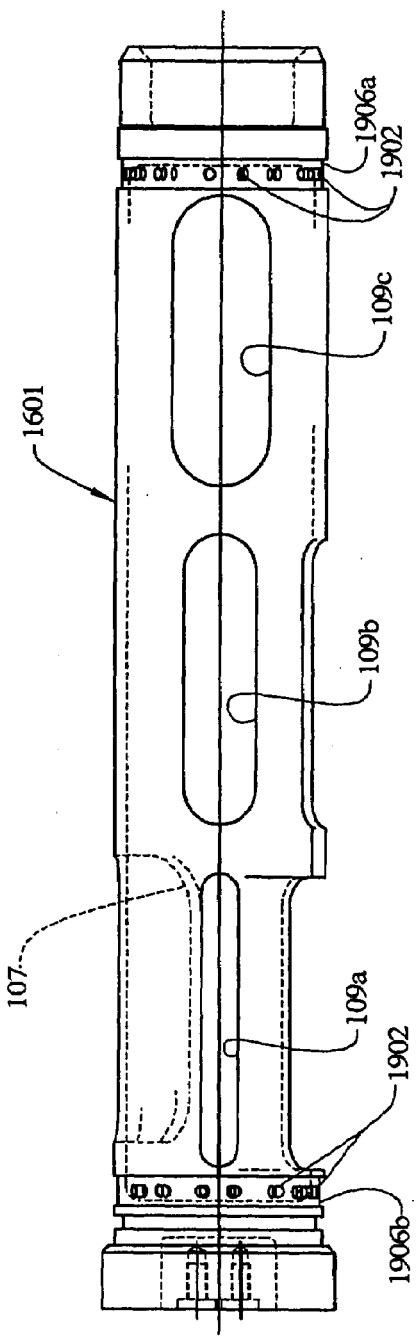
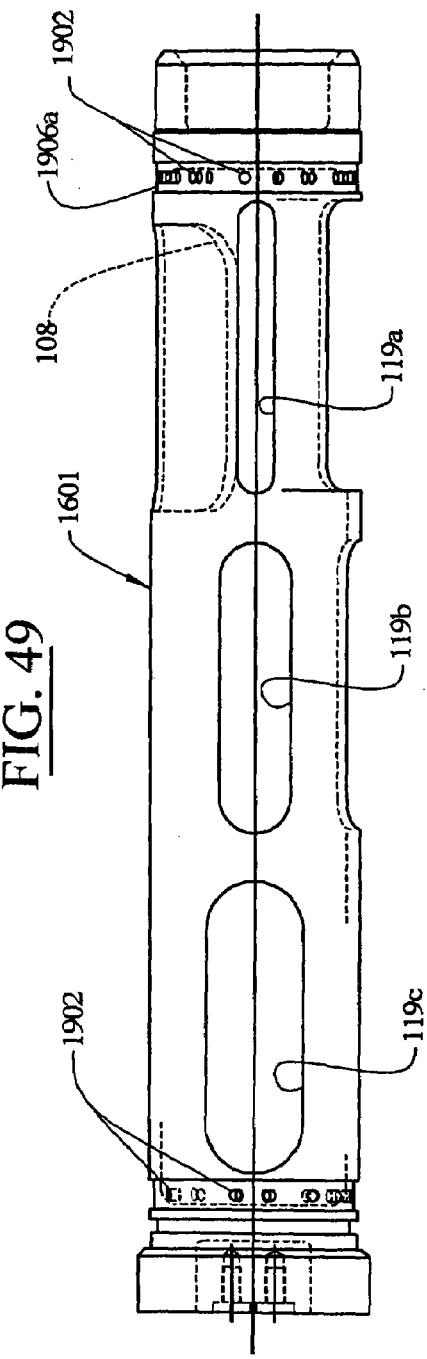
FIG. 48
FIG. 49

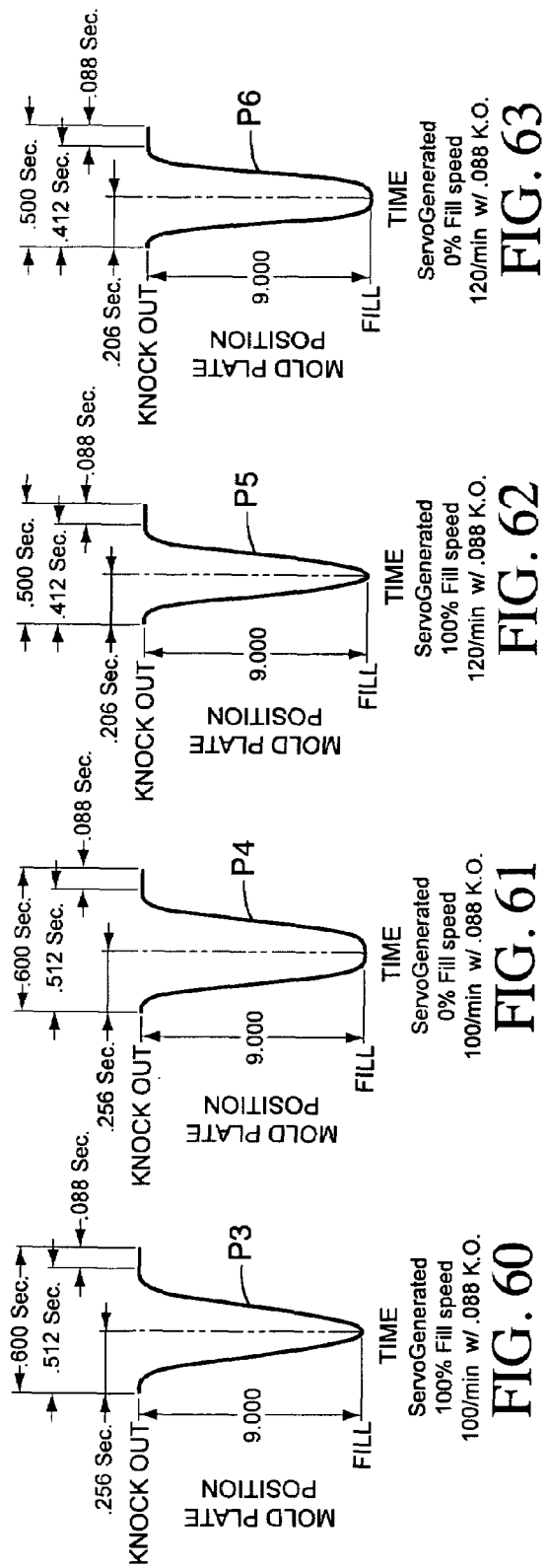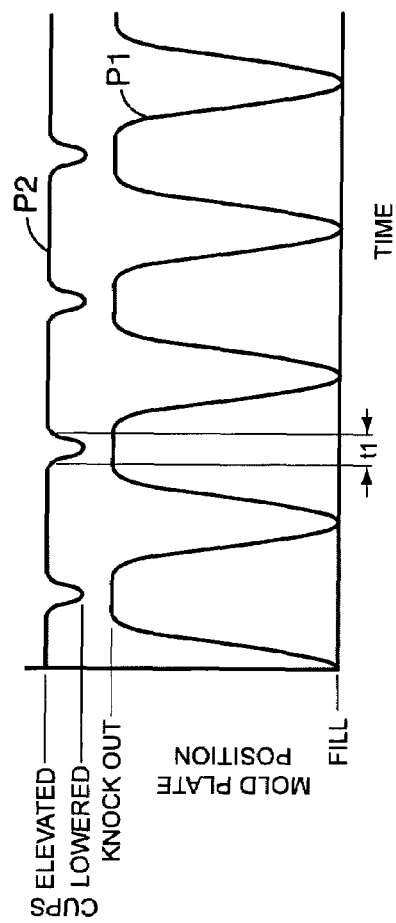

COOLING AIR SYSTEM FOR A PATTY-FORMING APPARATUS

This application claims the benefit of U.S. provisional application Ser. No. 60/503,354, filed Sep. 16, 2003; U.S. provisional application Ser. No. 60/515,585, filed Oct. 29, 2003; and U.S. provisional application Ser. No. 60/571,368, filed May 14, 2004.

BACKGROUND OF THE INVENTION

Use of pre-processed foods, both in homes and in restaurants, has created a demand for effective high-capacity automated food processing equipment. That demand is particularly evident with respect to hamburgers, molded steaks, fish cakes, and other molded food patties.

Food processors utilize high-speed molding machines, such as FORMAX F-6, F-12, F-19, F-26 or F-400 reciprocating mold plate forming machines, available from Formax, Inc. of Mokena, Ill., U.S.A., for supplying patties to the fast food industry. Prior known high-speed molding machines are also described for example in U.S. Pat. Nos. 3,887,964; 4,372,008; 4,356,595; 4,821,376; and 4,996,743 herein incorporated by reference.

Patty-forming machines include an enclosed base that houses heat generating equipment. A cooling air circulating system is provided to eliminate heat from inside the machine base.

Patty-forming machines must be cleaned and sanitized periodically during operation in a processing plant. During periodic spray cleaning and sanitizing of patty-forming machines, care must be taken that spray and wash debris doesn't enter and contaminate the machine base.

Although heretofore known FORMAX patty-molding machines have achieved commercial success and wide industry acceptance, the present inventors have recognized that needs exist for a patty-forming machine that is effectively cooled and is more easily maintained and cleaned, and which avoids contamination during spray cleaning.

SUMMARY OF THE INVENTION

The present invention provides an improved cooling air system for a patty-forming apparatus having a machine base. The machine base includes an enclosing wall and contains equipment within the machine base that generates heat, such as electric motors, electrical and control equipment. The machine base includes an air inlet opening and an air outlet opening through the enclosing wall. At least one air fan is arranged to move outside air from the air inlet opening to the air outlet opening. A first air damper is arranged to close one of the air inlet opening or the air outlet opening. The first air damper is configured to automatically close if power is interrupted to the apparatus.

According to a further enhancement of the invention, the first air damper is arranged to close the air inlet opening, and a second air damper is arranged to close the air outlet opening. The second air damper is also configured to automatically close if power is interrupted to the apparatus.

According to the preferred embodiment, the inlet opening is located on a top side of the machine base, and the first damper comprises a cover and at least one inlet pneumatic cylinder that elevates the cover above the inlet opening when energized, allowing outside air to enter the inlet opening. An inlet spring can be arranged such that when the inlet pneumatic cylinder is de-energized, the inlet spring urges the cover onto the inlet opening to close the inlet opening.

According to the preferred embodiment, the outlet opening is located on a bottom of the machine base, and the second damper comprises a plate over the outlet opening. An outlet pneumatic cylinder is operatively connected to the plate to elevate the plate above the outlet opening to open the outlet opening when the outlet pneumatic cylinder is energized. An outlet spring can be arranged to urge the plate onto the outlet opening to close the outlet opening when the outlet pneumatic cylinder is de-energized.

According to the preferred embodiment, the first air damper arranged outside of the enclosing wall and the second air damper is arranged within the enclosing wall.

The dampers of the invention can be automatically closed by the springs and/or by gravity if electric power is lost to the machine, causing the pneumatic actuators to be de-actuated.

Thus, when the machine is powered down for cleaning, the dampers automatically close the air intake and/or outlet openings. The fan will be powered off. This effectively battens down the machine base and prevents wash water, spray and contaminants from entering the machine base. Also, the fact that the machine is pressurized during operation by the fans can prevent some contaminants from entering the machine base during operation.

Numerous other advantages and features of the present invention will be become readily apparent from the following detailed description of the invention and the embodiments thereof, and from the accompanying drawings.

BRIEF DESCRIPTION OF THE DRAWINGS

FIGS. 9A-9K are enlarged fragmentary sectional views taken from FIG. 2, showing the machine configuration as the mold plate is moved along its path of reciprocation;

FIG. 16B is an enlarged fragmentary sectional view taken from FIG. 4;

FIG. 16C is a fragmentary sectional view taken generally along line 16C-16C of FIG. 16B;

FIG. 16D is a sectional view taken generally along line 16D-16D of FIG. 16C;

FIG. 24 is an enlarged fragmentary sectional view taken from FIG. 5;

FIG. 24A is an elevational view of a bushing taken from FIG. 23;

FIG. 25A is a sectional view taken generally of along line 25A-25A of FIG. 25;

FIG. 48 is a plan view of an alternate embodiment tube valve of the invention in a first rotary position;

FIG. 49 is a plan view of an alternate embodiment tube valve of the invention in a second rotary position;

FIG. 59 is a position versus time diagram for a mold plate according to the invention;

FIG. 60 is a diagram of a first mold plate waveform;

FIG. 61 is a diagram of a second mold plate waveform;

FIG. 62 is a diagram of a third mold plate waveform; and

FIG. 63 is a diagram of a fourth mold plate waveform.

DETAILED DESCRIPTION OF THE PREFERRED EMBODIMENTS

Figure 1:
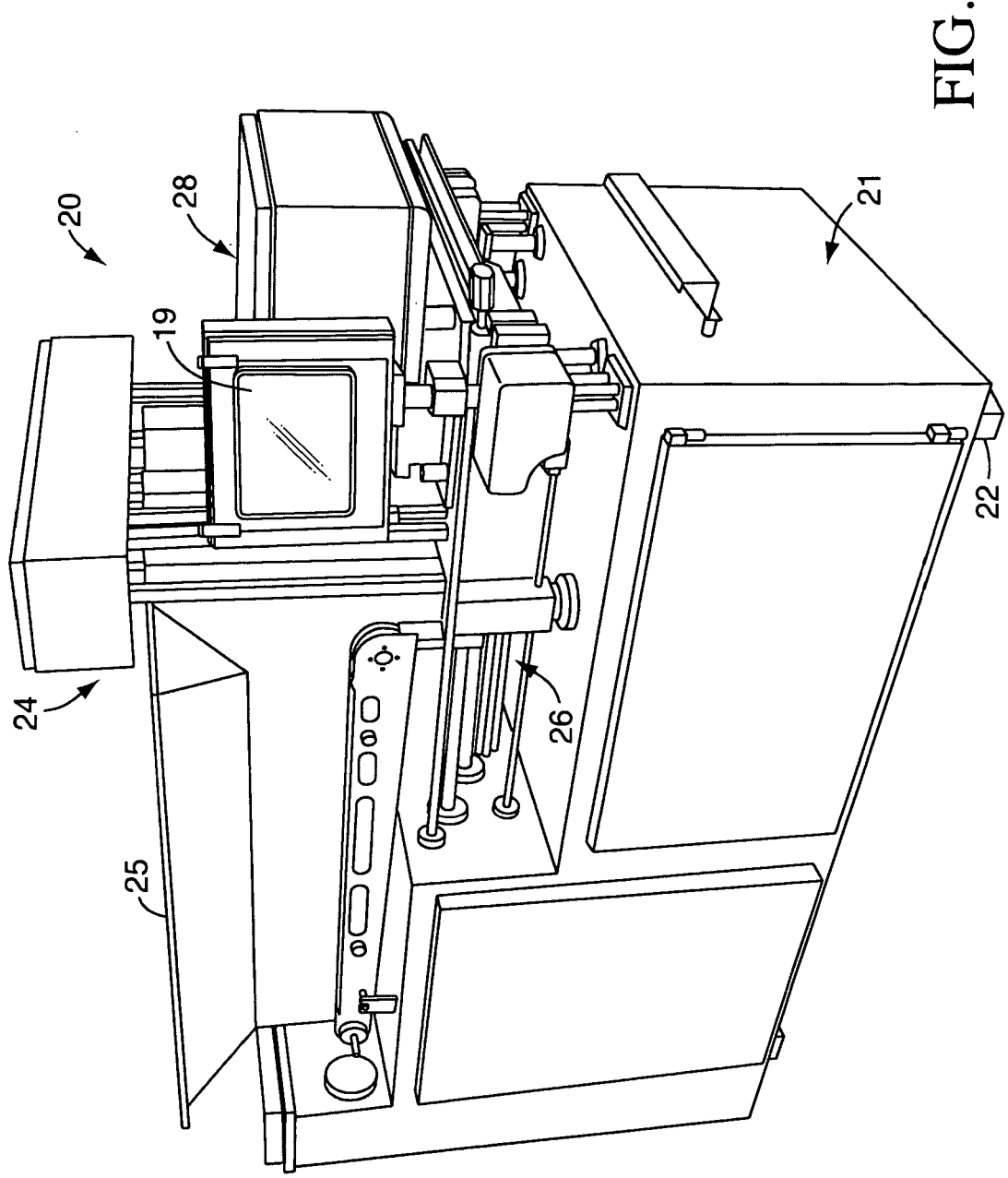
FIG. 1 is a perspective view of a patty-forming machine of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

General Description of the Apparatus

The high-speed food patty molding machine 20 illustrated in the figures comprises an exemplary embodiment of the invention. This application incorporates by reference U.S. provisional application Ser. No. 60/571,368, filed May 14, 2004; U.S. application Ser. No. 60/503,354, filed Sep. 16, 2003 and U.S. Provisional Application Ser. No. 60/515,585, filed Oct. 29, 2003.

The molding machine 20 includes a machine base 21, preferably mounted upon a plurality of feet 22, rollers or wheels. The machine base 21 supports the operating mechanism for machine 20 and can contain hydraulic actuating systems, electrical actuating systems, and most of the machine controls. The base can be clad in 3/16 inch stainless steel panels or skin. The machine 20 includes a supply 24 for supplying moldable food material, such as ground beef, fish, or the like, to the processing mechanisms of the machine.

A control panel 19, such as a touch screen control panel, is arranged on a forward end of the apparatus 20 and communicates with a machine controller 23, shown in FIG. 24.

As generally illustrated in FIGS. 2-6, supply means 24 comprises a large food material storage hopper 25 that opens into the intake of a food pump system 26. The food pump system 26 includes at least two food pumps 61, 62, described in detail hereinafter, that continuously, or intermittently under a pre-selected control scheme, pump food material, under pressure, into a valve manifold 27 flow-connected to a cyclically operated molding mechanism 28.

In the operation of machine 20, a supply of ground beef or other moldable food material is deposited into hopper 25 from overhead. An automated refill device (not shown) can be used to refill the hopper when the supply of food product therein is depleted. The floor of hopper 25 at least partially closed by a conveyor belt 31 of a conveyor 30. The belt 31 includes a top surface 31a for moving the food material longitudinally of the hopper 25 to a hopper forward end 25a.

The food material is moved by supply means 24 into the intake of plunger pumps 61, 62 of pumping system 26. The pumps 61, 62 of system 26 operate in overlapping alteration to each other; and at any given time when machine 20 is in operation, at least one of the pumps is forcing food material under pressure into the intake of manifold 27.

Figure 1A:
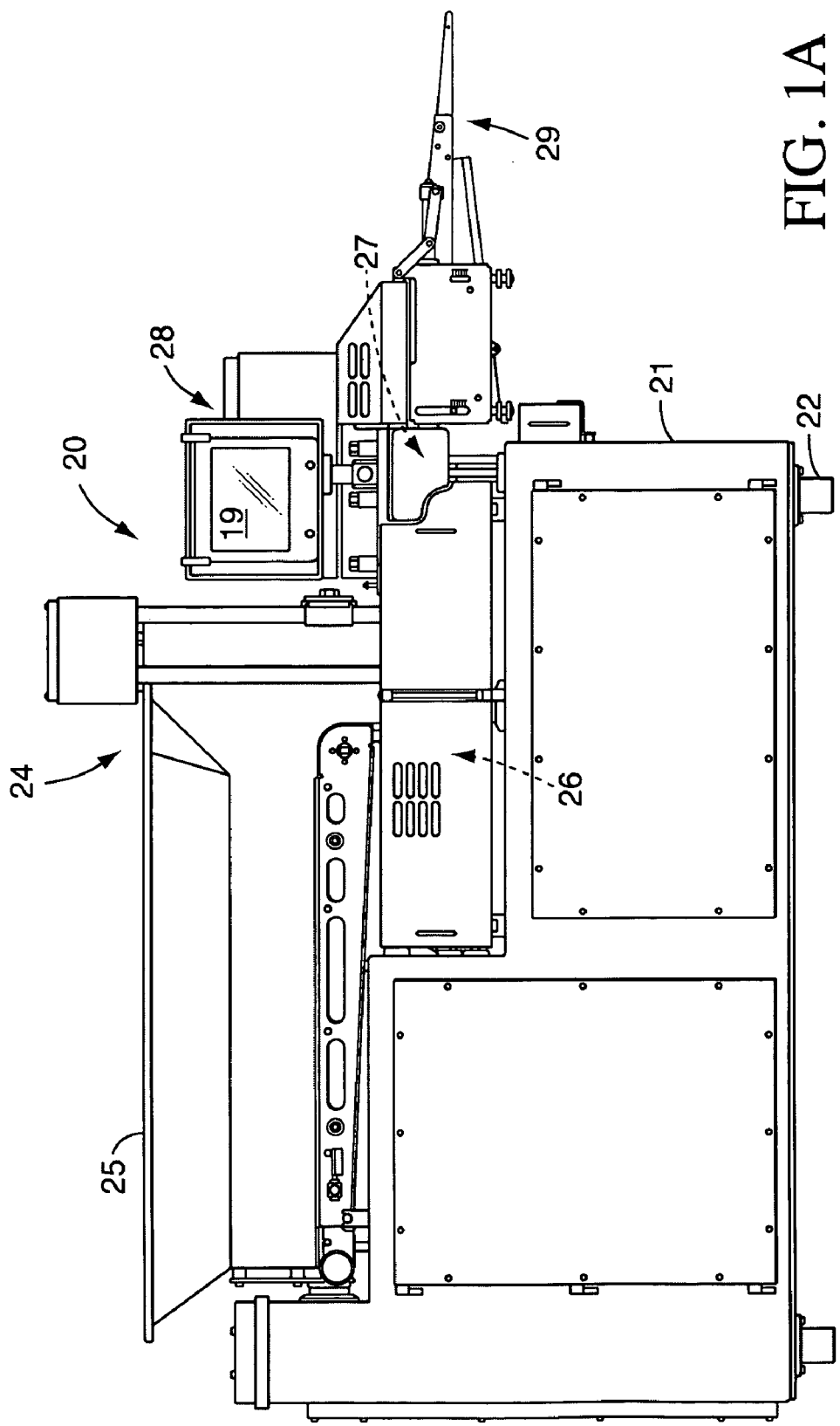
FIG. 1A is an elevational view of the patty-forming machine of FIG. 1.

The manifold 27 comprises a path for feeding the food material, still under relatively high pressure, into the molding mechanism 28. Molding mechanism 28 operates on a cyclic basis, first sliding a multi-cavity mold plate 32 into a receiving position over manifold 27 (FIG. 9A) and then away from the manifold to a discharge position (FIG. 9F) aligned with a series of knock out cups 33. When the mold plate 32 is at its discharge position, knock out cups plungers or cups 33 are driven downwardly as indicated by 33A in FIG. 2, discharging hamburgers or other molded patties from machine 20. The molded patties are deposited onto a conveyor 29 (FIG. 1A), to be transported away from the apparatus 20.

Food Supply System

The food supply means 24 and associated hopper 25 are illustrated in FIGS. 2-6. As seen, the conveyor belt 31 spans completely across the bottom of hopper 25, around an end of idler roller or pulley 35 and drive roller or pulley 36, the lower portion of the belt being engaged by a tensioning roller 37. In some cases the tensioning roller 37 may not be necessary, and can be eliminated. A drum motor (not visible) is provided within the drive roller 36 for rotating the drive roller.

The belt 31 can include a longitudinal V-shaped rib on an inside surface thereof that fits within a V-shaped cross sectional notch provided on the rollers 35, 36 to maintain a lateral centering of the belt during operation.

The forward end 25a of hopper 25 communicates with a vertical pump 38 having an outlet 39 at least partly open into a pump intake manifold chamber 41. A vertically oriented frame 42 extends above hopper 25 adjacent the right-hand side of the outlet 39. A motor housing 40 is mounted on top of the frame 42. A support plate 43 is affixed to the upper portion of frame 42 extending over the outlet 39 in hopper 25. The frame comprises four vertical tie rods 44a surrounded by spacers 44b (FIG. 5).

Figure 5:
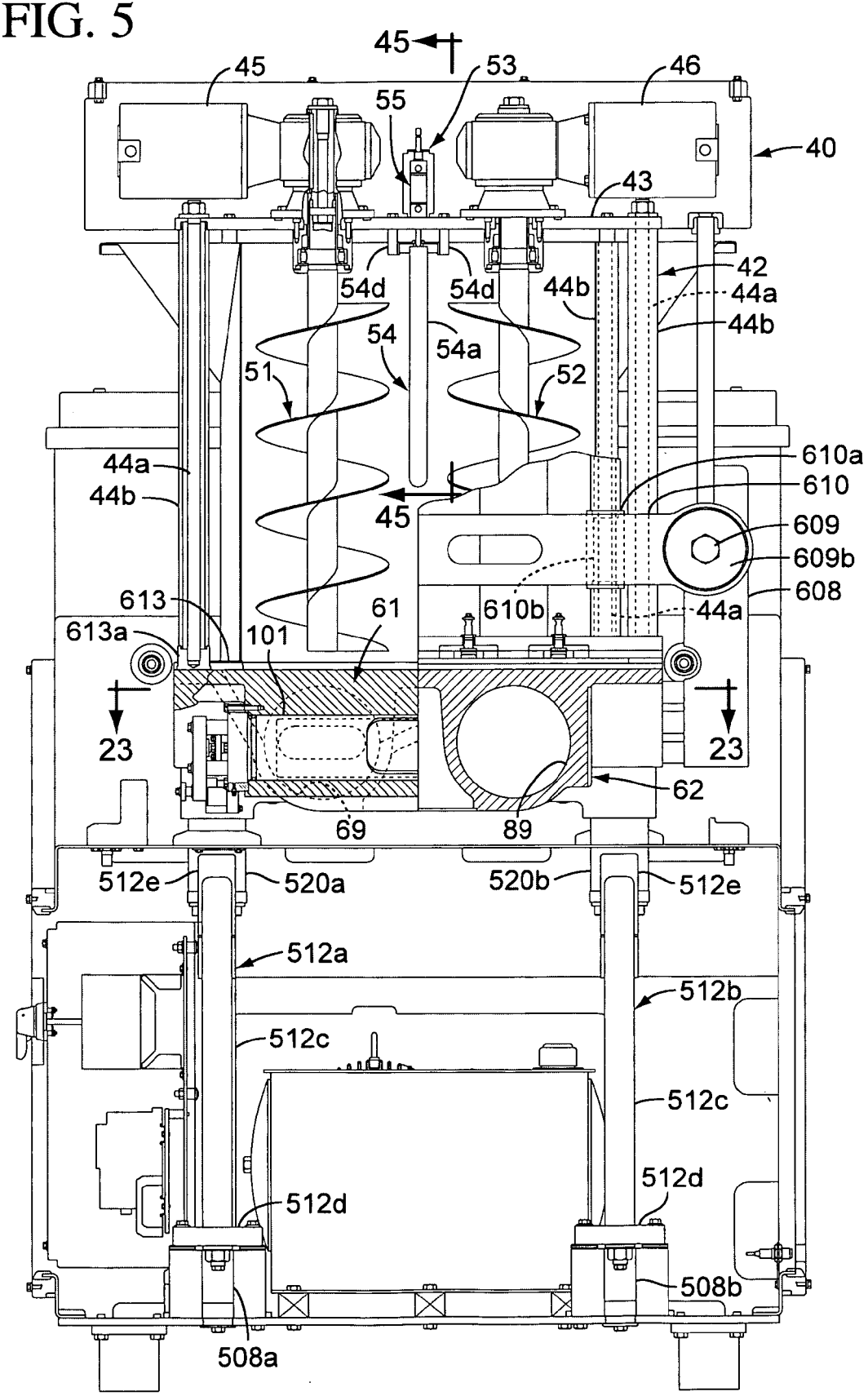
FIG. 5 is a sectional view taken generally along line 5-5 of FIG. 2, with components and/or panels removed for clarity.

As shown in FIG. 5, the vertical pump 38 comprises two feed screw motors 45, 46 that drive feed screws 51, 52. The two electrical feed screw motors 45, 46 are mounted upon the support plate 43, within the motor housing 40. Motor 45 drives the feed screw 51 that extends partly through opening 39 in alignment with a pump plunger 66 of the pump 61. Motor 46 drives the feed screw 52 located at the opposite side of hopper 25 from feed screw 51, and aligned with another pump plunger 68 of the pump 62.

A level sensing mechanism 53 is located at the outlet end of hopper 25. The mechanism is shown in detail in FIG. 45. The mechanism 53 comprises an elongated sensing element 54. As the moldable food material is moved forwardly in the hopper 25, it may accumulate to a level in which it engages and moves the sensing element 54 to a pre-selected degree. When this occurs, a signal is generated to stop the drive for the roller 36 of conveyor 31. In this manner the accumulation of food material at the forward end 25a of hopper 25 is maintained at an advantageous level.

The element 54 includes a food engaging leg 54a, and a bent-off leg 54b. The bent off leg 54b includes a welded-on axle 54c that is journaled for pivoting on each end by bushings held by two lugs 54d. An air cylinder 55 is arranged on the support plate 43. The air cylinder 55 exerts a pre-selected force on the upper leg 54b to oppose rotation of the entire element 54 caused by pressure from food product in the hopper. The cylinder 55 is remotely adjustable to change the force to compensate for variable food material density or to change the level desired at the feed screws 51, 52.

A proximity sensor assembly 56 is arranged next to the cylinder 55 on the support plate 43. A bracket 56a guides a moving shaft 56b. A proximity sensor 56c is mounted to the bracket 56a. The shaft 56b includes a metal target 56d that is sensed by the proximity sensor 56c. The shaft 56b extends through a bushing 43 held on the support plate 43. A lower end of the shaft 56b makes contact with a head of an adjustment screw 54e threaded into the bent off leg 54b. A spring 56e surrounds an upper portion of the shaft 56b and abuts a horizontal portion 56f of the bracket 56a. The spring thus urges the shaft into contact with the adjustment screw 54e. The bent off leg 54b includes an up turned end 54f that contacts the motor housing when the element 54 is rotated counterclockwise (FIG. 45) to a maximum amount by the cylinder 55 corresponding to low or no level of food product to the right of the portion 54a as seen in FIG. 45, or to left of the portion 54a as seen in FIG. 2.

Figure 45:
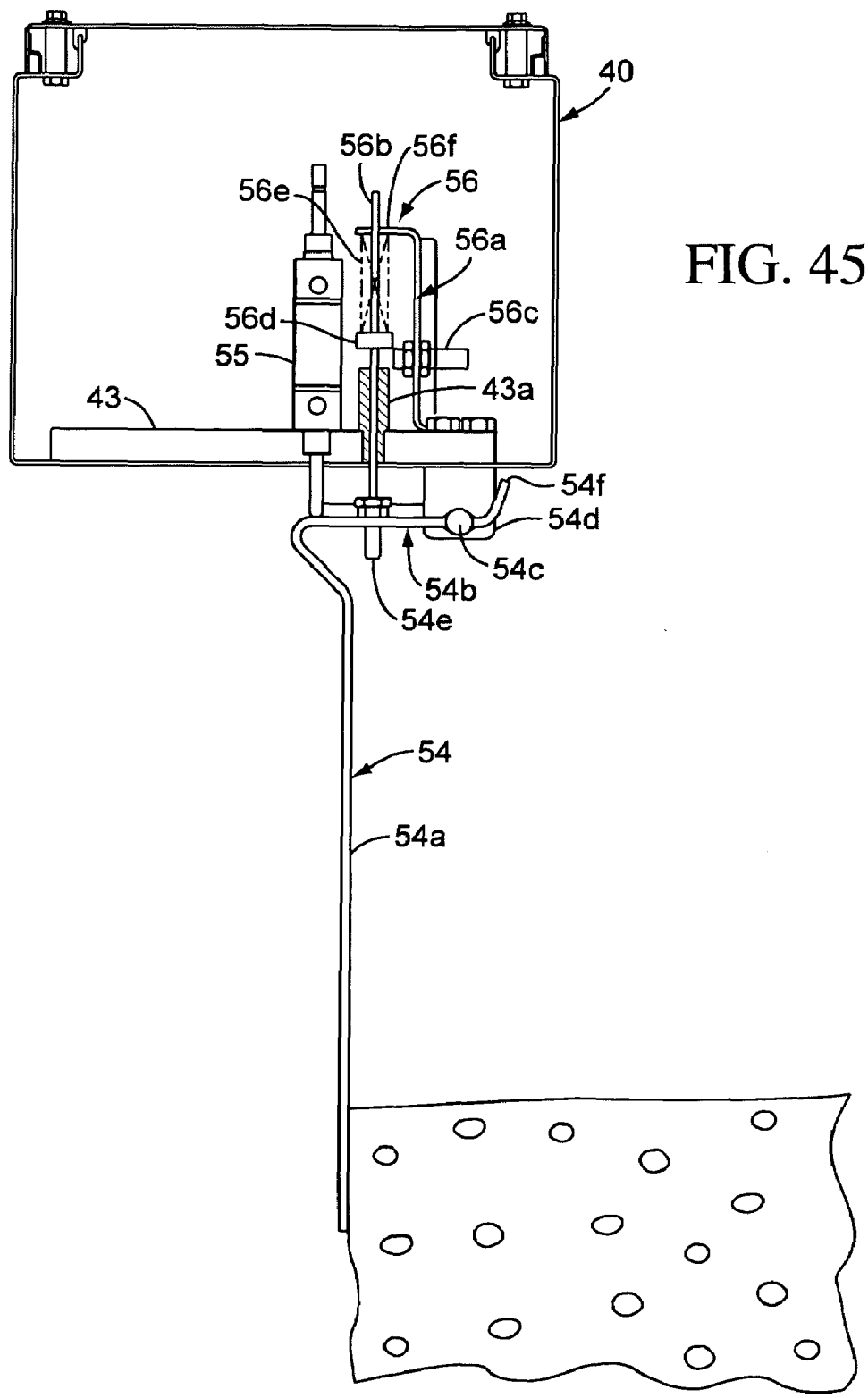
FIG. 45 is an enlarged fragmentary sectional view taken generally along line 45-45 of FIG. 5.

FIG. 45 shows the element 54 rotated to a maximum extent clockwise subject to a high level of food product in the forward end 25a of the hopper 25. The proximity target 56d has passed the sensor 56c to trigger a signal to the machine control 23 to turn off the conveyor 30.

Figure 2:
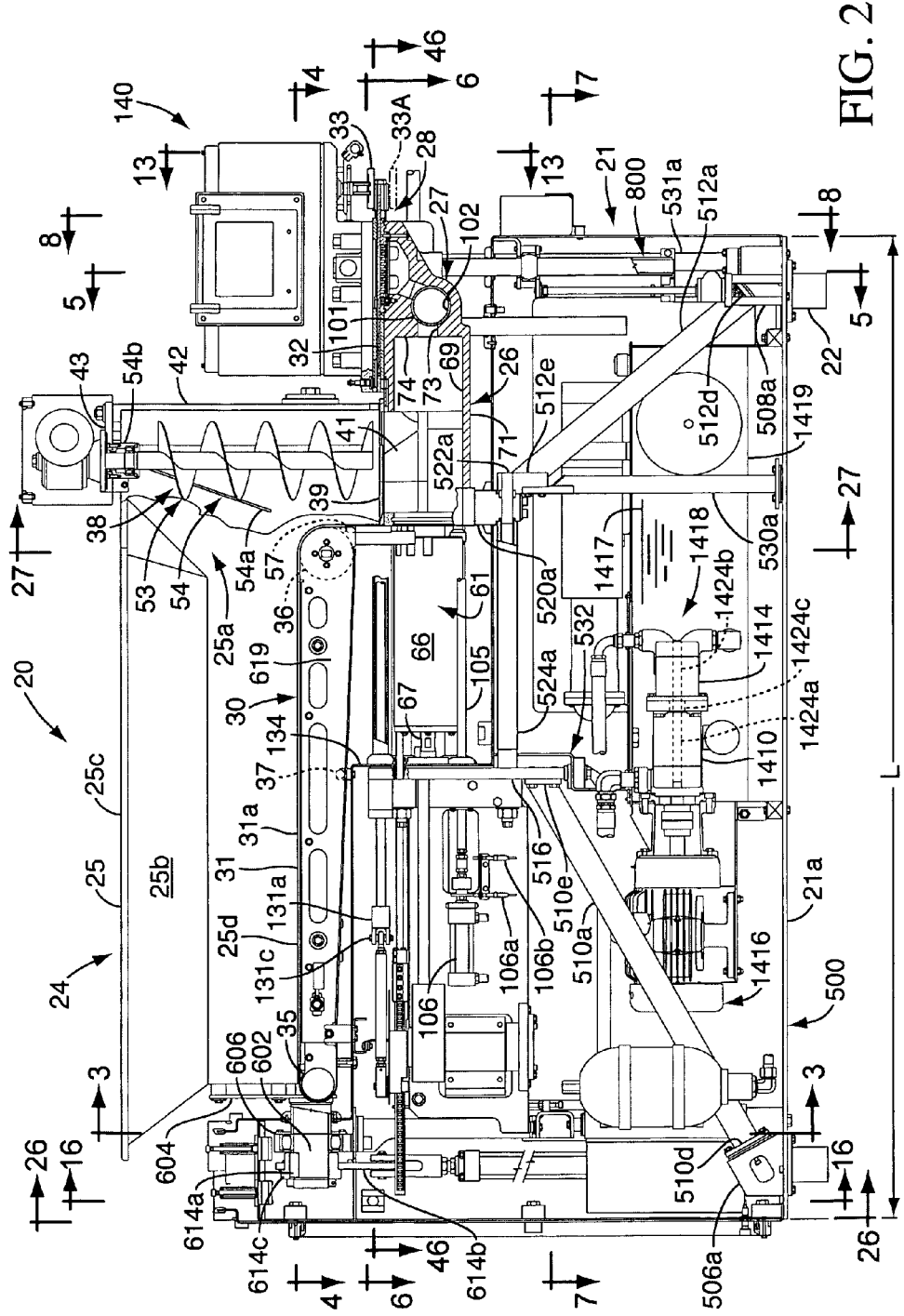
FIG. 2 is a longitudinal sectional view of the patty-forming machine of FIG. 1, with components and/or panels removed for clarity.

When machine 20 is in operation, the feed screw motor 45 is energized whenever plunger 66 is withdrawn to the position shown in FIG. 2, so that feed screw 51 supplies meat from hopper 25 downwardly through outlet 39 into one side of the intake 41 of the food pumping system 26. Similarly, motor 46 actuates the feed screws 52 to feed meat to the other side of intake 41 whenever plunger 68 of the pump 62 is withdrawn. In each instance, the feed screw motors 45, 46 are timed to shut off shortly after the plunger is fully retracted, avoiding excessive agitation of the meat. As the supply of food material in the outlet 39 is depleted, the conveyor belt 31 continuously moves food forwardly in the hopper and into position to be engaged by the feed screws 51, 52. If the level of meat at the outlet 39 becomes excessive, conveyor 30 is stopped, as described above, until the supply at the hopper outlet is again depleted.

The wall of the outlet 39 immediately below conveyor drive rollers 36 comprises a belt wiper plate 57 that continuously engages the surface of the conveyor belt 31 to prevent leakage of the food material 38 from the hopper at this point.

Food Pump System

Figure 6:
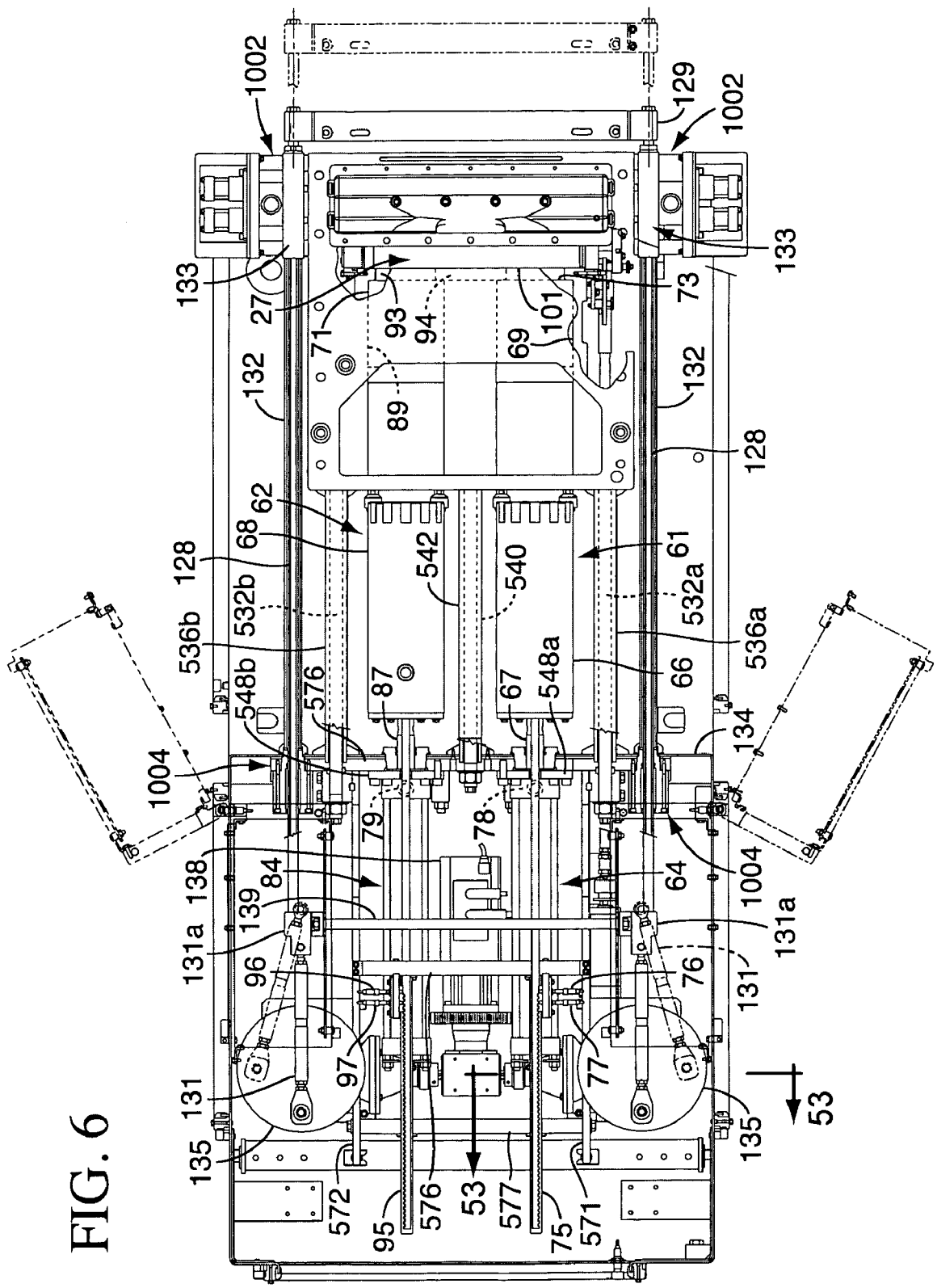
FIG. 6 is a sectional view taken generally along line 6-6 of FIG. 2, with components and/or panels removed for clarity.

The food pump system 26 of molding machine 20 is best illustrated in FIGS. 2 and 6. Pump system 26 comprises the two reciprocating food pumps 61, 62 mounted within the machine base 21. The first food pump 61 includes a hydraulic cylinder 64. The piston (not shown) in cylinder 64 is connected to an elongated piston rod 67; the outer end of the elongated piston rod 67 is connected to the large plunger 66. The plunger 66 is aligned with a first pump cavity 69 formed by a pump cavity enclosure or pump housing 71. The forward wall 74 of pump cavity 69 has a relatively narrow slot 73 that communicates with the valve manifold 27 as described more fully hereinafter.

Preferably, the pump housing 71 and the valve manifold 27 are cast or otherwise formed as a one piece stainless steel part.

The second food pump 62 is essentially similar in construction to pump 61 and comprises a hydraulic cylinder 84. Cylinder 84 has an elongated piston rod 87 connected to the large plunger 68 that is aligned with a second pump cavity 89 formed in housing 71. The forward wall 94 of pump cavity 89 includes a narrow elongated slot 93 communicating with manifold 27.

Advantageously, the plungers 66, 68 and the pump cavities 69, 89 have corresponding round cross sections for ease of manufacturing and cleaning.

An elongated proximity meter 75 is affixed to the first pump plunger 66 and extends parallel to piston rod 67 into alignment with a pair of proximity sensors 76 and 77. A similar proximity meter 95 is fixed to and projects from plunger 68, parallel to piston rod 87, in alignment with a pair of proximity sensors 96, 97. Proximity sensors 76, 77 and 96, 97 comprise a part of the control of the two pumps 61, 62, shown in FIG. 15.

The meters 75, 95 and sensors 76, 77, 96, 97 monitor the plunger positions in small, precise increments, such as every 0.25 inches. The meters include teeth or other targets that are sensed by the sensors and counted by machine electronics, such as in the controller 23, or in intervening electronics and communicated to the controller 23.

Two further proximity sensors 78, 98 responsive to targets on an inside facing surfaces of the meters 75, 95 respectively, are provided which communicate to the controller 23, or to intervening electronics that communicate with the controller 23, the home position of the respective plunger which corresponds to a front end of each plunger being just inside, and sealed by a front ring seal 99 (FIG. 2) to the pump housing 71. The home position of each plunger is used by the controller to calibrate or set the machine position control of the plungers 66, 86.

In operation, the first pump 61 pumps the moldable food material into manifold 27 and the second pump 62 receives a supply of the moldable food material for a subsequent pumping operation. Pump 61 begins its pumping stroke, and compresses food product in pump cavity 69, forcing the moldable food material through slot 73 into manifold 27. As operation of molding machine 20 continues, pump 61 advances plunger 66 to compensate for the removal of food material through manifold 27. The pump can maintain a constant pressure on the food material in the cavity 69 during the molding cycle, or preferably can provide a pre-selected pressure profile over the molding cycle such as described in U.S. Pat. No. 4,356,595, incorporated herein by reference, or as utilized in currently available FORMAX machines. The pressure applied through pump 61 is sensed by a pressure sensing switch 78 connected to a port of the cylinder 64.

As plunger 66 advances, the corresponding movement of proximity meter 75 signals the sensor 76, indicating that plunger 66 is near the end of its permitted range of travel. When this occurs, pump 62 is actuated to advance plunger 68 through pump cavity 89, compressing the food material in the second pump cavity in preparation for feeding the food material from the cavity into manifold 27. The pressure applied through pump 62 is sensed by a pressure sensing switch 79 connected to one port of cylinder 84.

When the food in the second pump cavity 89 is under adequate pressure, the input to manifold 27 is modified so that subsequent feeding of food product to the manifold is effected from the second pump cavity 89 with continuing advancement of plunger 68 of the second pump 62. After the manifold intake has been changed over, pump 61 is actuated to withdraw plunger 66 from cavity 69.

Thereafter, when plunger 68 is near the end of its pressure stroke into pump cavity 89, proximity sensor 96, signals the need to transfer pumping operations to pump 61. The changeover process described immediately above is reversed; pump 61 begins its compression stroke, manifold 27 is changed over for intake from pump 61, and pump 62 subsequently retracts plunger 68 back to the supply position to allow a refill of pump cavity 89. This overlapping alternating operation of the two pumps 61, 62 continues as long as molding machine 20 is in operation.

The valve manifold 27, shown in FIGS. 2 and 6, holds a manifold valve cylinder or tube valve 101 fit into an opening 102 in housing 71 immediately beyond the pump cavity walls 74 and 94.

According to one embodiment, valve cylinder 101 includes two longitudinally displaced intake slots 107 and 108 alignable with the outlet slots 73 and 93, respectively, in the pump cavity walls 74 and 94. Slots 107 and 108 are angularly displaced from each other to preclude simultaneous communication between the manifold and both pump cavities 69 and 89. Cylinder 101 also includes an elongated outlet slot 109. The valve cylinder outlet slot 109 is generally aligned with a slot 111 (see FIG. 9A) in housing 71 that constitutes a feed passage for molding mechanism 28.

One end wall of valve cylinder 101 includes an externally projecting base end 103 that is connected to a drive linkage 104, which in turn is connected to the end of the piston rod 105 of a hydraulic actuator cylinder 106 (FIG. 2). Proximity sensors 106a, 106b communicate the rotary position of the valve cylinder to the machine controller 23.

When the pump 61 is supplying food material under pressure to molding mechanism 28, actuator cylinder 106 has retracted piston rod 105 to the inner limit of its travel, angularly orienting the manifold valve cylinder 101. With cylinder 101 in this position, its intake slot 107 is aligned with the outlet slot 73 from pump cavity 69 so that food material is forced under pressure from cavity 69 through the interior of valve cylinder 101 and out of the valve cylinder outlet slot 109 through slot 111 to the molding mechanism 28. On the other hand, the second intake slot 108 of valve cylinder 101 is displaced from the outlet slot 93 for the second pump cavity 89. Consequently, the food material forced into the interior of valve cylinder 101 from pump cavity 69 cannot flow back into the other pump cavity 89.

Tube Valve System

Figure 17:
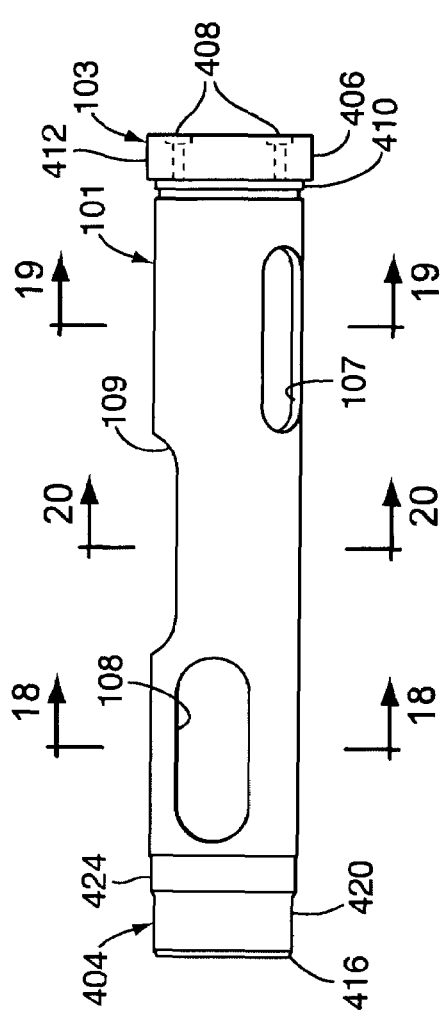
FIG. 17 is an elevational view of a tube valve of the present invention.

FIG. 17 illustrates the tube valve 101 separate from the apparatus 20. The tube valve includes the base end 103 and a distal end 404. The distal end 404 is inserted first into the opening 102 of the housing 71 during installation. The base end 103 includes an end flange 406 having two tapped holes 408 for connection to the drive link 104 by fasteners 409a and spacers 409b as shown in FIG. 24. The base end 103 further includes a groove 410 for a ring seal 411, such as an O-ring or a D-ring, and a smooth annular surface 412 that is journaled within a base end bearing or bushing 413 shown in FIGS. 12 and 13A.

Figure 23:
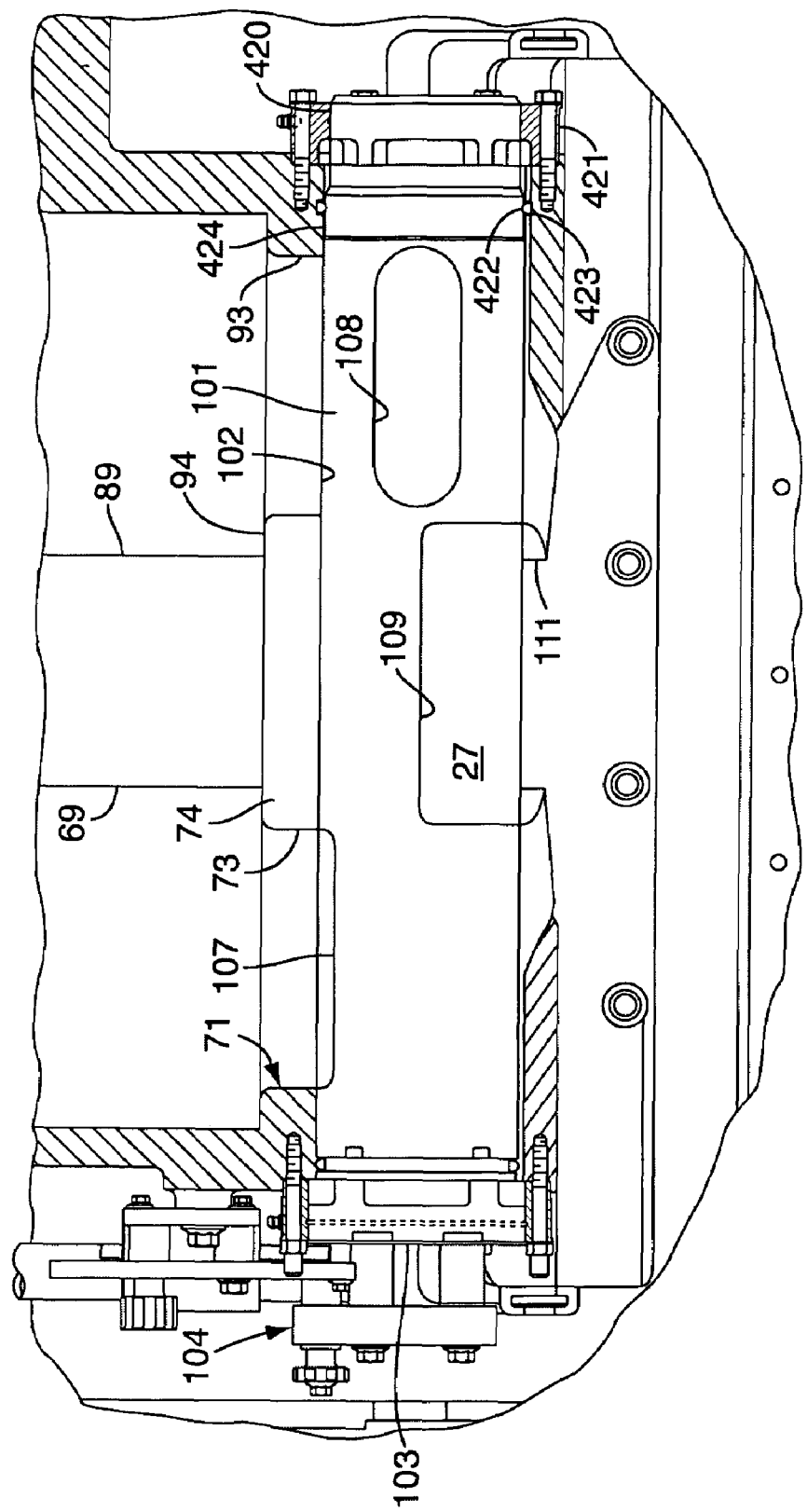
FIG. 23 is an enlarged fragmentary sectional view taken generally along line 23-23 of FIG. 5.

The distal end 404 includes a reduced diameter guide portion 416 that positions a smooth annular surface 420 into a distal end bearing or bushing 421 as shown in FIG. 24. A ring seal 422, such as an O-ring or D-ring, is positioned within an inside groove 423 of the opening 182. A smooth annular surface 424 of the distal end 404 engages and seals against the ring seal 422 (FIG. 23).

As illustrated in FIG. 24A, both bushings 413, 421 include a crown-shaped profile having openings 425 spaced around a circumferential surface that abuts the manifold 27 when installed. Each bushing 413, 421 include openings 426 for fasteners to fasten the bushings 413, 421 to the manifold 27, and an inside circumferential grease groove 427 in communication with a grease fitting 428.

Figure 25:
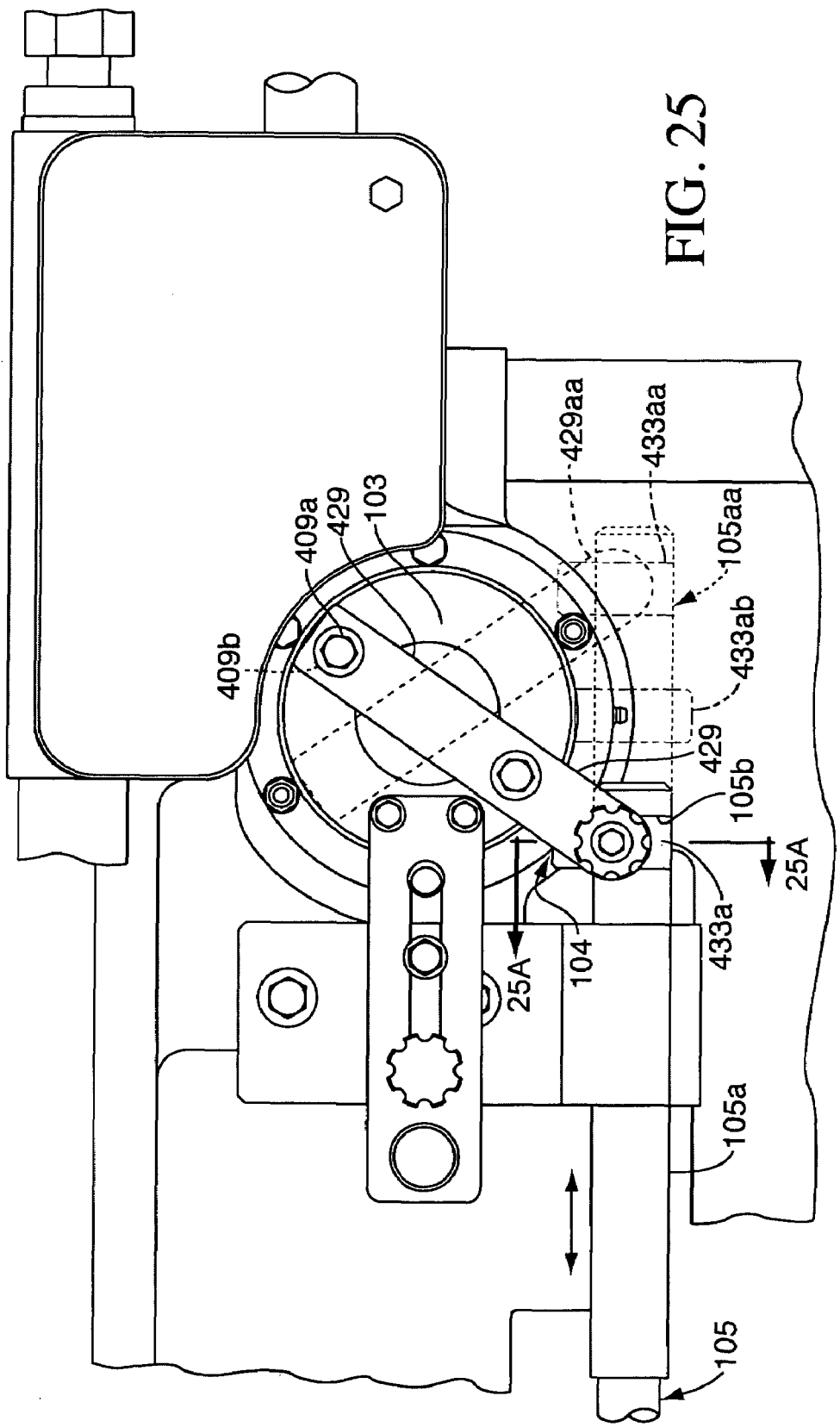
FIG. 25 is a view taken generally of along line 25-25 of FIG. 24.
Figure 26:
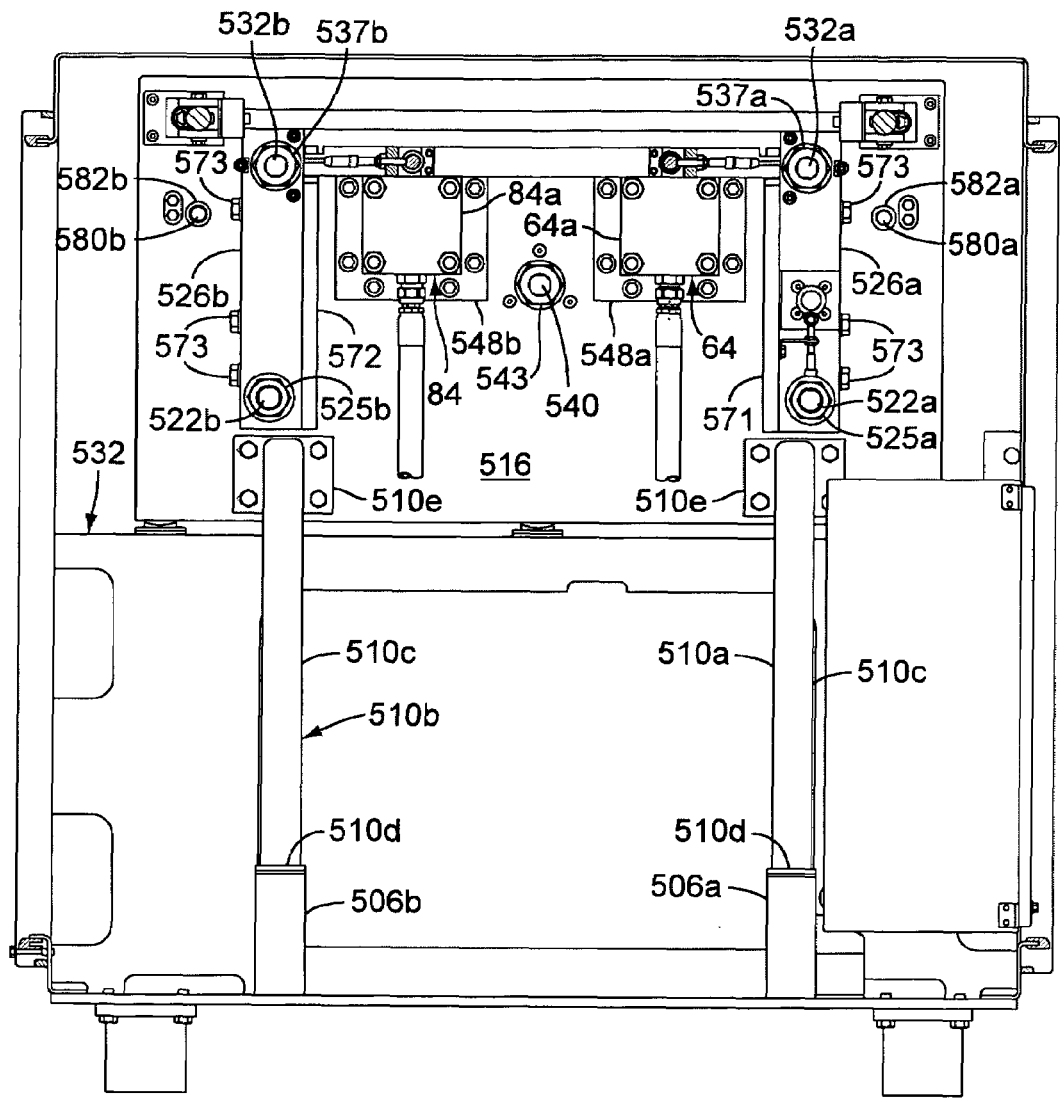
FIG. 26 is an enlarged, sectional view taken generally along line 26-26 of FIG. 2.
Figure 27:
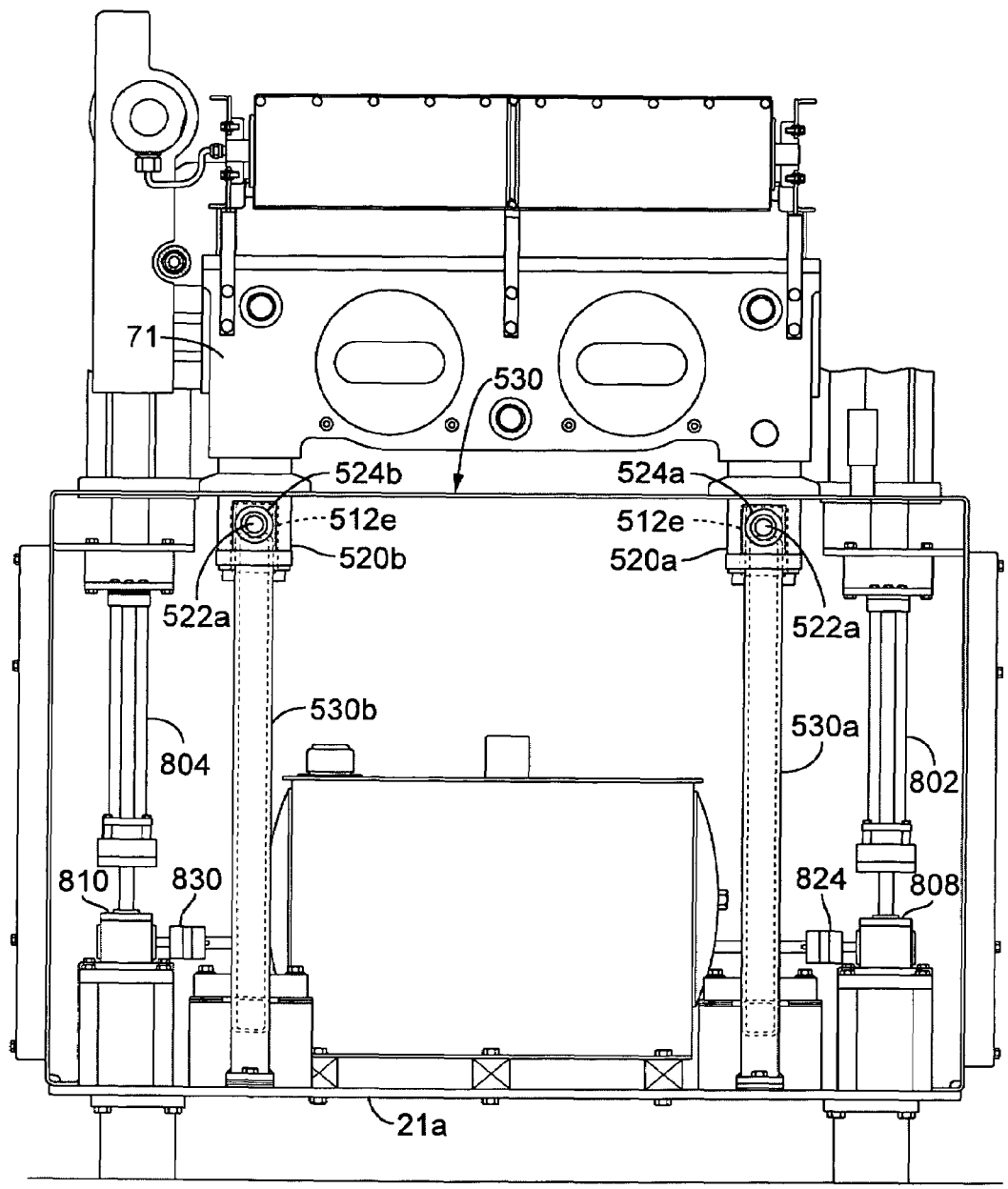
FIG. 27 is an enlarged, sectional view taken generally along line 27-27 of FIG. 2.

As illustrated in FIG. 25, the linkage 104 includes a lever bar 429 that is fastened to the base end 103 by the fasteners 409a, and spacers 409b. The rod 105 includes an extension 105a that has a square cross section. The extension has a rectangular notch 105b that is open towards a back side of the lever bar 429.

A follower block 430 is rotatably connected to the back side of the lever bar 429 by a threaded shank 431 of a knob 432. In this regard, the follower block 430 includes a block portion 433a and a cylinder portion 433b having a threaded bore 434 to engage the shank 431. The lever bar 429 includes a cylindrical bore 436 that receives the cylinder portion 433b. The cylinder portion 433b is free to rotate in the bore 436.

Figure 14:
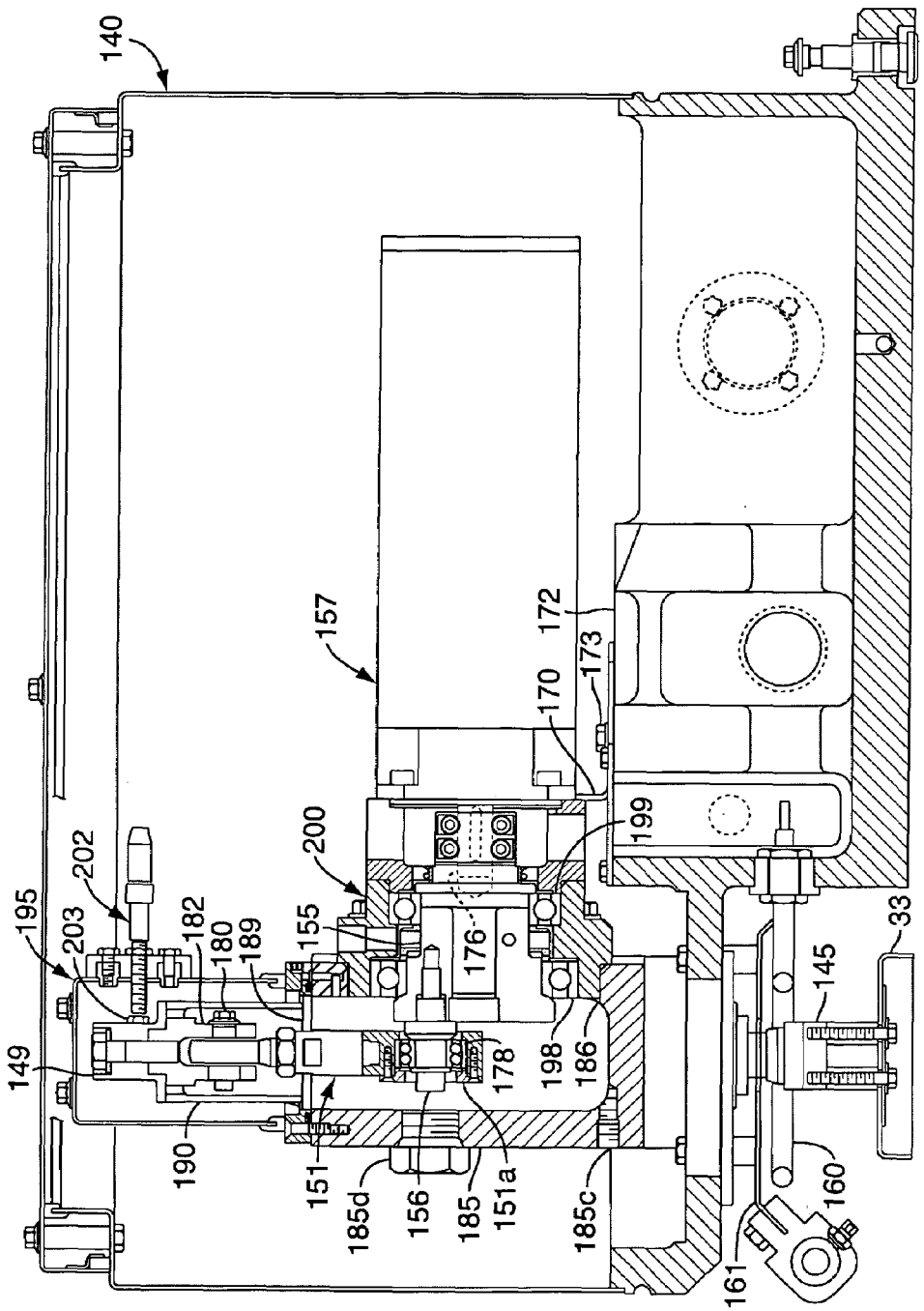
FIG. 14 is a fragmentary sectional view taken generally along line 14-14 of FIG. 13.

The block portion 433a is free to vertically slide within the notch 105b. Three positions of the block portion 433a are shown in FIG. 14: 433a, 433ab, 433aa. Two positions of the lever bar 429 are shown: 429 and 429aa.

Figure 18:
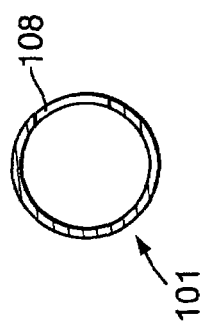
FIG. 18 is a sectional view taken generally along line 18-18 of FIG. 17.

FIG. 18 illustrates the relative size and orientation of the inlet port 108 with respect to the valve 101.

Figure 19:
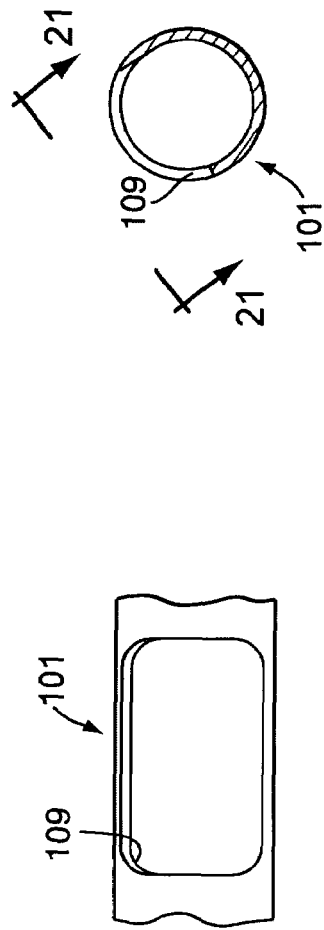
FIG. 19 is a sectional view taken generally along line 19-19 of FIG. 17.

FIG. 19 illustrates the relative size and orientation of the inlet port 107 with respect to the valve 101.

Figure 20:
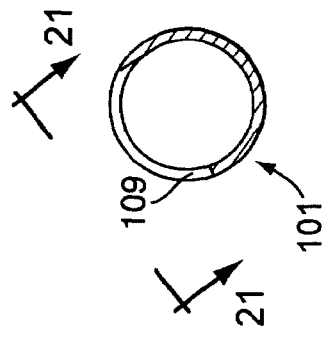
FIG. 20 is a sectional view taken generally along line 20-20 of FIG. 17.
Figure 21:
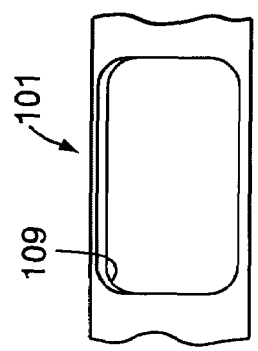
FIG. 21 is an elevational view taken generally along line 21-21 of FIG. 20.

FIGS. 20 and 21 illustrate the relative size and orientation of the outlet port 109 with respect to valve 101.

Figure 22:
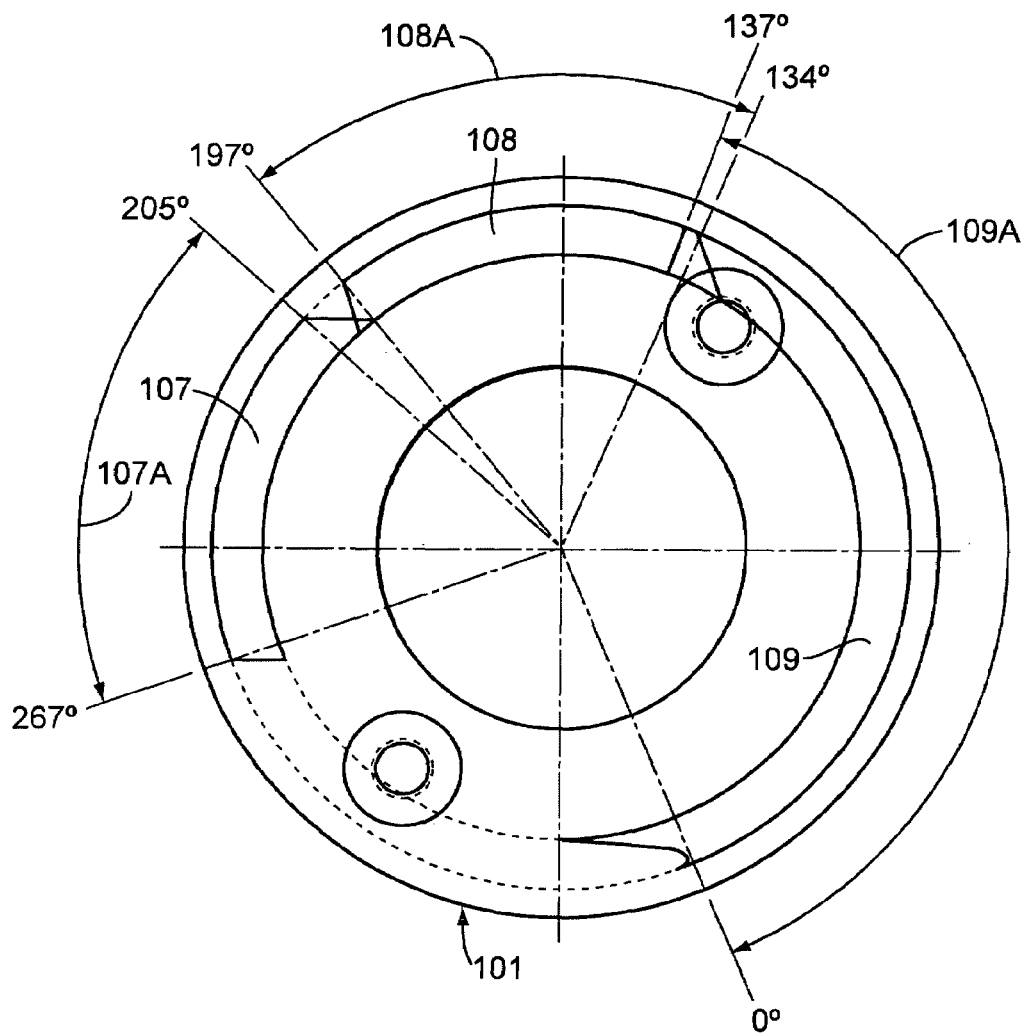
FIG. 22 is an enlarged diagrammatic cross section of the tube valve of FIG. 17, showing the positions of and rotary expanse of inlet and outlet ports of the tube valve.

FIG. 22 illustrates the respective rotary positions of the inlet ports 107, 108 and the outlet port 109 around the circumference of the tube valve 101. The ports 107, 108, 109 have angular expanses of 107A, 108A, and 109A respectively. Preferably, for a 4.4 inch diameter tube valve, given the reference angle 0 degrees shown in FIG. 22, the angular position and expanse 107A is approximately between 205 degrees and 267 degrees, the angular position and expanse 108A is approximately between 134 degrees and 197 degrees, and the angular position and expanse 109A is approximately between 0 degrees and 137 degrees. The sidewalls of the ports are not all cut radially, in such cases the angles are taken at the furthest radial point on the sidewall that defines the port.

Figure 46:
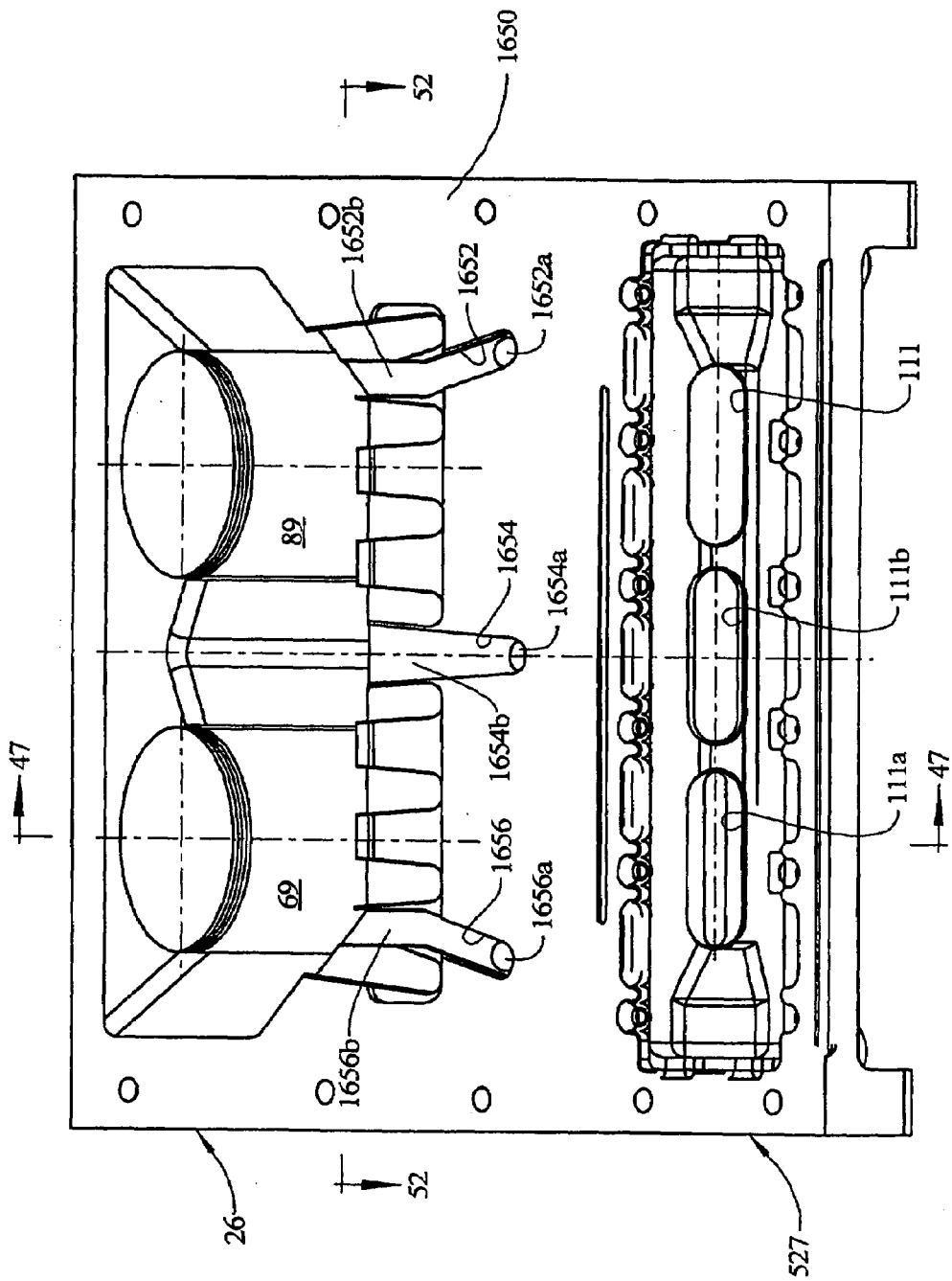
FIG. 46 is an enlarged, fragmentary sectional view taken generally along line 46-46 of FIG. 2 and showing a further aspect of the invention.

FIGS. 46-52 illustrate a second embodiment tube valve 1601 and manifold 527. FIG. 46 is taken generally along oblique line 46-46 of FIG. 47. FIG. 46 illustrates the valve manifold 527 and the pump chambers 69, 89 of the pump housing 71 from above, taken from an angle. The mold plate and breather plate are removed in this figure so that the inside cavities of the valve manifold 527 and pump chambers 69, 89 are visible. Similar to the previously described embodiment, it is preferred that the pump housing 71 and the manifold 527 are formed as a unitary part.

The manifold 527 includes three oblong inlet openings 111a, 111b and 111c. The openings 111a, 111b and 111c are substantially equal in open area. The openings 111a, 111b, 111c receive food material from the alternate embodiment tube valve 1601 shown in FIGS. 48-51.

FIG. 46 illustrates the pump chambers 69, 89 empty, i.e., there are no plungers 66, 68 shown. On a top surface 650 of the pump housing 71 and/or manifold 527 there are three grooves or indentations 1652, 1654, 1656 that communicate with bores or holes 1652a, 1654a, 1656a, respectively.

Figure 47:
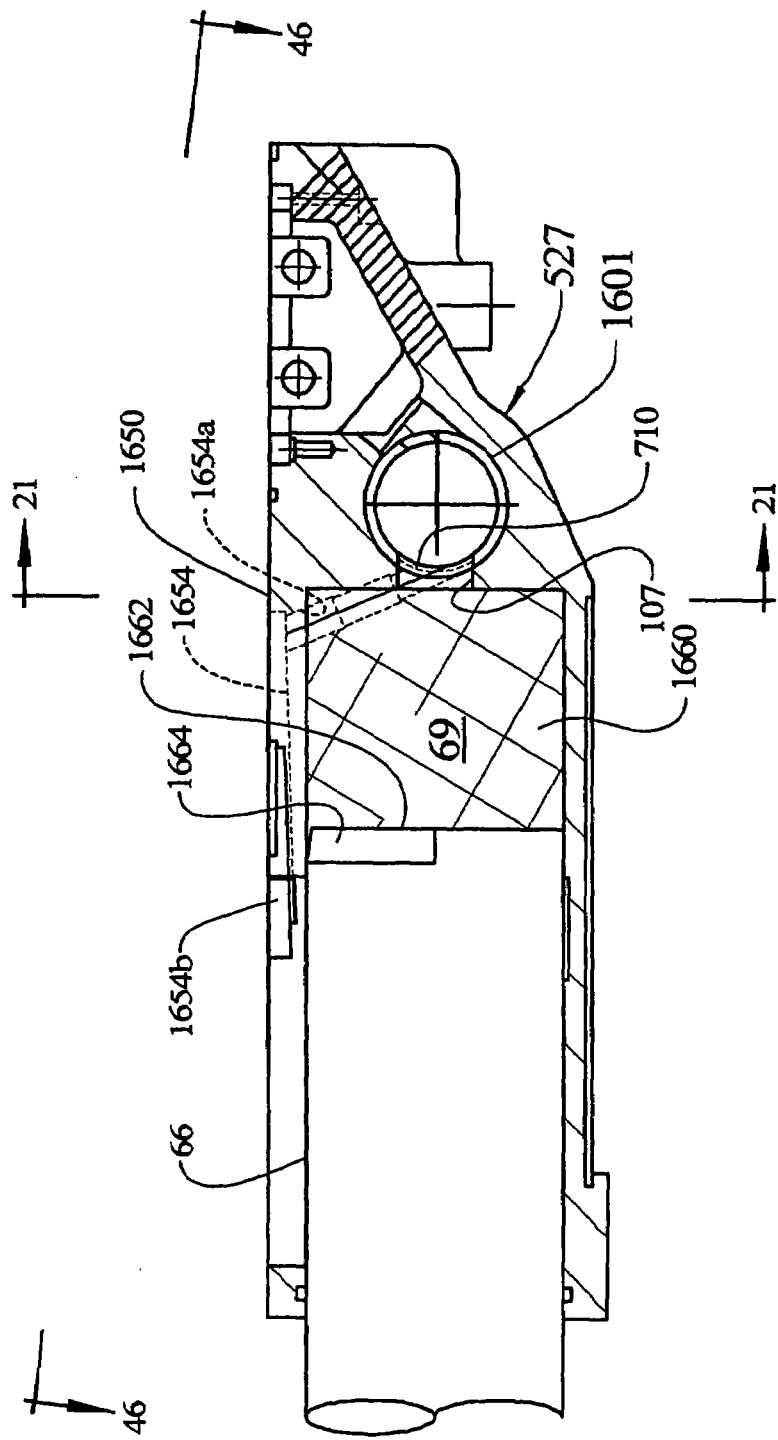
FIG. 47 is a sectional view taken generally along line 47-47 of FIG. 46.

As shown in FIG. 47, the first plunger 66 is in a position to begin a filling cycle of food material 660. A front face 1662 of the plunger 66 includes a beveled region 1664 around beveled approximately 180°, around a top edge of the plunger 66, constituting the upper portion of the circumference of the plunger 66. This bevel is approximately 15° and acts to hold the plunger 66 down given the pressure of the food material within the pump chamber.

The center groove 1654 on the top surface 1650 is shown dashed in FIG. 47. The center groove 1654 extends from the bore 1654a to an open area 1654b that is open to the hopper 25. The other grooves 1652, 1656 and bores 1652a, 1656a are similarly configured as that shown in FIG. 47 for groove 1654 and bore 1654a. These grooves 1652, 1656 have open areas 1652b, 1656b to the hopper 25.

FIG. 48-51 show the alternate tube valve 1601 in detail. The alternate tube valve 1601 is as described previously as the tube valve 101 except as herein distinguished. When the inlet port 107 is in registry with the pump chamber 69 there are three outlet ports 109a, 109b, 109c that are in registry with the openings 111a, 111b, 111c, to pass food material 660 to the molding mechanism 28.

As can be seen in FIG. 48, the outlet port 109a that is closest to the inlet port 107 has a smallest, most restrictive opening, the center outlet port 109b has a slightly greater opening, and the far outlet port 109c has the greatest opening. This progressive tube valve outlet opening arrangement, with the smallest outlet opening closest to the feeding inlet to the tube valve, assists in equalizing the food product pressure across the width of the manifold 27 and molding mechanism 28. A more even food product pressure allows for a more consistent density of molded products across a width of the mold plate.

As seen in FIG. 49, the tube valve is rotated so that the second inlet port 108 is in registry with the second pump cavity 89. The tube valve 1601 provides progressive openings 119a, 119b, 119c that are smallest near the inlet port 108 and largest at the opposite end of the tube valve 1601, in mirror image reversal of the openings 109a, 109b, 109c shown in FIG. 48. When the inlet port 108 is in registry with the pump chamber 89, the three outlet ports 119a, 119b, 119c are open to the openings 111a, 111b, 111c to pass food material 1660 to the molding mechanism 28. This progressive tube valve outlet opening arrangement, with the smallest outlet opening closest to the feeding inlet to the tube valve, assists in equalizing the food product pressure across the width of the manifold 27 and molding mechanism 28. A more even food product pressure allows for a more consistent density of molded products across a width of the mold plate.

It is also within the scope of the invention that the center ports 109b, 119b and 111b and 119b be eliminated and that just two outlet ports 109a, 109c and 119a, 119c and corresponding two inlet ports 111a, 111c be used. As described, the outlet ports 109c, 119c would be larger than the outlet ports 109a, 119a.

Figure 50:
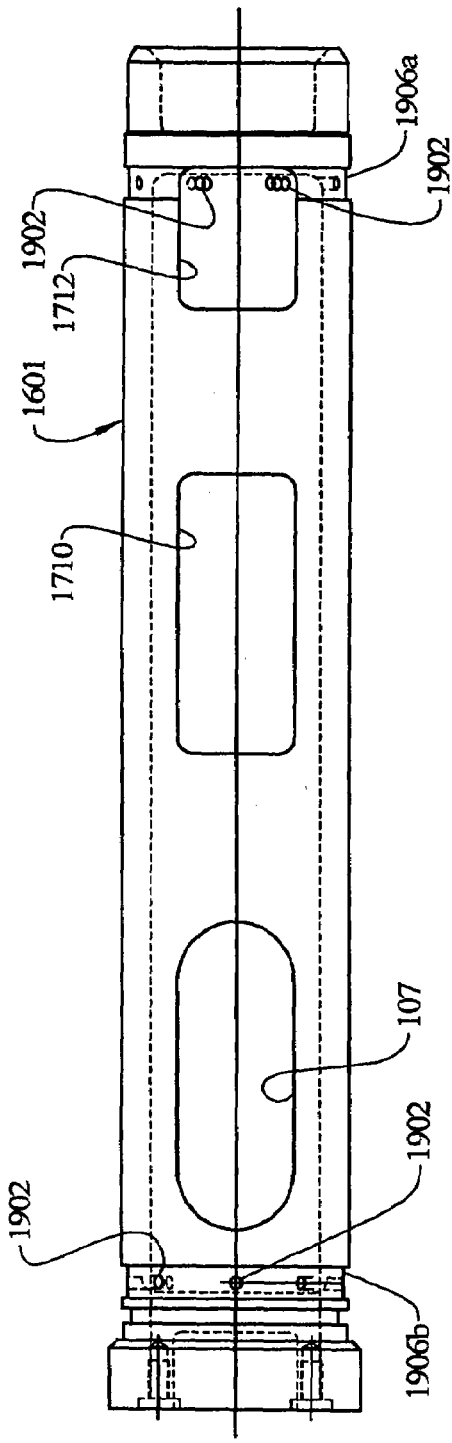
FIG. 50 is a plan view of the alternate embodiment tube valve of FIG. 49 in a third rotary position.

FIG. 50 illustrates the tube valve rotated so the inlet port 107 and two substantially rectangular surface depressions 1710, 1712 can be seen. The depressions 1710, 1712 have a constant radial depth (preferably about ³⁄₁₆" deep) from the cylindrical surface of the tube valve 1601. The center surface depression 1710 is slightly longer than the end surface depression 1712. When the first plunger 66 is in operation, pushing food product through the inlet port 107, the surface depressions 1710, 1712 are in flow communication with the bores 1652a, 1654a, and the grooves 1652, 1654.

Figure 51:
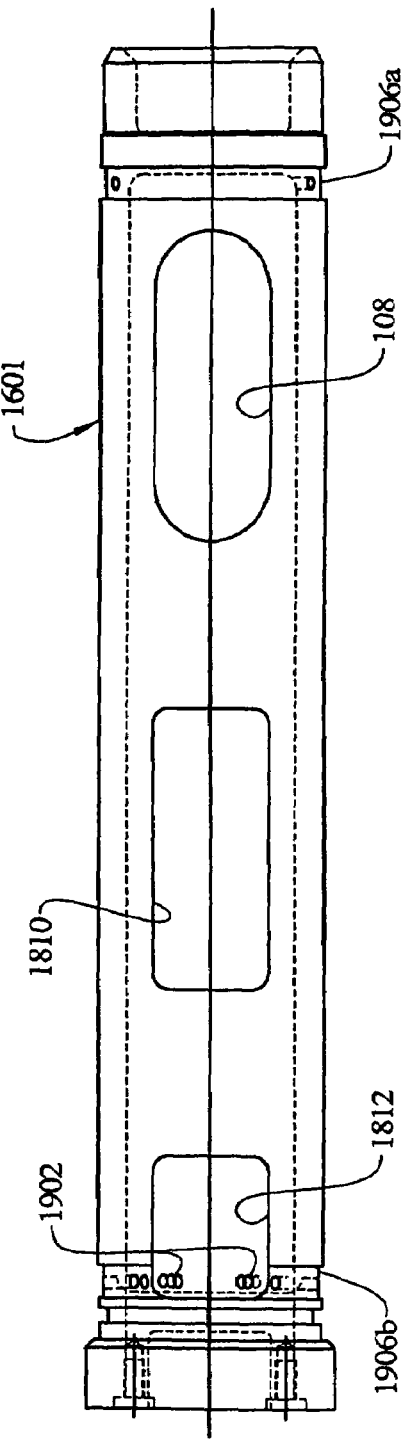
FIG. 51 is a plan view of the alternate embodiment tube valve of FIG. 49 in a fourth rotary position.

FIG. 51 illustrates the tube valve rotated so the inlet port 108 and two substantially rectangular surface depressions 1810, 1812 can be seen. The depressions 1810, 1812 have a constant radial depth (preferably about ³⁄₁₆" deep) from the cylindrical surface of the tube valve 1601. The center surface depression 1810 is slightly longer than the end surface depression 1812. When the second plunger 68 is operating, pushing food product through the inlet port 108, the surface depressions 1810, 1812 are in flow communication with the bores 1654a, 1656a, and the grooves 1654, 1656.

Figure 52:
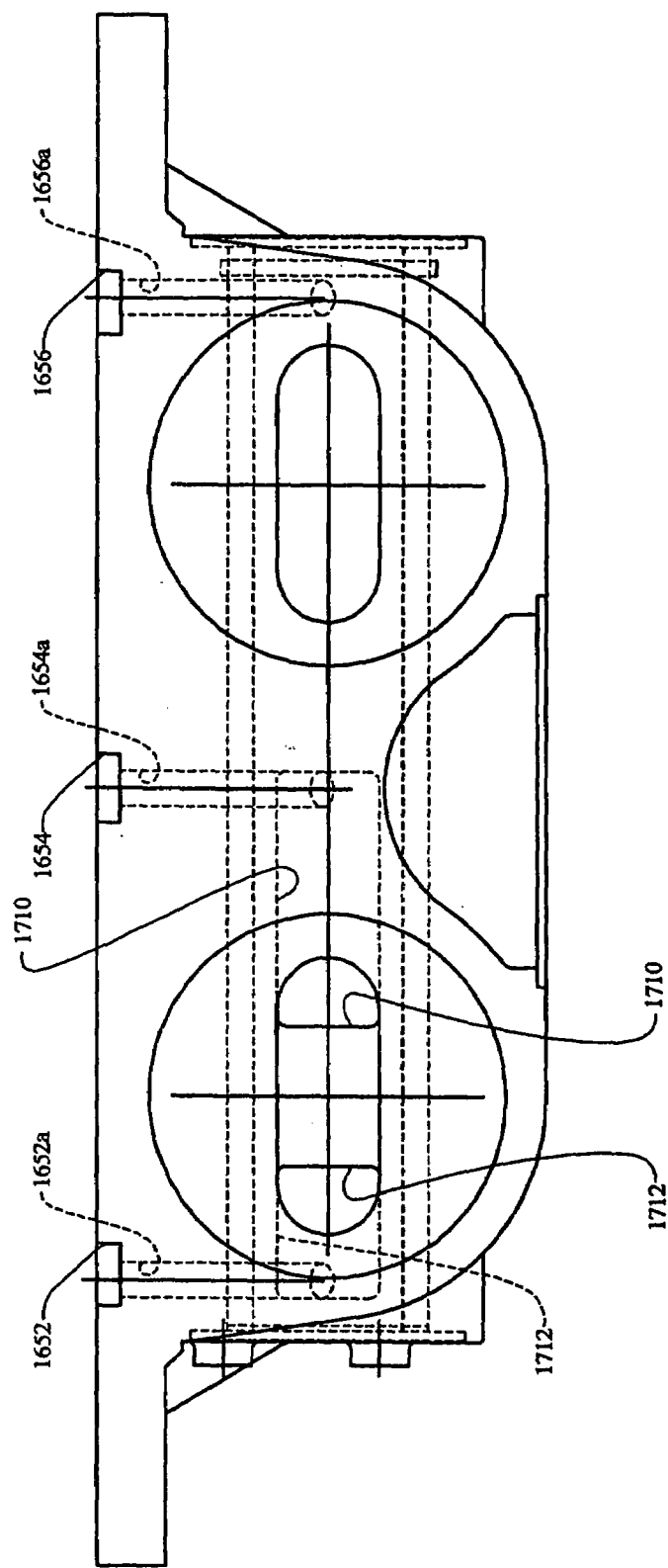
FIG. 52 is a sectional view taken generally along line 52-52 of FIG. 46.

FIG. 52 shows the configuration of the tube valve 1601 when the inlet port 107 is used. Rectangular recesses 1710, 1712, communicate with the bores 1652a, 1654a and the grooves 1652, 1654 to vent air to the hopper.

When reloading the pump box with product, the following occurs. For example, when reloading the pump cavity 89 for plunger 68, the plunger 68 retracts and the feed screws rotate. The combination of the vacuum created by the plunger 68 withdrawing from the pumping chamber, and the turning screws, forces food product in front of the plunger 68. The plunger is then advanced into the chamber 89 to initially compress the food product before filling begins. As the plunger 68 advances to the pump chamber 89, there will be air inter-mixed with food product. This air must be removed before the plunger 68 starts its mold plate cavity-filling cycle.

The plunger 68 advances to compress the reloaded product, while the plunger 66 continues to feed food product through the full open port 107 in the tube valve 601. The tube valve 601 is blocking the plunger 68 from feeding the food product into the manifold 527; however the grooves 1710, 1712 communicate with bores 1652a, 1654a in the pump box or manifold 527. Grooves 1652, 1654 on the manifold and pump housing top surface 1650 allow air (but not product) from the pump chamber 89 to escape back to the hopper, during initial compression of the food product within the pump chamber 89 against the tube valve 1601.

The process alternates with the tube valve rotational shift of about 70 degrees, to change the active plunger 66, 68.

As a further feature of the invention, a plurality of breather holes 1902 are provided at each longitudinal end of the tube valve, through the tube valve wall. The breather holes 1902 are in communication with an inside of the tube valve and to an outside circumferential groove 1906a, 1906b respectively that is in communication with the depressions 1712, 1812 respectively. Thus, air trapped at either end within the tube valve can be expressed back to the collection area, the hopper, via the breather holes 1902, the grooves 1906a, 1906b and the depressions 1712, 1812.

Molding Mechanism

Figure 9A:
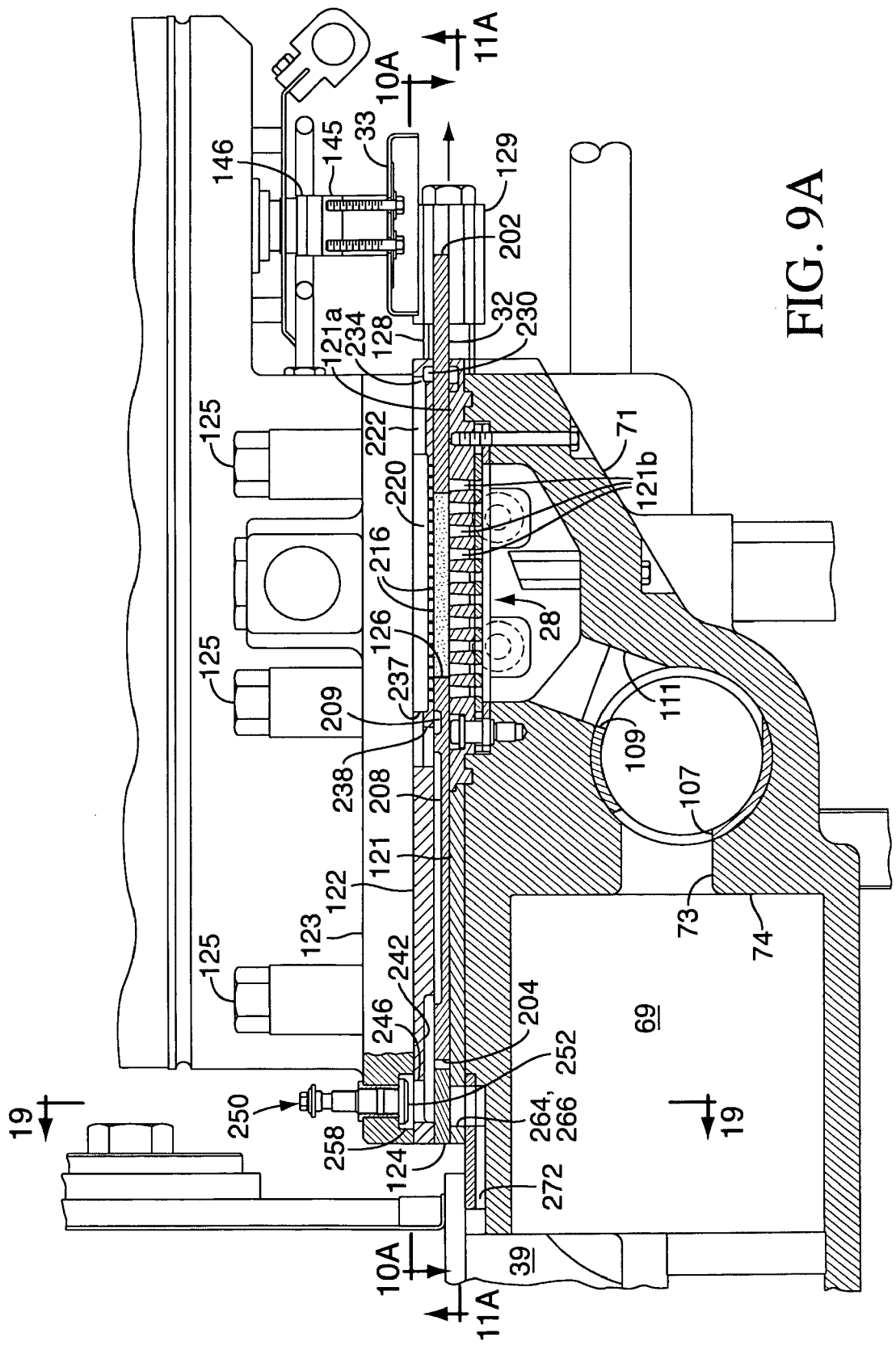

As best illustrated in FIG. 9A, the upper surface of the housing 71 that encloses the pump cavities 69 and 89 and the manifold 27 carries a support plate or wear plate 121 and a fill plate 121a that forms a flat, smooth mold plate support surface. The mold support plate 121 and the fill plate 121a may be fabricated as two plates as shown, or a single plate bolted to or otherwise fixedly mounted upon housing 71. The fill plate 121a includes apertures or slots that form the upper portion of the manifold outlet passage 111. In the apparatus illustrated, a multi fill orifice type fill plate 121a is utilized. A simple slotted fill plate is also encompassed by the invention.

Mold plate 32 is supported upon plates 121, 121a. Mold plate 32 includes a plurality of individual mold cavities 126 extending across the width of the mold plate and alignable with the manifold outlet passageway 111. Although a single row of cavities is shown, it is also encompassed by the invention to provide plural rows of cavities, stacked in aligned columns or in staggered columns. A cover plate 122 is disposed immediately above mold plate 32, closing off the top of each of the mold cavities 126. A mold cover casting or housing 123 is mounted upon cover plate 122. The spacing between cover plate 122 and support plate 121 is maintained equal to the thickness of mold plate 32 by support spacers 124 mounted upon support plate 121. Cover plate 122 rests upon spacers 124 when the molding mechanism is assembled for operation. Cover plate 122 and mold cover 123 are held in place by six mounting bolts, or nuts tightened on studs, 125.

Figure 3:
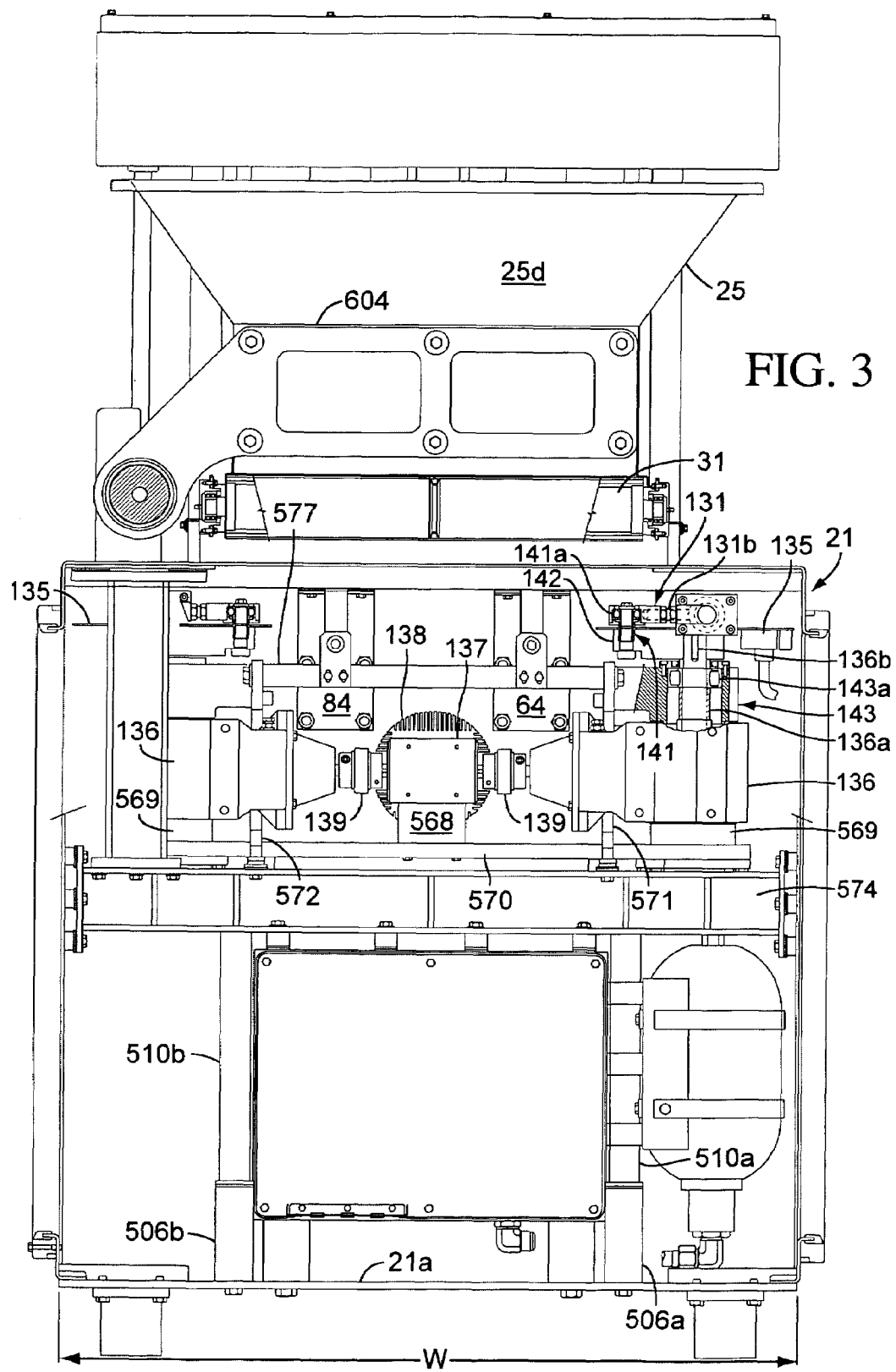
FIG. 3 is a sectional view taken generally along line 3-3 of FIG. 2, with components and/or panels removed for clarity.
Figure 53:
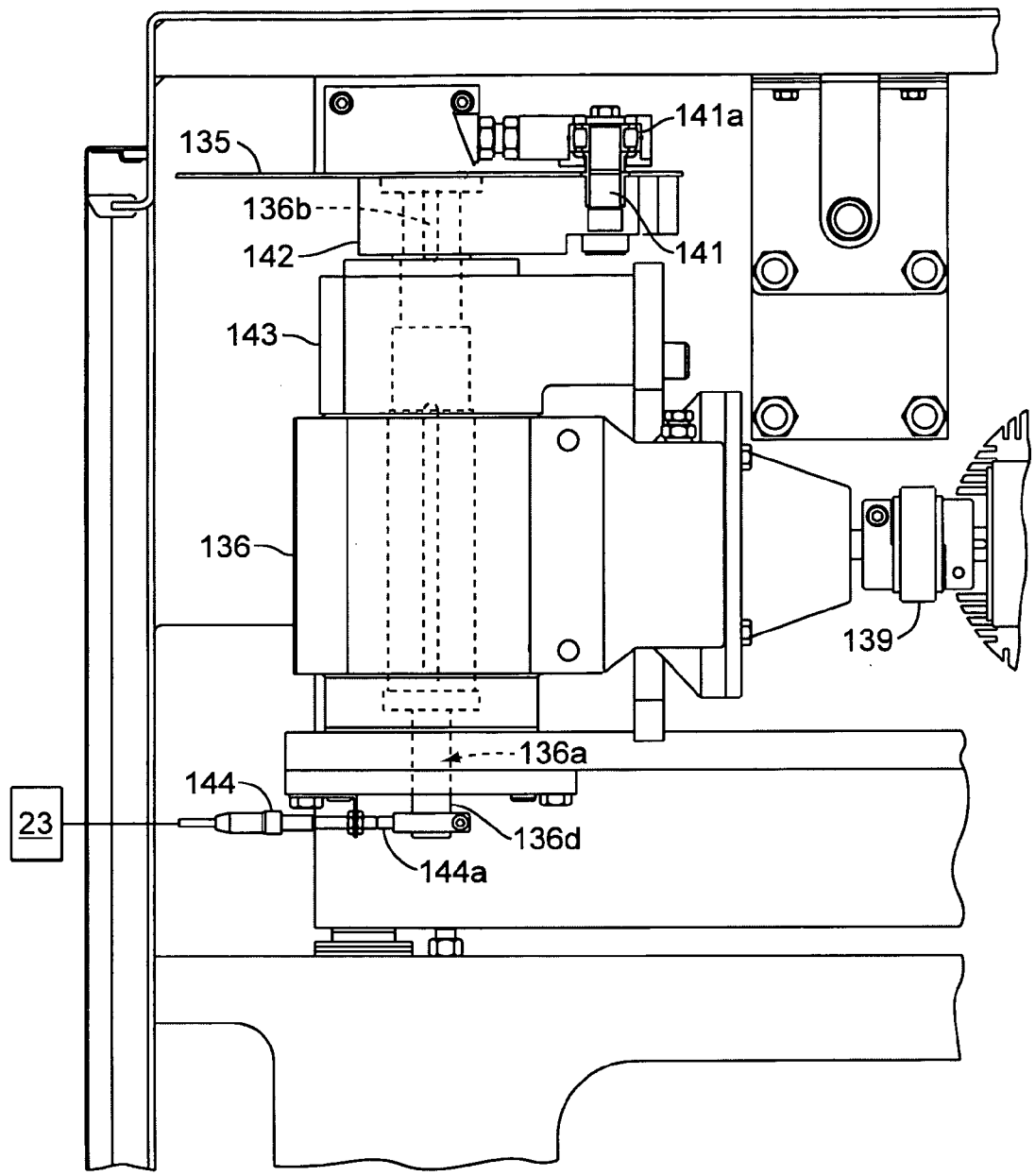
FIG. 53 is a sectional view taken generally along line 53-53 of FIG. 6.

As best illustrated in FIGS. 3, 6, and 53 mold plate 32 is connected to drive rods 128 that extend alongside housing 71 and are connected at one end to a transverse bar 129. The other end of each drive rod 128 is pivotally connected to a connecting link 131 via a coupling plate 131a and a pivot connection 131c, shown in FIG. 29. The pivot connection 131c can include a bearing (not visible in the figures) surrounding a pin 131d within an apertured end 131e of the connecting link 131. The pin 131d includes a cap, or carries a threaded nut, on each opposite end to secure the crank arm to the coupling plate 131a.

Each drive rod 128 is carried within a guide tube 132 that is fixed between a wall 134 and a front bearing housing 133. The connecting links 131 are each pivotally connected to a crank arm 142 via a pin 141 that is journalled by a bearing 141a that is fit within an end portion of the connecting link 131. The pin crank arm 142 is fixed to, and rotates with, a circular guard plate 135. The pin 141 has a cap, or carries a threaded nut, on each opposite end that axially fixes the connecting link 131 to the crank arm 142 and the circular guard plate 135. The connecting link 131 also includes a threaded portion 131b to finely adjust the connecting link length.

The crank arms 142 are each driven by a right angle gear box 136 via a "T" gear box 137 having one input that is driven by a precise position controlled motor 138 and two outputs to the gearboxes 136. The "T" gear box 137 and the right angle gear boxes 136 are configured such that the crank arms 142 rotate in opposite directions at the same rotary speed.

The precise position controlled motor can be a 6-7.5 HP totally enclosed fan cooled servo motor. The servo motor is provided with two modules: a power amplifier that drives the servo motor, and a servo controller that communicates precise position information to the machine controller 23.

The controller 23 and the servo motor 138 are preferably configured such that the servo motor rotates in an opposite rotary direction every cycle, i.e., clockwise during one cycle, counterclockwise the next cycle, clockwise the next cycle, etc.

A bearing housing 143 is supported on each gearbox 136 and includes a rotary bearing 143a therein to journal an output shaft 136a of the gear box 136. The output shaft 136a is fixed to the crank arm 142 by a clamp arrangement formed by legs of the crank arm 142 that surround the output shaft and have fasteners that draw the legs together to clamp the output shaft between the legs (not shown), and a longitudinal key (not shown) fit into a keyway 136b on the output shaft and a corresponding keyway in the crank arm 142 (not shown).

A tie bar 139 is connected between the rods 128 to ensure a parallel reciprocation of the rods 128. As the crank arms 142 rotate in opposite rotational directions, the outward centrifugal force caused by the rotation of the crank arms 142 and the eccentric weight of the attached links 131 cancels, and separation force is taken up by tension in the tie bar 139.

One circular guard plate 135 is fastened on top of each crank arm 142. The pin 141 can act as a shear pin. If the mold plate should strike a hard obstruction, the shear pin can shear by force of the crank arm 142. The guard plate 135 prevents an end of the link 131 from dropping into the path of the crank arm 142.

The drive mechanism of the mold plate is easily reconfigured to change stroke length of different mold plates. For example, 6, 7, 8, 9, 10 or 11 inch stroke lengths are practically achievable with the apparatus by changing parts, such as the parts 131, 135, 142.

FIG. 53 illustrates a proximity sensor 144 in communication with the machine control. A target 144a is clamped onto an extension 136d of the rotating shaft 136a. The proximity sensor 144 communicates to the controller 23 that the crank arm 142 is at a particular rotary position corresponding to the mold plate 32 being at a preselected position. Preferably, the proximity sensor 144 can be arranged to signal to the controller that the crank arm 142 is in the most forward position, corresponding to the mold plate 32 being in the knockout position. The signal confirms to the controller that the knockout cups 33 can be safely lowered to discharge patties, without interfering with the mold plate 32.

During a molding operation, the molding mechanism 28 is assembled as shown in FIGS. 2 and 9A, with cover plate 122 tightly clamped onto spacers 124.

Figure 9B:
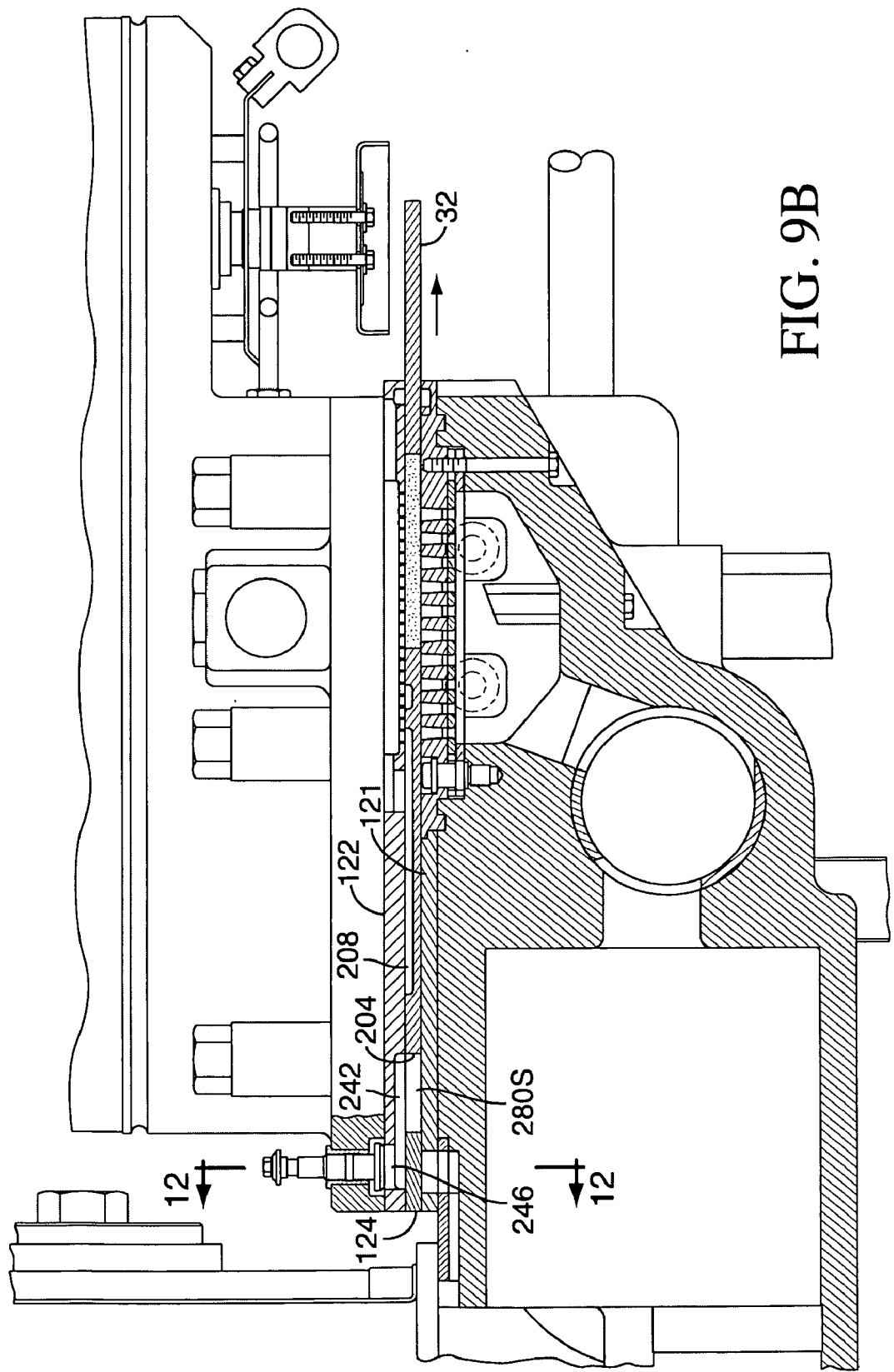
Figure 9D:
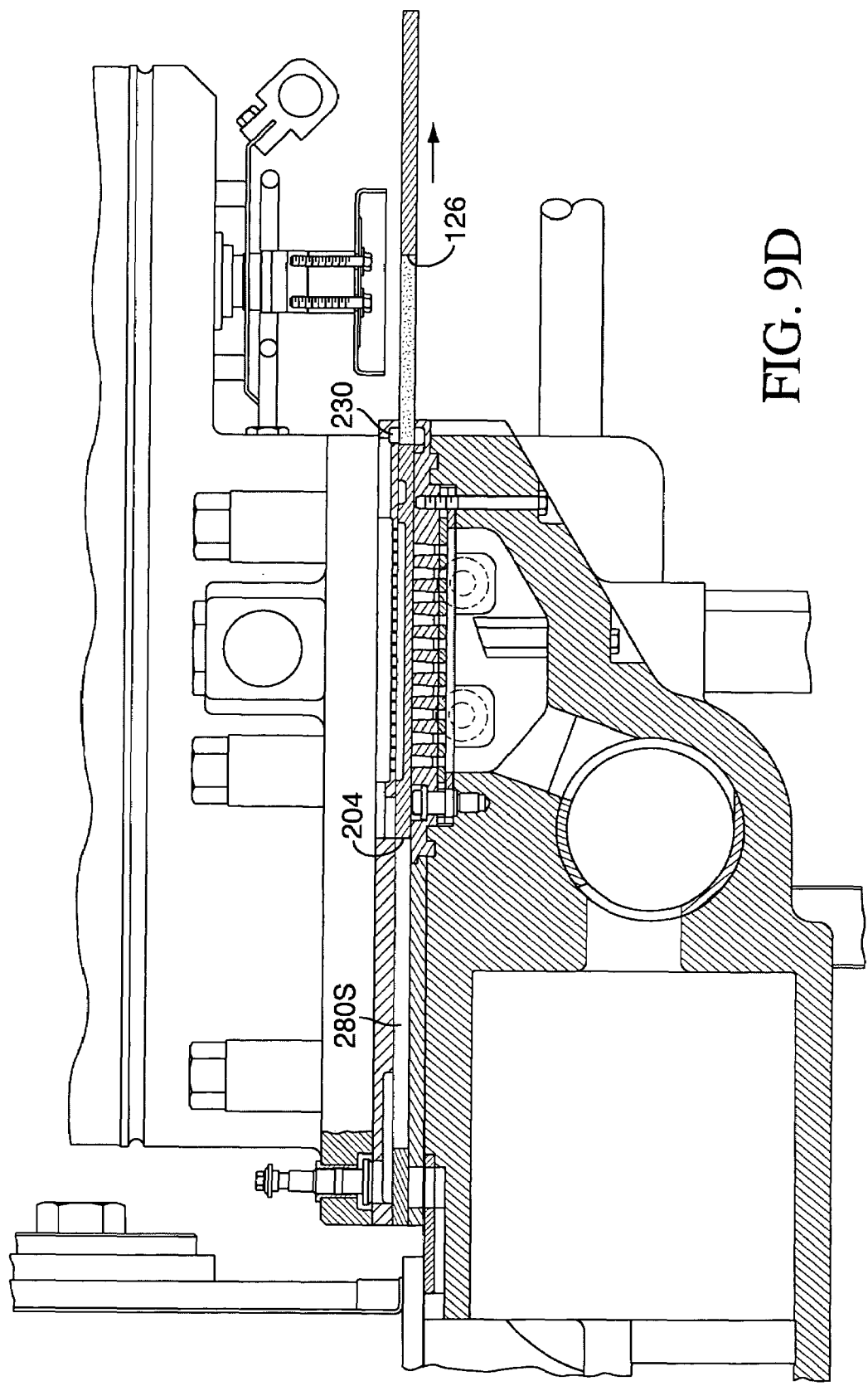
Figure 9F:
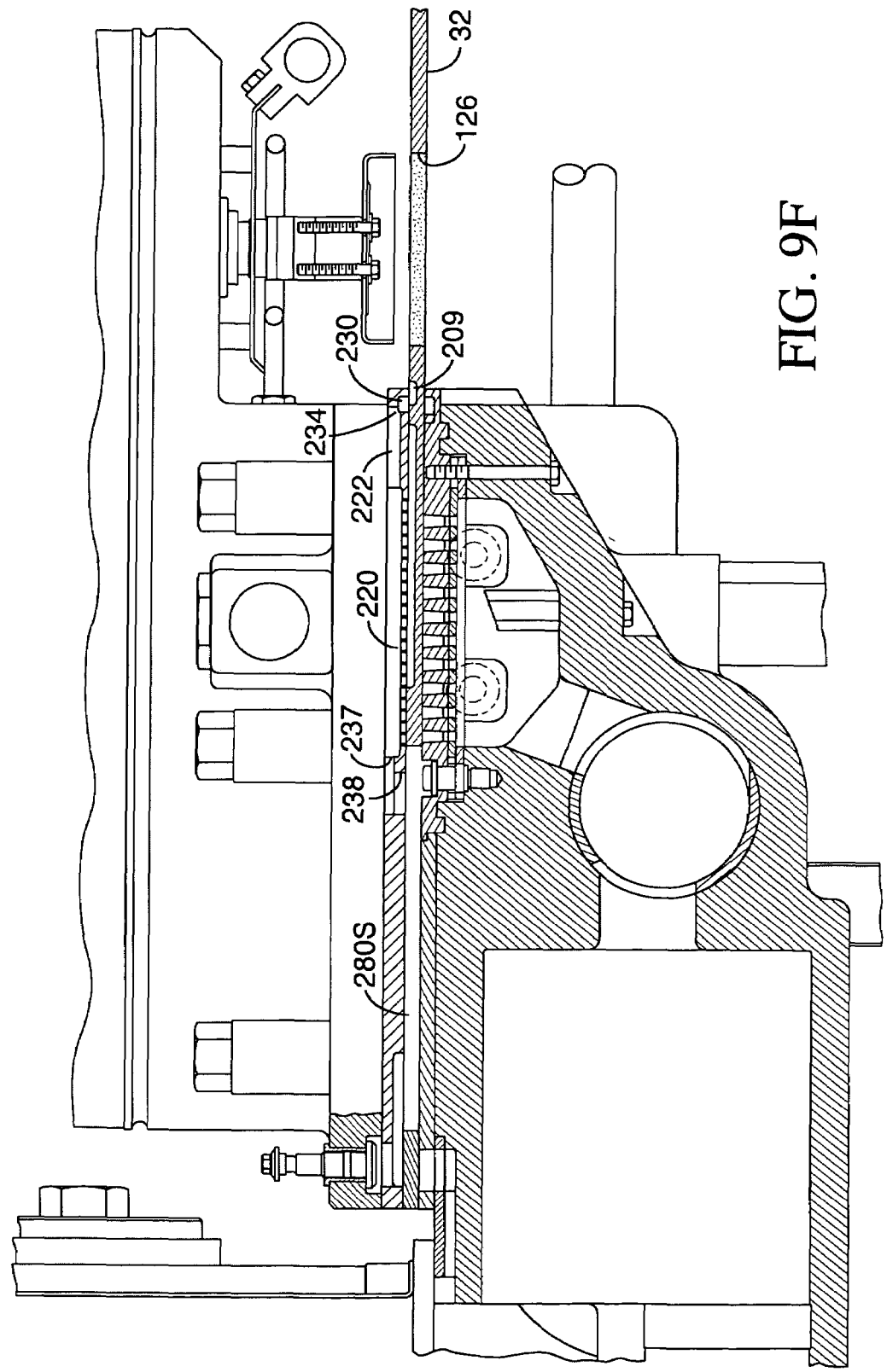

In each cycle of operation, knockout cups 33 are first withdrawn to the elevated position as shown in FIG. 9F. The drive for mold plate 32 then slides the mold plate from the full extended position to the mold filling position illustrated in FIGS. 2 and 9A, with the mold cavities 126 aligned with passageway 111.

During most of each cycle of operation of mold plate 32, the knockout mechanism remains in the elevated position, shown in FIG. 9A, with knockout cups 33 clear of mold plate 32. When mold plate 32 reaches its extended discharge position as shown in FIG. 9F the knockout cups 33 are driven downward to discharge the patties from the mold cavities.

The discharged patties may be picked up by the conveyor 29 or may be accumulated in a stacker. If desired, the discharged patties may be interleaved with paper, by an appropriate paper interleaving device. Such a device is disclosed in U.S. Pat. No. 3,952,478, or U.S. Ser. No. 60/540,022, filed on Jan. 27, 2004, both incorporated herein by reference. In fact, machine 20 may be used with a wide variety of secondary equipment, including steak folders, bird rollers, and other such equipment.

By using a servo motor to drive the mold plate, the mold plate motion can be precisely controlled. The motion can have a fully programmable dwell, fill time, and advance and retract speeds.

FIG. 59 illustrates one motion profile P1 for the movement of the mold plate 32 that is precisely controlled by the servomotor 138 and controller 23. The mold plate position (any point on the mold plate) is shown as a function of time between the most retracted position, the fill position, and the forward most extended position, the knockout position. The profile P1 of FIG. 59 shows a rather sharp turn around at the fill position, with little or no mold plate stopping, or dwell period. At the knockout position, there is a dwell period to allow the knockout cups to descend into the mold plate cavities to displace the formed patties from the cavities.

On the same graph a knockout cup movement profile P2 is depicted, wherein the knockout cups are lowered and raised during a segment of time t1 that is within the dwell period of the mold plate stopped in the knockout position.

FIGS. 60-63 illustrate one cycle of different mold plate motion profiles that can be programmed by the controller 23 and the drive for the servomotor 138. The profile P3 in FIG. 60 is appropriate for a mold plate stroke speed of 100 cycles/minute and a knockout dwell period of 0.088 seconds. The profile P3 shows little or no filling dwell period; adequate filling can occur during retraction and/or advancement of the mold plate before and after the fill position. The profile would be for a food product material that is soft, easily flowable, and possibly warm.

FIG. 61 illustrates a profile P4 that is appropriate for a mold plate stroke speed of 100 cycles/minute and a cold, stiff or viscous product that requires a dwell period at the fill position to adequately fill the cavities.

FIG. 62 illustrates a profile P5 appropriate for easily flowable food product and a mold plate stroke speed of 120 cycles/minute.

FIG. 63 illustrates a profile P6 appropriate for viscous product that requires a dwell period at the fill position to adequately fill the cavities, and a mold plate stroke speed of 120 cycles/minute.

All of the profiles P3-P6 are for a 9 inch mold plate stroke length and allow for a 0.088 second knockout period. The different motion profiles for mold plate movements illustrated in FIG. 31-34 can be selected by an operator via the input screen 19 and the controller 23.

Lubricating Oil System

Figure 34:
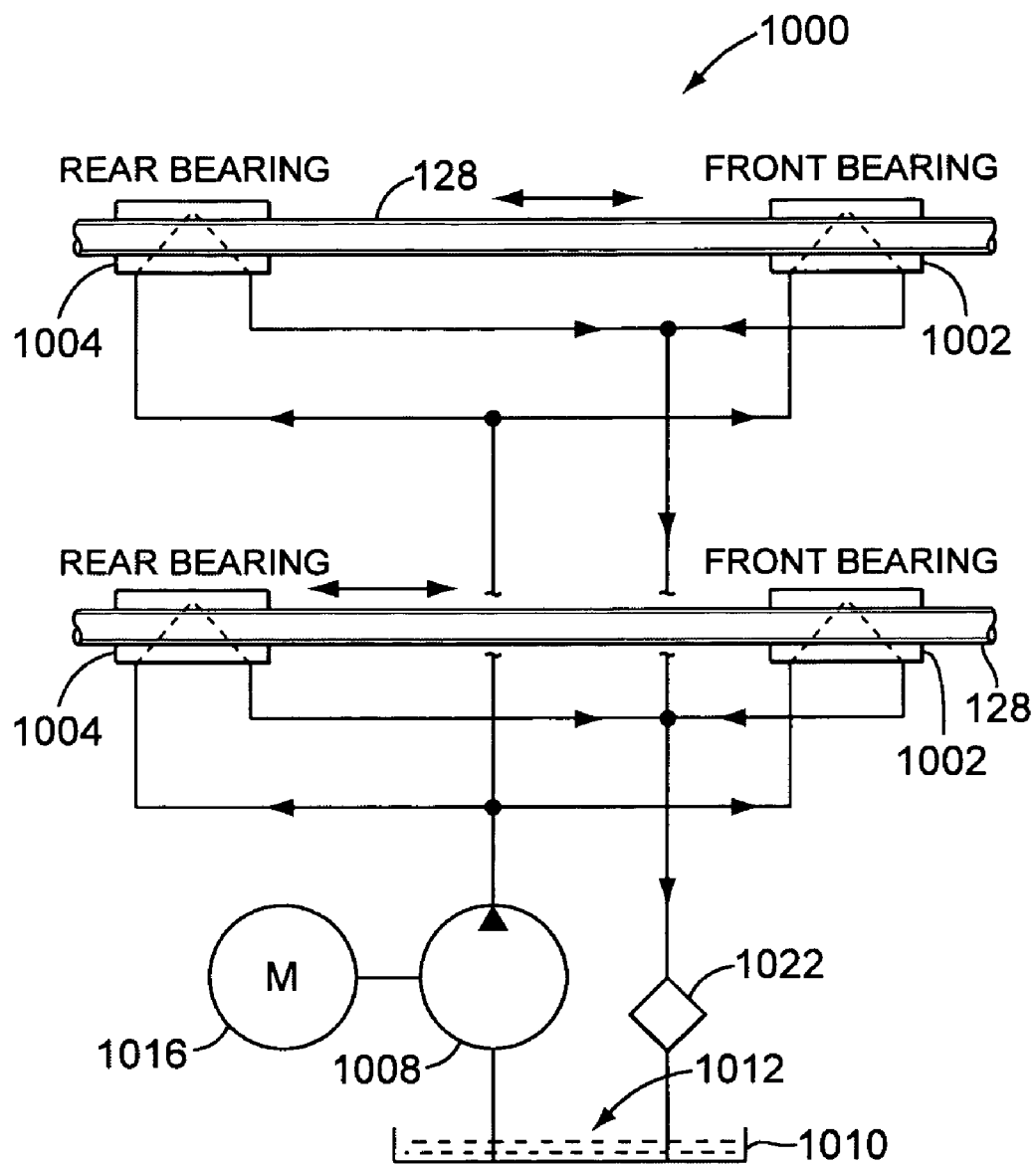
FIG. 34 is a diagrammatic view of a lube oil system of the invention.

FIG. 34 illustrates a mold drive rod lubricating system 1000 incorporated into the apparatus 20. The lubrication system 1000 includes front bearings 1002 and rear bearings 1002 for each drive rod 128. The location of the bearings is shown in FIG. 6.

A pump 1008 takes suction from reservoir 1010 holding lubricating oil 1012. A motor 1016 being either an electric, hydraulic, pneumatic or other type motor, drives the pump. The pump circulates lubricating oil through tubing and/or passages through the machine base area to the bearings 1002, 1004 and returns the lubricating oil through a filter 1022 to the reservoir. The pump, motor, reservoir and filter are all located within the machine base 21.

Figure 35:
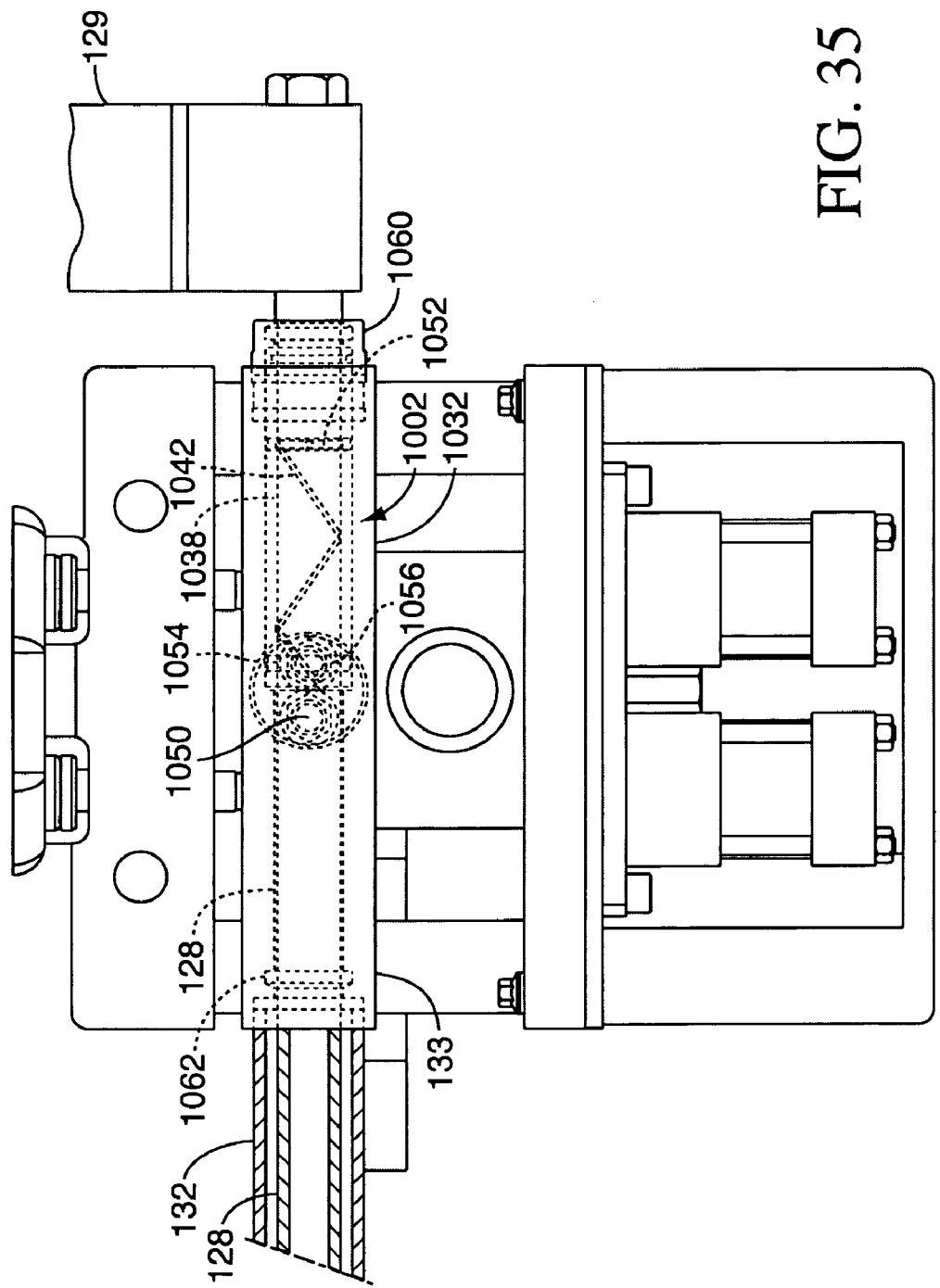
FIG. 35 is an enlarged fragmentary sectional view taken from the right side of FIG. 6.

FIG. 35 illustrates a front bearing 1002. The other front bearing and the rear bearings 1004 are configured in substantially identical manner. The front bearing 1002 includes a housing 1032 having an internal bore 1036 for holding a sleeve bearing element 1038. The sleeve bearing element 1038 has an inside surface sized to guide the drive rod 128 and has a helical groove 1042 facing and surrounding the drive rod 128. An oil inlet port 1050 communicates lubricating oil into an open end of the helical groove. Lubricating oil proceeds through the helical groove to an opposite end of the bearing element 1038 to a first outlet groove 1052 in communication with a second outlet groove 1054 through a longitudinal channel (not shown). The second outlet groove 1054 is in communication with an outlet port 1056. The inlet port 1050 is in fluid communication with the pump 1008 and the outlet port 1056 is in fluid communication with the oil return lines to the filter 1022. A front seal 1060 and a rear seal 1062 retain oil within the housing 1032.

Knock Out System

Molding mechanism 28 further comprises a knockout apparatus 140 shown in FIGS. 2, 9A, 13-14, and 54A-54B. The knockout apparatus comprises the knockout cups 33, which are fixed to a carrier bar 145. Knockout cups 33 are coordinated in number and size to the mold cavities 126 in mold plate 32. One knockout cup 33 aligned with each mold cavity 126. The mold cavity size is somewhat greater than the size of an individual knockout cup.

The knockout apparatus 140 is configured to drive the carrier bar 145 in timed vertical reciprocation.

FIGS. 13-14, and 54A-54B illustrate the knockout apparatus 140 in more detail. The carrier bar 145 is fastened to knockout support brackets 146a, 146b. The knockout support brackets 146a, 146b are mounted to two knockout rods 147. Each knockout rod 147 penetrates through a sidewall of a housing 148 and is connected to a knockout beam 149.

The knockout beam 149 is pivotally mounted to a crank rod 151 that is pivotally connected to a fastener pin 156 that is eccentrically connected to a crank hub 155 that is driven by a motor 157.

The motor 157 is preferably a precise position controlled motor, such as a servo motor. An exemplary servomotor for this application is a 3000 RPM, 2.6 kW servo motor provided with a brake. The servo motor is provided with two modules: a power amplifier that drives the servo motor, and a servo controller that communicates precise position information to the machine controller 23.

The controller 23 and the motor 157 are preferably configured such that the motor rotates in an opposite direction every cycle, i.e., clockwise during one cycle, counter-clockwise the next cycle, clockwise the next cycle, etc.

A heating element 160 surrounds, and is slightly elevated from the knockout carrier bar 145. A reflector 161 is mounted above the heating element 160. The heating element heats the knock out cups to a pre-selected temperature, which assists in preventing food product from sticking to the knock out cups.

Figure 13:
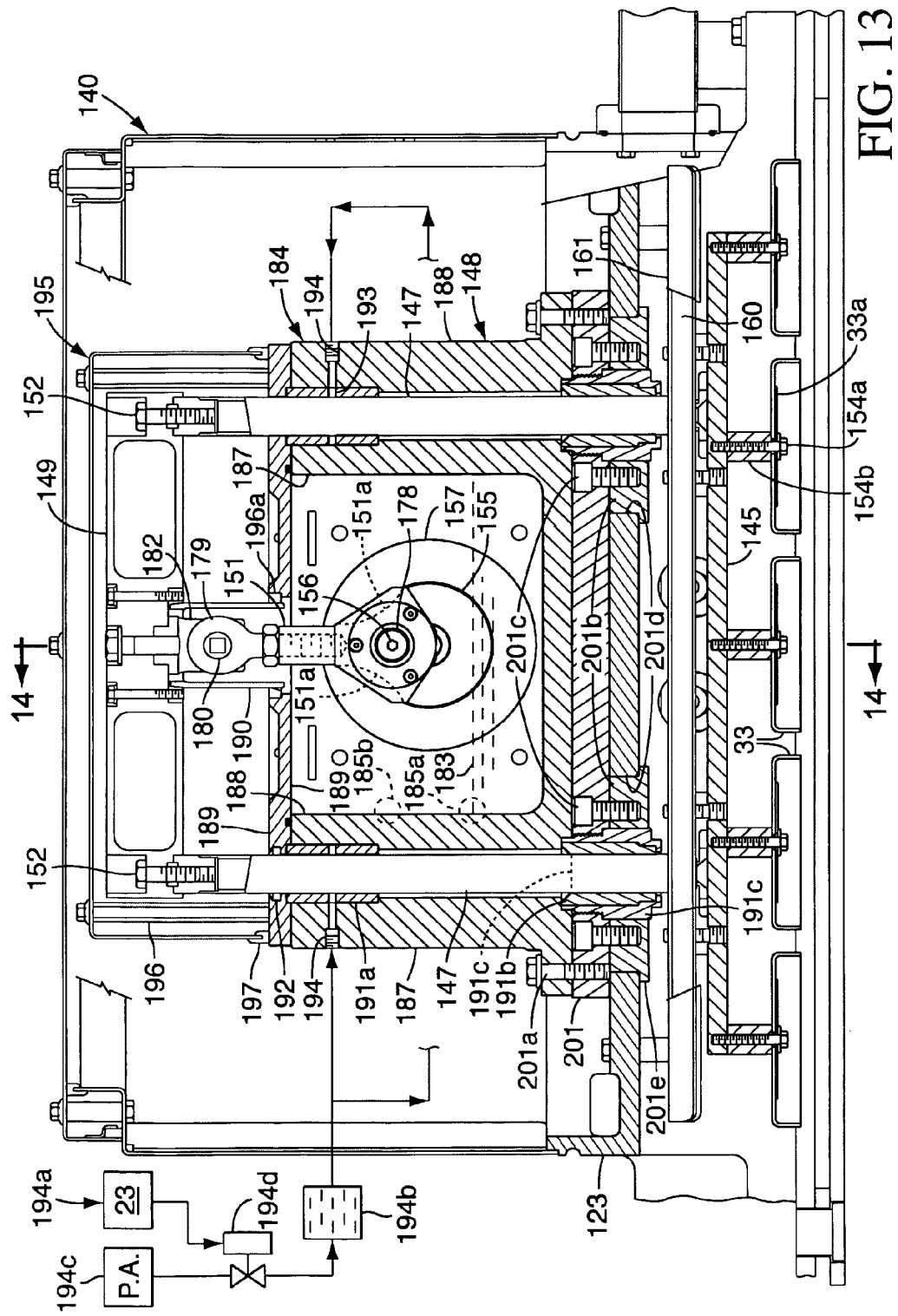
FIG. 13 is an enlarged fragmentary sectional view taken generally along line 13-13 of FIG. 2.

In FIGS. 13-14 the crank hub 155 is rotated into a position wherein the crank rod 151 is vertically oriented and the knockout beam 149 is lifted to its maximum elevation. The knockout rods are fastened to the knockout beam 149 by fasteners 152. The knockout support brackets 146a, 146b are in turn fastened to the knockout rods 147 by fasteners 153. Each knockout cup 33 is fastened to the knockout carrier bar by a pair of fasteners 154a and spacers 154b. An air flap or air check valve 33a can be provided within each cup to assist in dispensing of a meat patty from the cup 33.

As shown in FIG. 14, the motor 157 is supported by a bracket 170 from a frame member 172 that is mounted to the mold cover casting 123. The bracket 170 includes one or more slotted holes, elongated in the longitudinal direction (not shown). One or more fasteners 173 penetrate each slotted hole and adjustably fix the motor 157 to the frame member. The motor 157 includes an output shaft 176 that is keyed to a base end of the crank hub 155. The fastener pin 156 retains a roller bearing 178 thereon to provide a low friction rotary connection between an annular base end 151a of the crank rod 151 and the pin 156.

The crank rod 151 has an apertured end portion 179 on an upper distal end 151b opposite the base end 151a. The apertured end portion 179 is held by a fastener pin assembly 180 through its aperture to a yoke 182. The yoke 182 is fastened to the knockout beam 149 using fasteners. The crank rod 151 is length adjustable. The fastener pin assembly 180 can include a roller or sleeve bearing (not shown) in like fashion as that used with the fastener pin 156 to provide a reduced friction pivot connection.

The housing 148 is a substantially sealed housing that provides an oil bath. Preferably, the housing walls and floor is formed as a cast aluminum part. The crank hub 155, the pin 156, roller bearing 178, the apertured end portion 179, the fastener pin 180 and the yoke 182 are all contained within the oil bath having an oil level 183. The limits of the oil bath are defined by a housing 184 having a front wall 185, a rear wall 186, side walls 187, 188, a top wall 189 and a sleeve 190. The sleeve 190 is a square tube that surrounds a substantial portion of the crank rod 151 and is sealed around its perimeter to the top wall 189 by a seal element 196a. The sleeve 190 is connected to the beam 149 and penetrates below the top wall 189. As the yoke 182 reciprocates vertically, the beam 149 and the sleeve 190 reciprocate vertically, the sleeve 190 maintaining a sealed integrity of the oil bath.

The crank rod 151 includes side dished areas 151a that act to scoop and propel oil upward during rotation of the hub 155 to lubricate the pin 180 and surrounding areas.

The knockout rods 147 are guided to reciprocate through the side walls 187, 188, particularly, through upper and lower bearings 191a, 191b. The rods 147 are sealed to the top wall by seals 192. The bearings 191a can include an internal groove 193 that is in flow-communication with a lubricant supply through port 194.

A lubricant system 194a is provided to provide lubricant to the bearings 191a, 191b. The system 194a includes a lubricant reservoir 194b that is filled with lubricant, such as oil, and connected to plant air 194c via an electronically controlled valve 194d. The machine controller 23 periodically, according to a preset routine, actuates the valve 194d to propel some lubricant into the bearings 191a. Lubricant can run down the knockout rod 147 into a dished top 191c of the lower bearings 191b to allow oil to penetrate between the knockout rods 147 and the lower bearings 191b.

An outer cover 195 is fastened and sealed around the side walls 187, 188 and front and rear walls 185, 186 by fasteners, spacers 196 and a seal 197. Any lubricating oil that passes through the seal can be returned to the oil bath via dished out drain areas and drain ports through the top wall.

The front wall 185 includes an oil level sight glass 185a, a fill port 185b (shown dashed in FIG. 13), a drain port 185c (FIG. 14); and an access hole closed by a screw 185d (FIG. 14).

The crank hub 155 is journaled for rotation by two roller bearings 198, 199. The roller bearings 198, 199 are supported by a collar assembly 200 bolted to the rear wall 186 and to the motor 157.

The housing 148 is fastened to a support plate 201 by fasteners 201a. The support plate 201 is fastened to circular adapter plates 201b by fasteners 201c. The circular adapter plates 201b are removably fit into circular holes 201d in the casting 123. The circular adapter plates 201b include a bottom flange 201e which abuts the casting 123. The circular adapter plates 201b surround the bearings 191b and associated bearing assembly 191c.

Figure 13A:
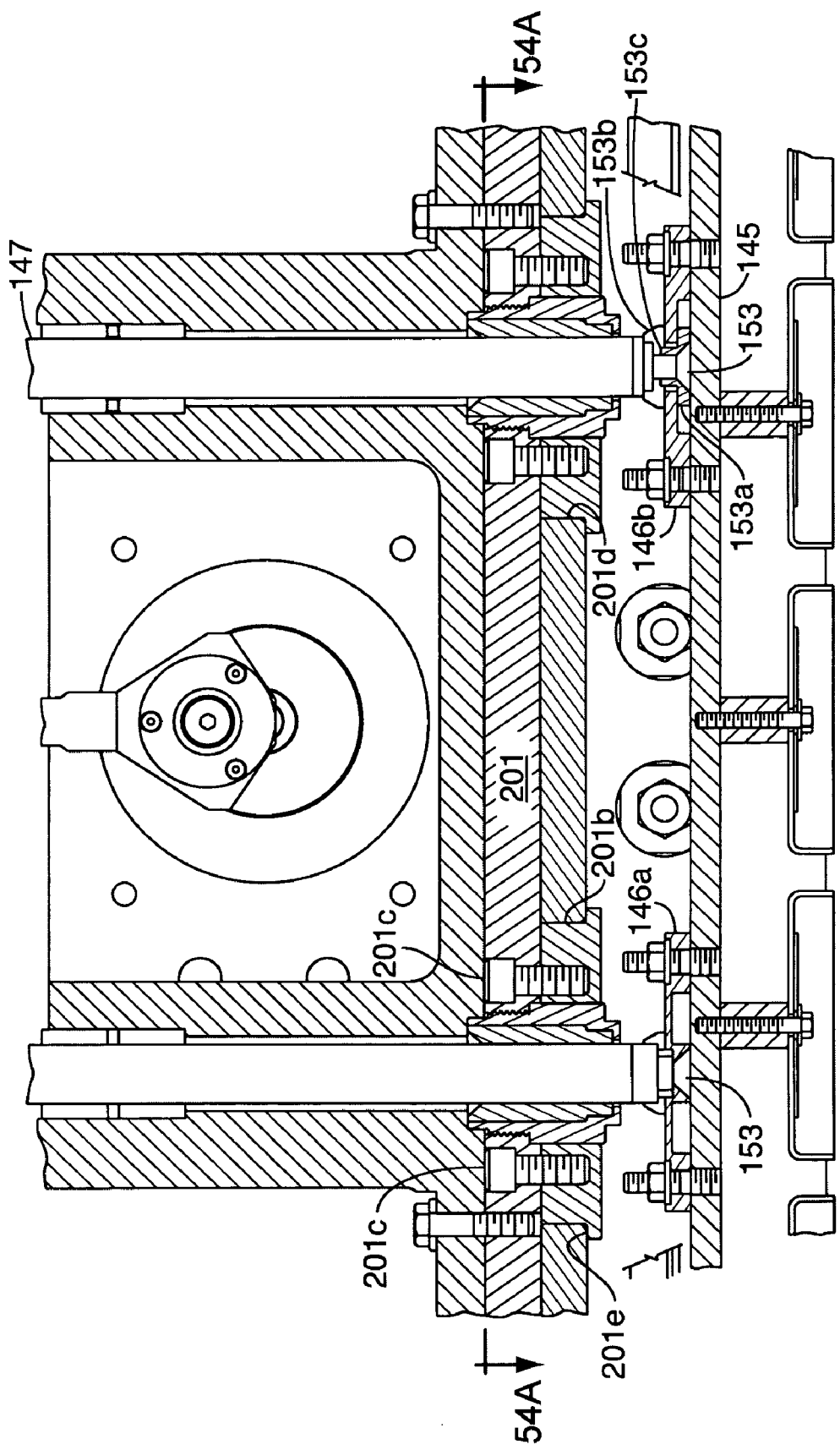
FIG. 13A is a fragmentary sectional view taken from FIG. 13, with components removed for clarity.

As shown in FIG. 13A, the left bracket 146a is fixedly connected to the left knockout rod 147 using the fastener 153 while the right bracket 146b is connected for a sliding connection. In this regard the right fastener 153 passes through an inverted T-nut 153a that passes through the bracket 146b and fits into a back up washer 153b that abuts the top side of the bracket 146b. The bracket 146b includes an oversized opening in the lateral direction that allows the bracket 146b to shift laterally with respect to the T-nut and knockout rod 147. This arrangement allows the bar 145 to expand and contract laterally with respect to the knockout rods 147. When the knockout cups 33 are heated by the heating element 160, the carrier bar 145 can become heated as well. Preferably, the carrier bar 145 is composed of aluminum which can expand to a significant degree. The sliding connection of the bracket 146b accommodates this thermal expansion.

The knockout assembly is changeable to extend further forwardly to minimize knockout cup cantilever and stress in supporting members. This is accomplished by loosening the bracket 170 from the frame member 172 and sliding the motor 157 and the connected parts forward or rearward and replacing the circular adapter plates that guide the knockout rods 147.

Figure 54A:
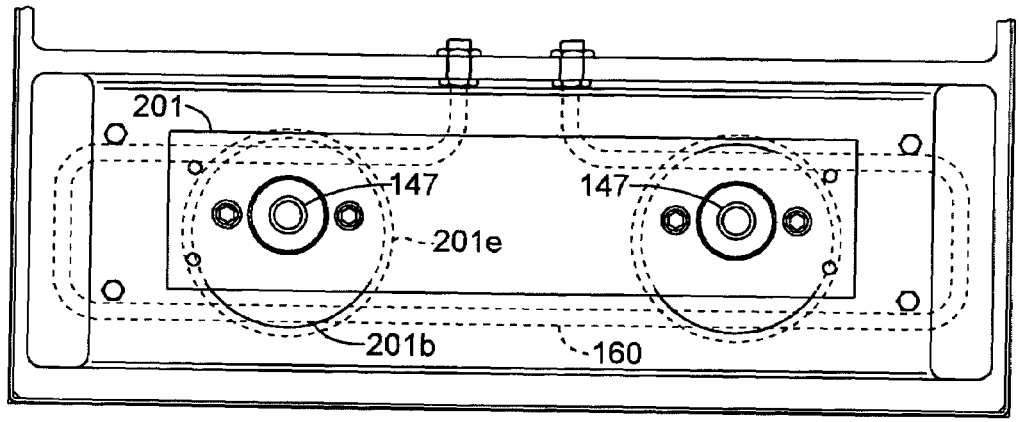
FIG. 54A is a fragmentary sectional view taken generally along line 54A-54A of FIG. 13A showing the knockout apparatus in a rear position, with some panels and/or components removed for clarity.
Figure 54B:
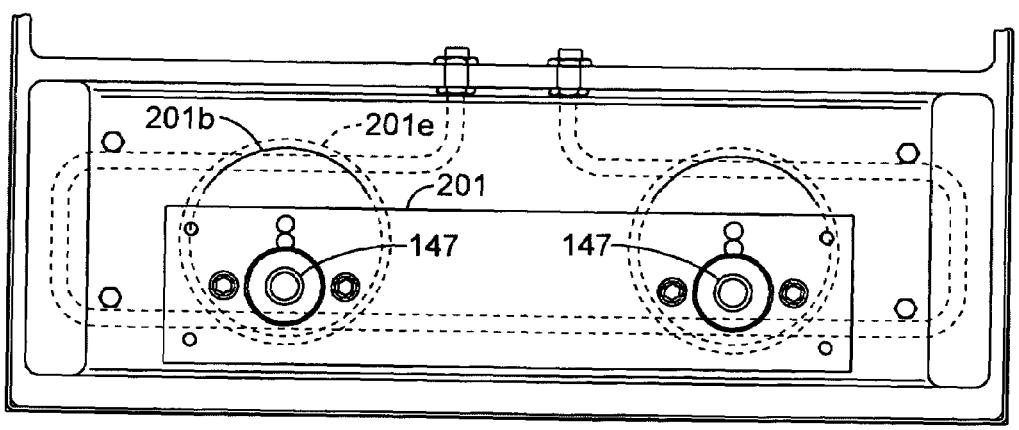
FIG. 54B is a sectional view similar to FIG. 36A showing the knockout apparatus in a forward position.

As demonstrated in FIGS. 54A and 54B, to change the longitudinal position of the knockout cups 33, the support plate 201 is shifted longitudinally. Replacement circular adapter plates 201bb are fit into the casting 123 from below. The replacement circular adapter plates 201bb include different hole patterns for the knockout rods 147, forwardly or rearwardly shifted, to accommodate the new position of the support plate 201.

A proximity sensor 202 is bolted to the outer cover 195, and a target 203 is provided on the crank beam 149 to be sensed by the proximity sensor 202. The proximity sensor 202 communicates to the controller 23 that the knockout cups are raised and the mold plate can be retracted without interfering with the knockout cups.

The movement of the knock out cups is fully programmable for different motion profiles, including dwell, accelerations and extend and retract speeds. Such motion profiles may be useful depending on the properties of the food product to be discharged from the mold plate cavities. Because both the mold plate and the knock out cups can be driven by programmably controlled servo motors, they can be flexibly sequenced without being restricted in motion by a common mechanical system.

Auxiliary Pump System for Air and Fines from the Breather System

FIGS. 9A through 12 and 36-41 illustrate another aspect of the invention. According to this aspect, the mold plate 32 includes two ends, a forward end 202 and a rearward end 204. The cavities 126 are located at a central position between the ends 202, 204. Elongated connection recesses 208 are located at a rearward position, near the rearward end 204. Relief recesses 209 are located between the connection recesses 208 and the cavities 126. In FIG. 9A the mold plate 32 is in a fill position, fully retracted toward the rear. The cover plate or breather plate 122 includes breather holes 216 that are in air communication with the cavities 126 while the mold plate is in the fill position.

The holes 216 are in communication with a top side air channel in the form of a dished region 220 of the cover plate 122. The dished region 220 includes branch regions 222 that extend forwardly. The branch regions 222 are in air communication with an antilip channel 230 open on a bottom side of the cover plate 122, through narrow apertures 234.

On a rearward portion of the dished region 220 are recesses 237 that are in communication with through holes 238 that extend through the thickness of the cover plate 122. In the mold plate position of FIG. 9A, the through holes 238 are open into the elongated connection recesses 208.

On a rearward portion of the cover plate 122 is a bottom side recess 242 that is in communication with an overhead valve passage 246 that can be closed by action of a valve 250, particularly by action of a valve element 252 of the valve 250. The valve element 252 is in the open position as shown in FIG. 9A. The valve element is movable within a valve chamber 258 formed into a bottom side of the mold cover 123.

The valve chamber 258 extends laterally and is flow connected to two through bores 264, 266 that each extend through the cover plate 122, the spacer 124, the top plate 121, and an insert plate 270 fit on a recess 272 of the pump housing 71. The recess 272 is open into the pump inlet 39.

In the position shown in FIG. 9A, the cavities are filled through a plurality of fill apertures or slots 121b through fill plate 121a (see FIG. 38 as an example of fill apertures) fastened to the pump housing 71. The mold plate 32 is beginning its forward travel, driven by the drive rods 128 via the link 129. The valve element 252 is up; the valve 250 is open.

As illustrated in FIG. 9B, when the connection recess 208 is no longer in communication with the bottom side recess 242, the moving end 204 of the plate 32 creates a suction chamber 280S formed between the spacer 124, the end 204, the breather plate 122 and the top plate 121. The element 252 is drawn down by the suction to close the valve passage 246.

In the position of the mold plate shown in FIG. 9C, the cavities 126 have moved into a position to be relieved in pressure by the antilip slot 230, any expansion of the patties is cut as the patties pass under the antilip bar 231. Further suction is drawn in the chamber 280 by movement of the end 204.

As shown in FIG. 9D, maximum suction is developed at this point in the chamber 280S by movement of the end 204.

As shown in FIG. 9E, the end 204 has passed under the through hole 238. The suction chamber 280 draws air and meat fines from the chambers and recesses 230, 234, 222, 220, 237, 238 into the suction chamber 280S.

FIG. 9F illustrates the mold plate 32 in its discharge position. The relief recesses 209 open the antilip channel 230 to outside air. Outside air flushes through the series of recesses and other passages identified as 209, 230, 234, 222, 220, 237, and 238 and into the suction chamber 280S under influence of a vacuum present in the suction chamber 280S. The pressure in the suction chamber 280S and the connected chambers and passages 238, 237, 220, 222, 234, 230 is increased to atmospheric pressure. The valve element 252 is then elevated and the valve 250 is then open.

Figure 9G:
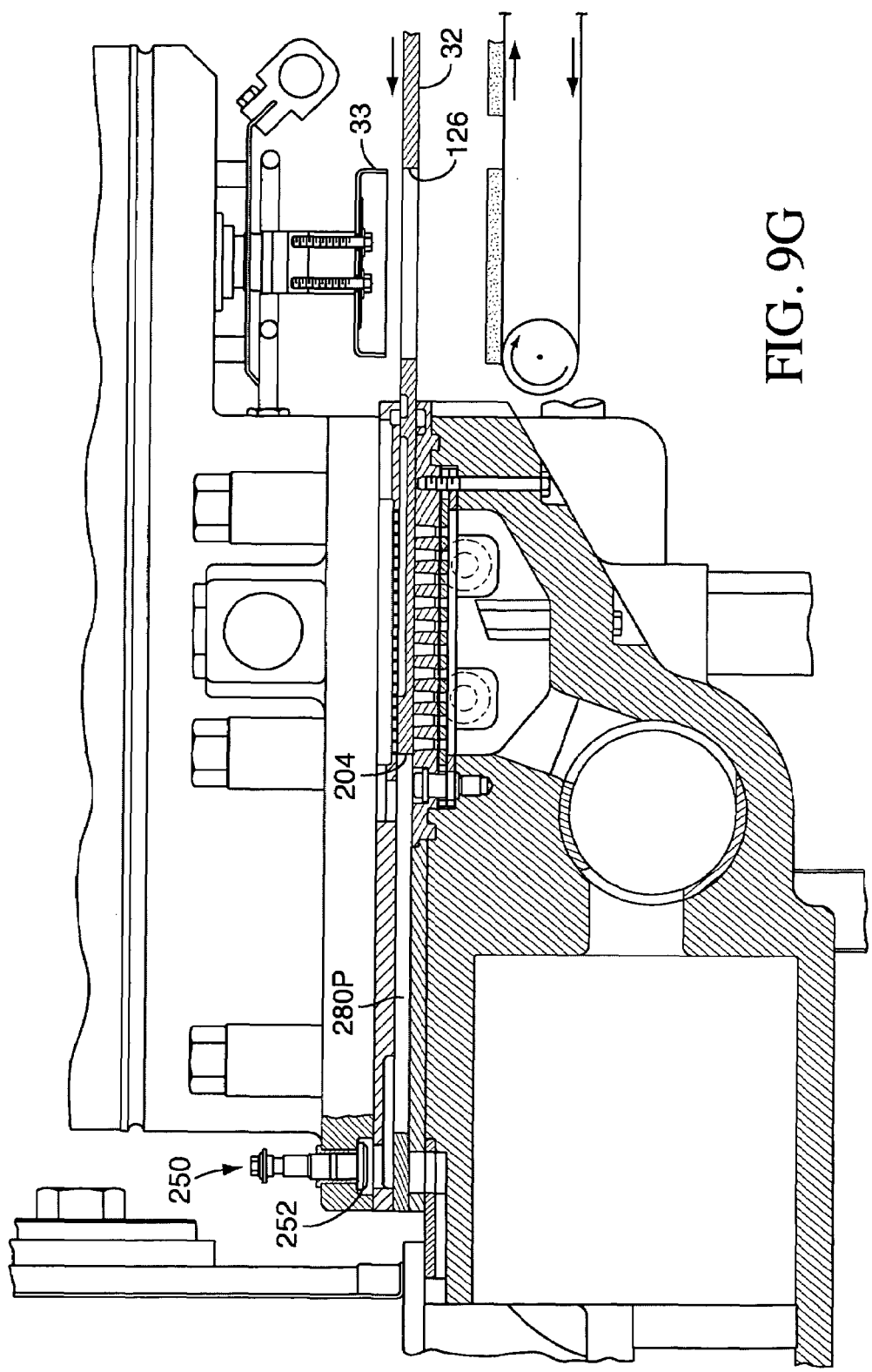

FIG. 9G illustrates the patty has been discharged by downward movement of the cup 33, which subsequently has been elevated. The patty has been deposited onto the conveyor. The mold plate 32 begins a rearward movement. The suction chamber 280 now becomes a compression or pump chamber 280P. Any air or meat fines drawn into the suction chamber 280S can now be transported by positive pressure or pumping action of the pump chamber 280P through the open valve 250 and into the pump inlet 39 as now described.

Figure 9H:
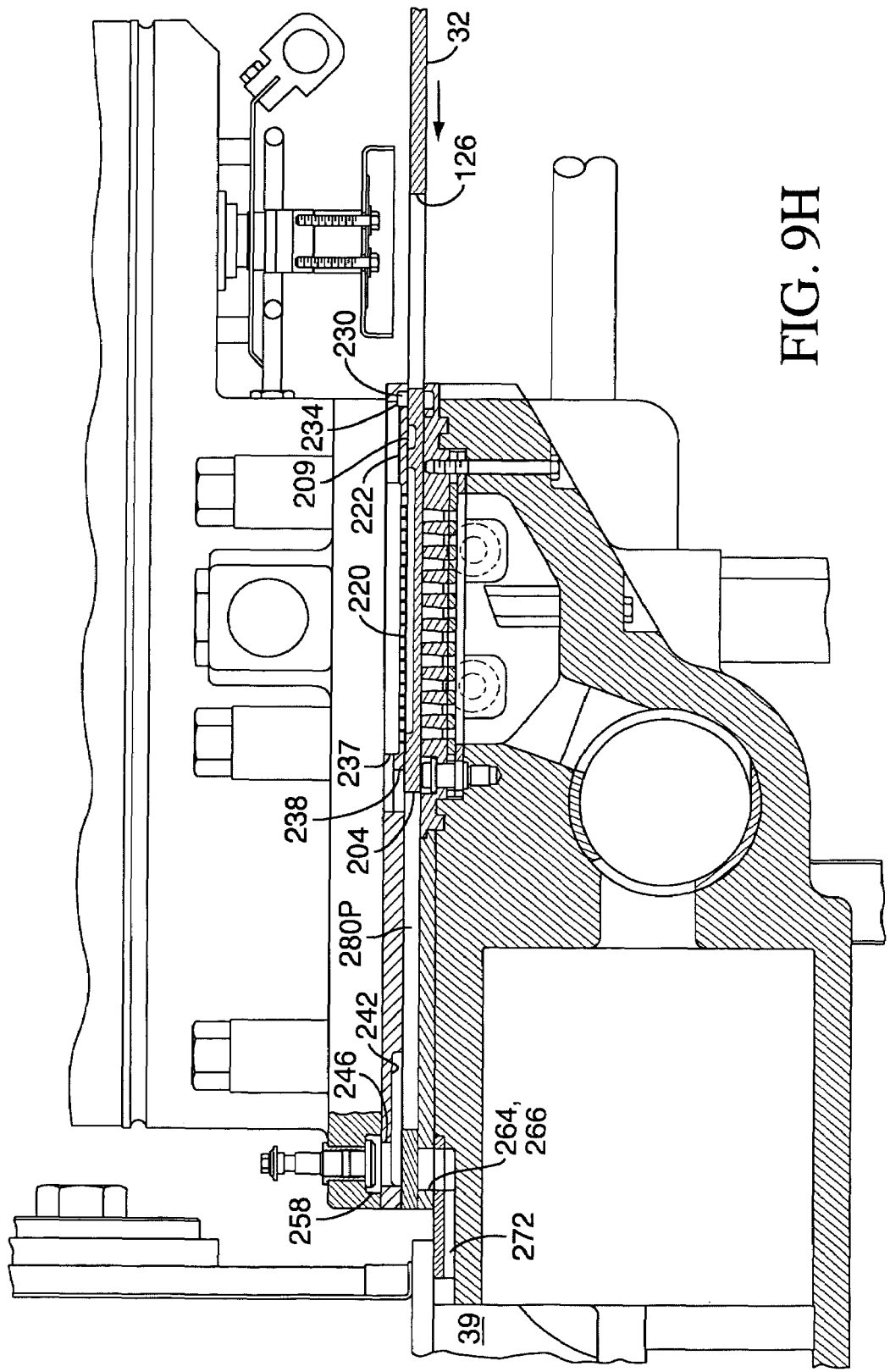

FIG. 9H illustrates that for a brief time during the return stroke of the mold plate, the mold plate moved a small amount to the left of the position shown in FIG. 9H, the moving end 204 will pump air rearward through the pump chamber 280P and forward through the passages 238, 237, 220, 222, 234, 230, 126 to atmosphere. However the latter forward path is more restrictive than the rearward path so little flows in this direction. Most air and fines are pumped through the chamber 280P, through the recess 242, through the valve passage 246, through the recess 258, through the bores 264 and 266, through the recess 272 and into the pump inlet 39.

Figure 9I:
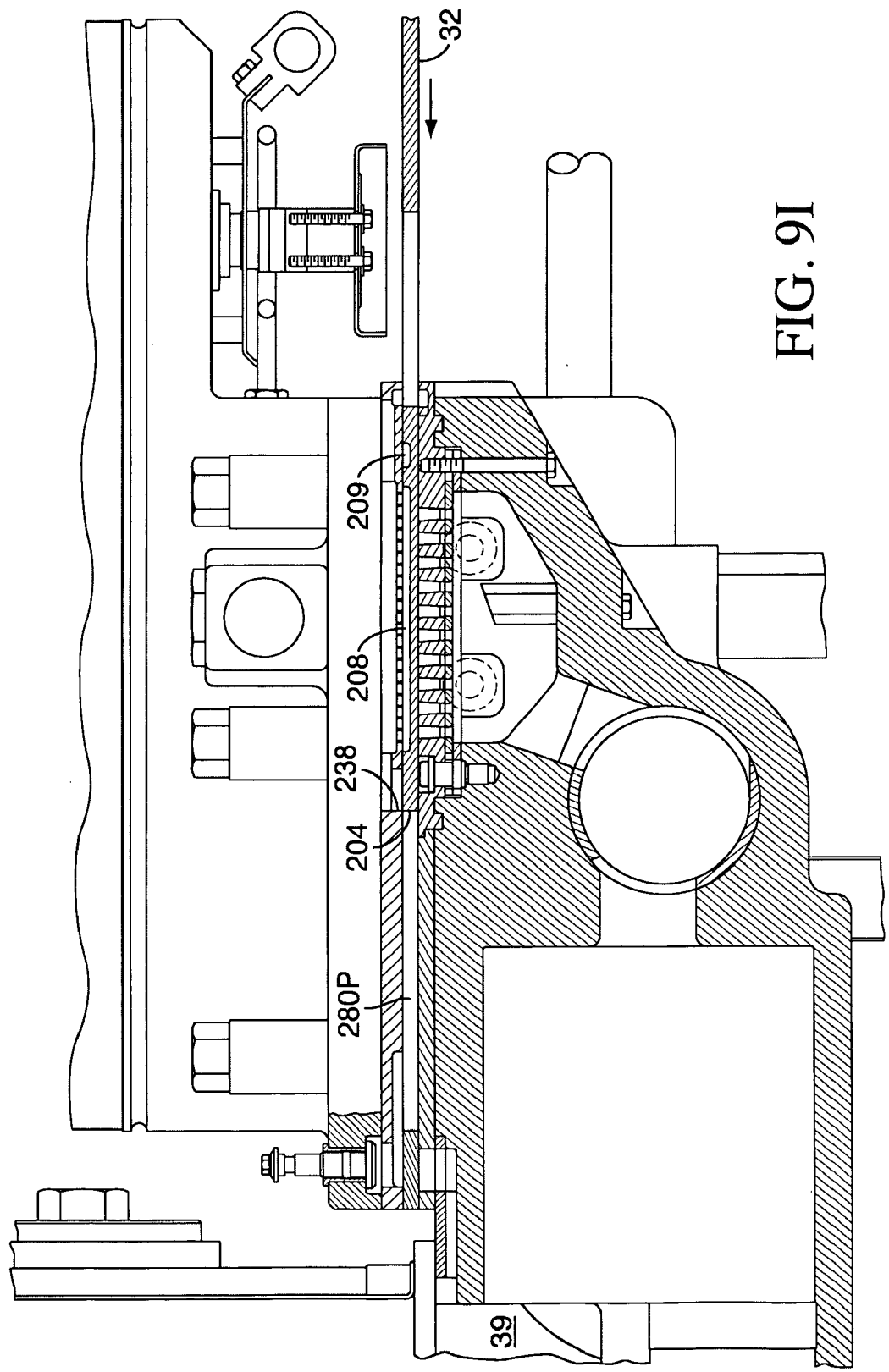

FIG. 9I illustrates that the end 204 has passed the passage 238 and thus all of the air and fines in the pump chamber 280P must pass rearward toward the pump inlet 39.

Figure 9J:
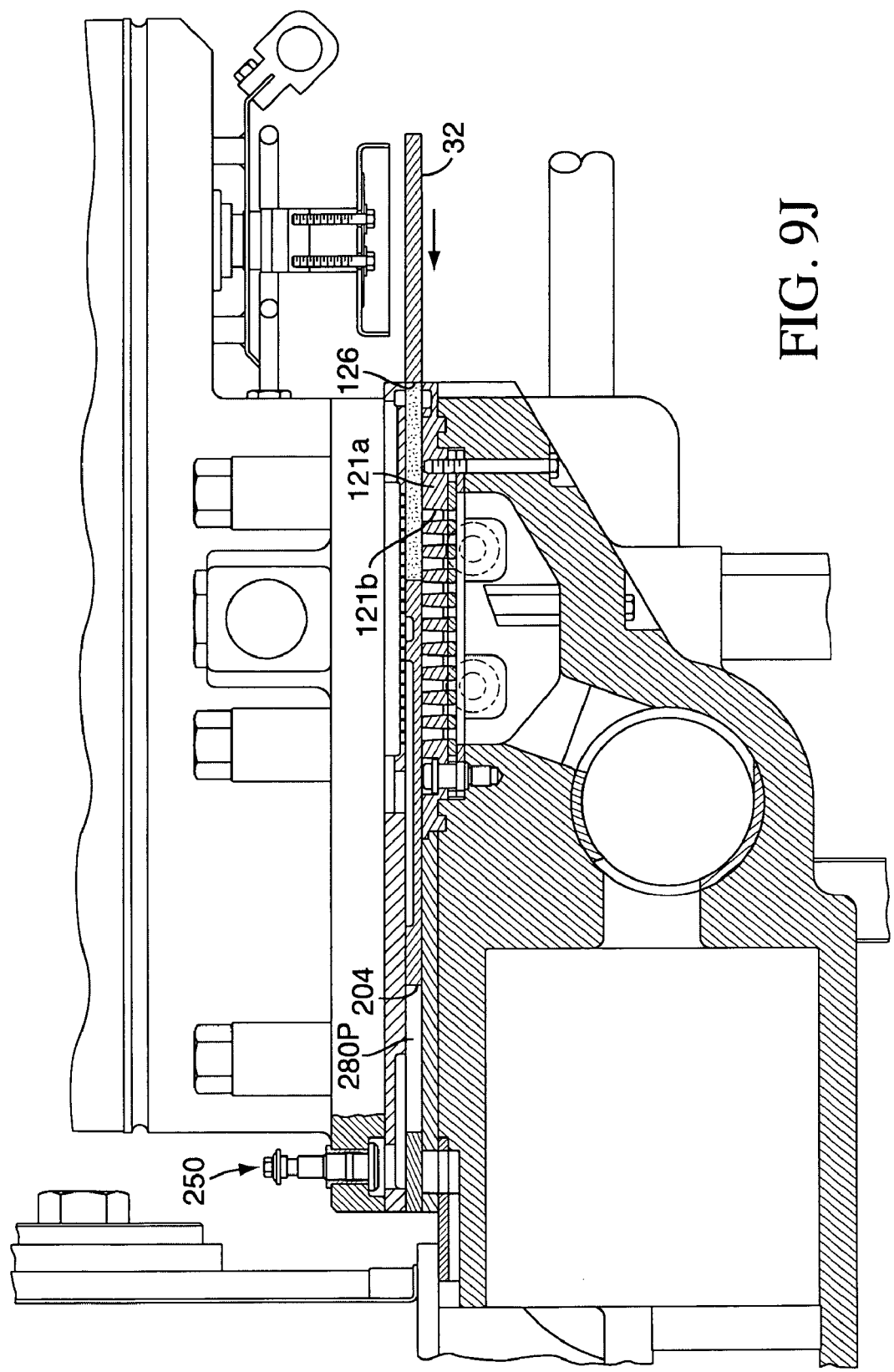

FIG. 9J illustrates the cavities 126 become open to the fill slots 121b of the fill plate 121a wherein the cavities begin to fill with meat under pressure. The pump chamber is continuously reduced in volume as the end 204 proceeds rearward. The valve 250 is still open.

Figure 9K:
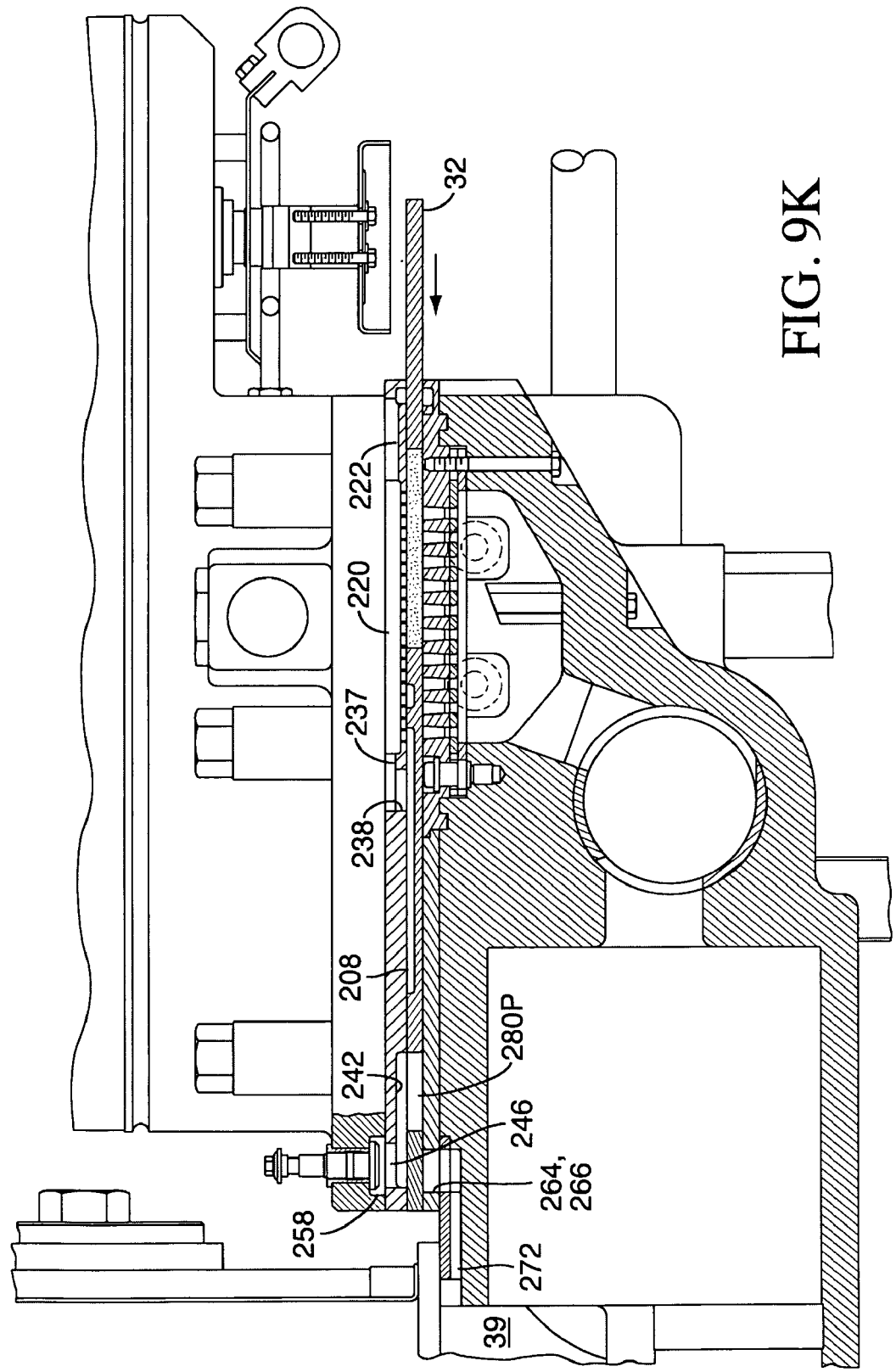
Figure 10A:
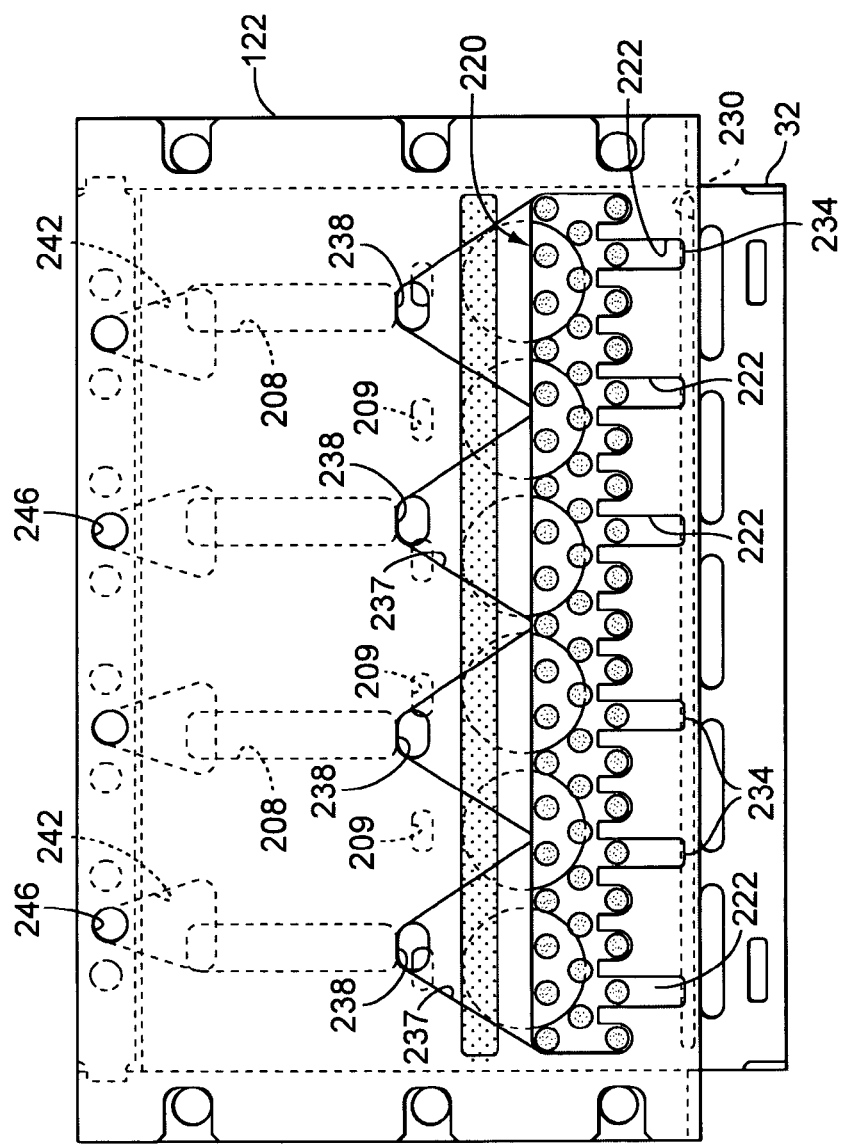
FIG. 10A is a fragmentary sectional view taken generally along line 10A-10A of FIG. 9A, with components and/or panels removed for clarity.
Figure 10B:
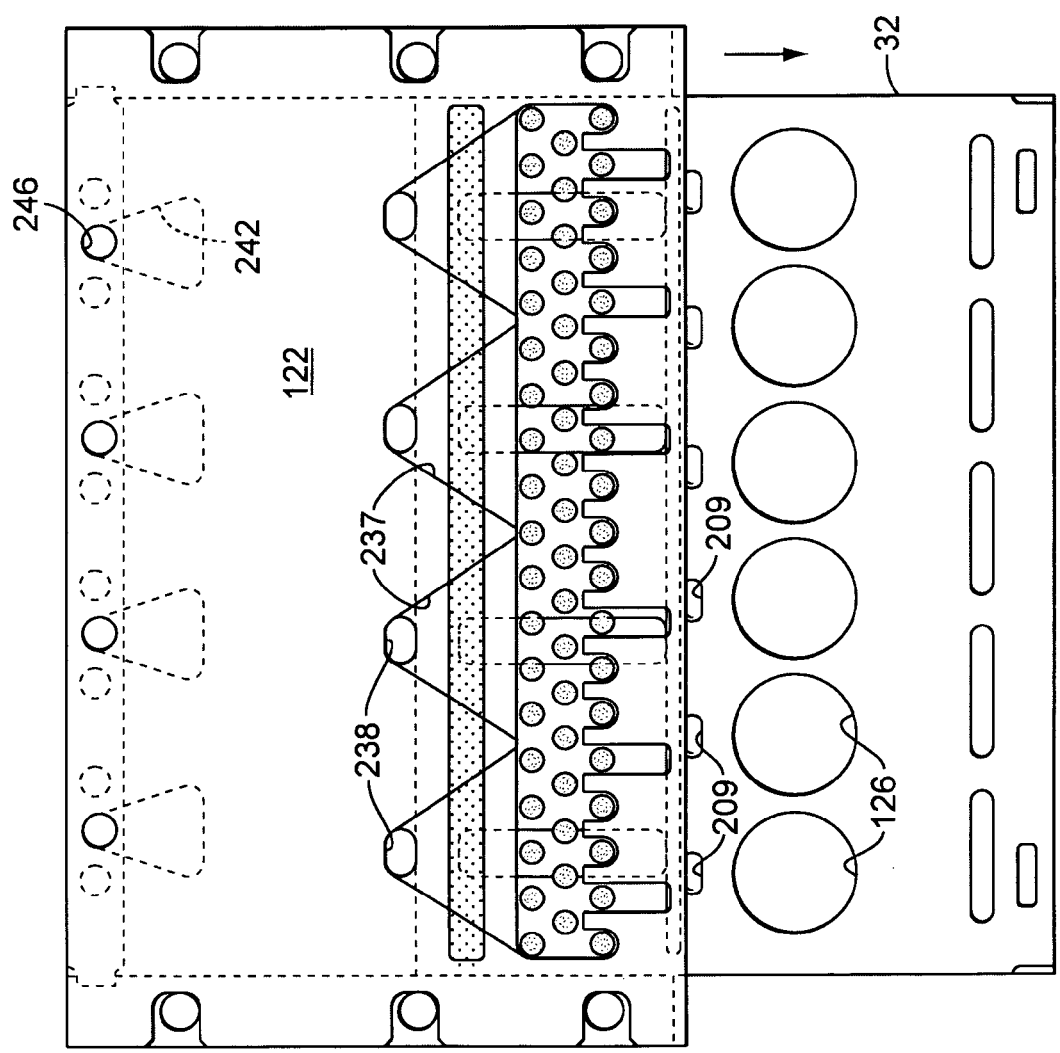
FIG. 10B is a fragmentary sectional view taken generally along line 10B-10B of FIG. 9E, with components and/or panels removed for clarity.
Figure 11A:
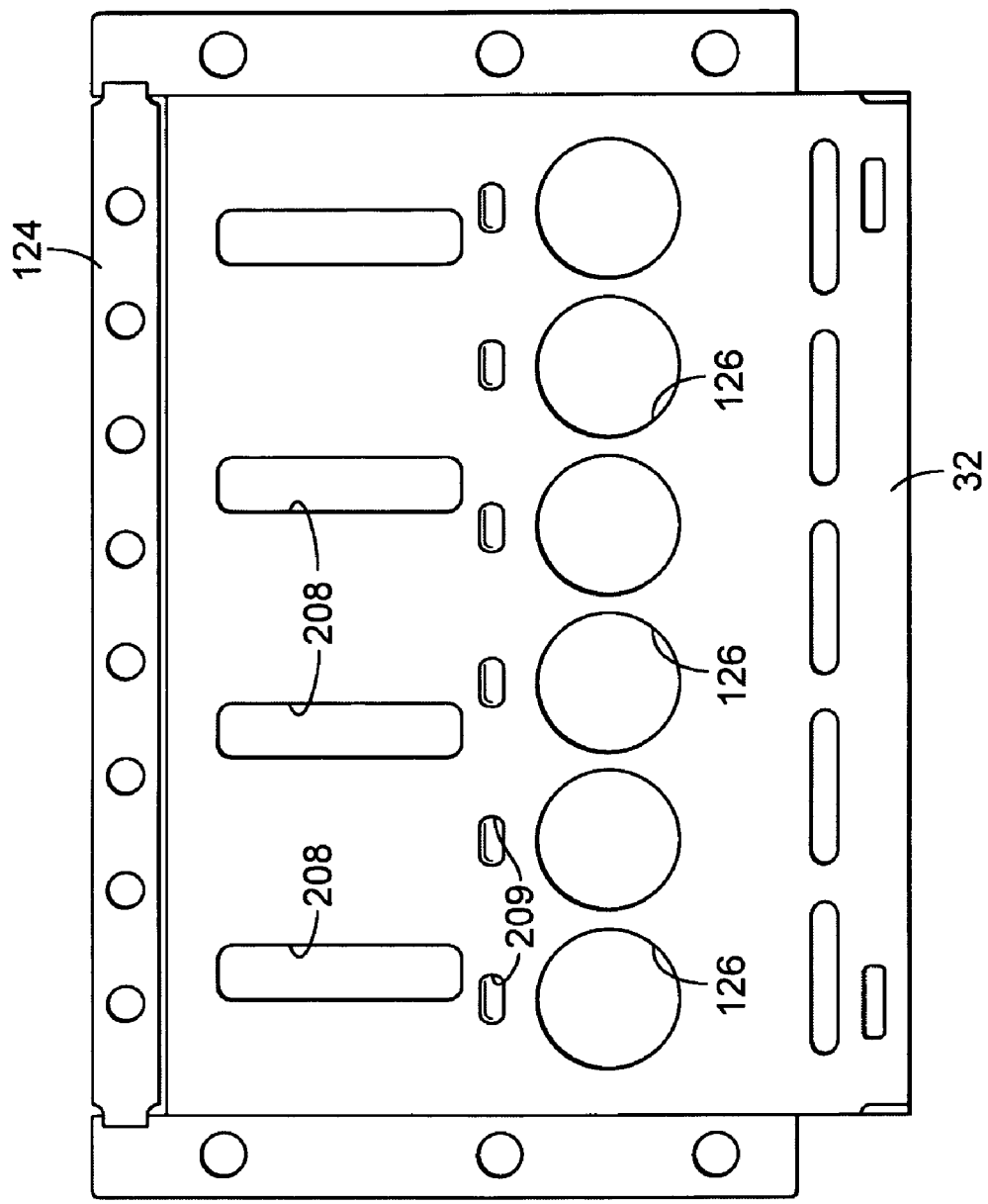
FIG. 11A is a fragmentary sectional view taken generally along line 11A-11A of FIG. 9A, with components and/or panels removed for clarity.
Figure 11B:
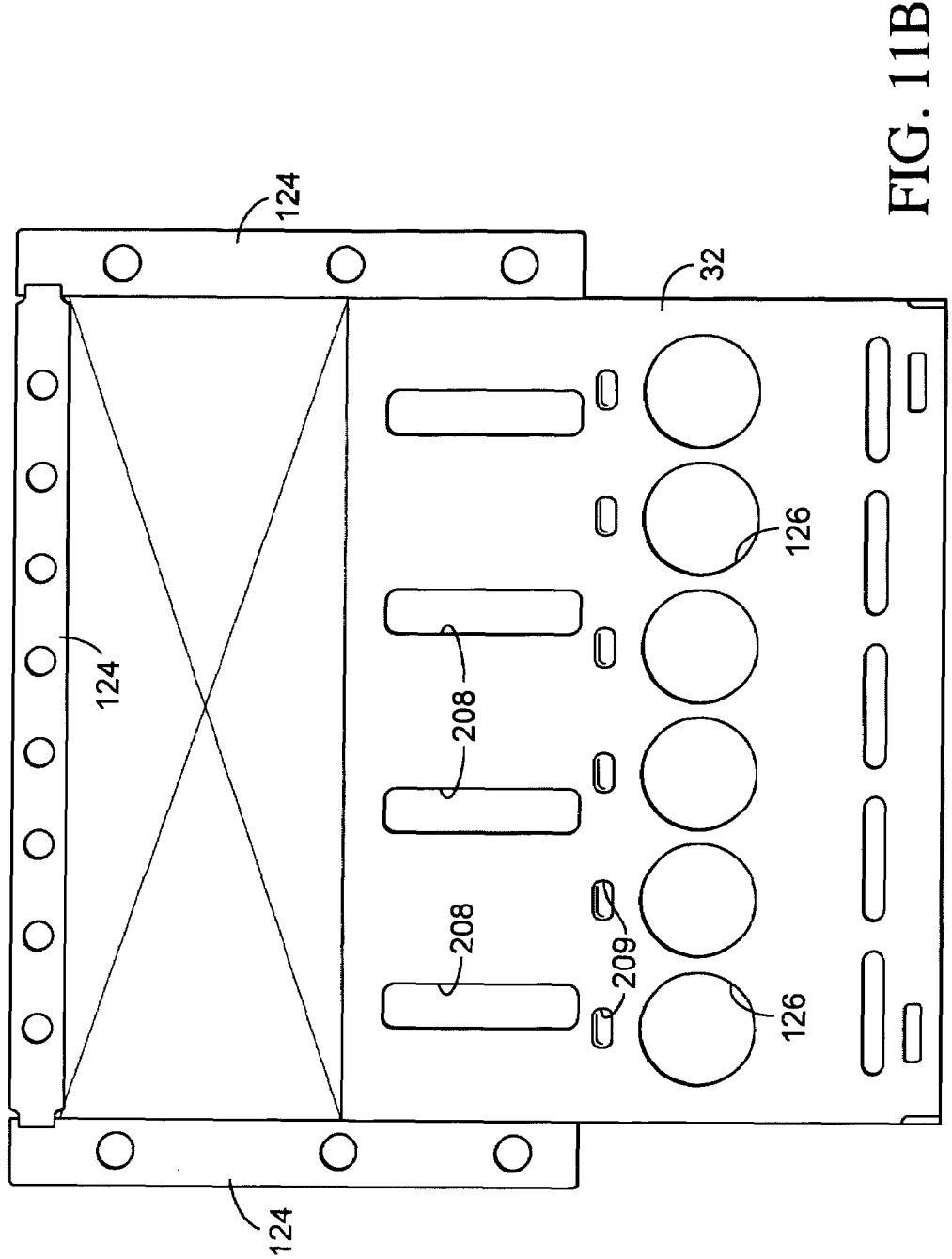
FIG. 11B is a fragmentary sectional view taken generally along line 11B-11 B of FIG. 9E, with components and/or panels removed for clarity.

FIG. 9K illustrates a late stage of movement of the mold plate 32. The cavities 126 are continuing to be filled. The meat, under pressure forces air and meat fines through the apertures 216 into the chambers 220, 222, 237, 238, 208. The valve 250 remains open wherein the mold plate reaches the position of FIG. 9A, the air and meat fines can exit the chambers 220, 222, 237, 238, 208 by virtue of the recess 208 being in air flow communication with the recess 242 and the passages 246, 258, 264, 266, 272 and 39.

Although a single row of cavities is shown in the mold plate 32 in FIGS. 10A-11B, 14 and 15, it is encompassed by the invention to provide multiple rows of cavities, in straight or staggered columns, such as described in U.S. Pat. Nos. 6,454,559; 6,517,340; 4,872,241; 6,572,360; and/r 3,747,160; or international patent publications WO 01/41575 and/or WO 02/102166, all herein incorporated by reference.

Figure 36:
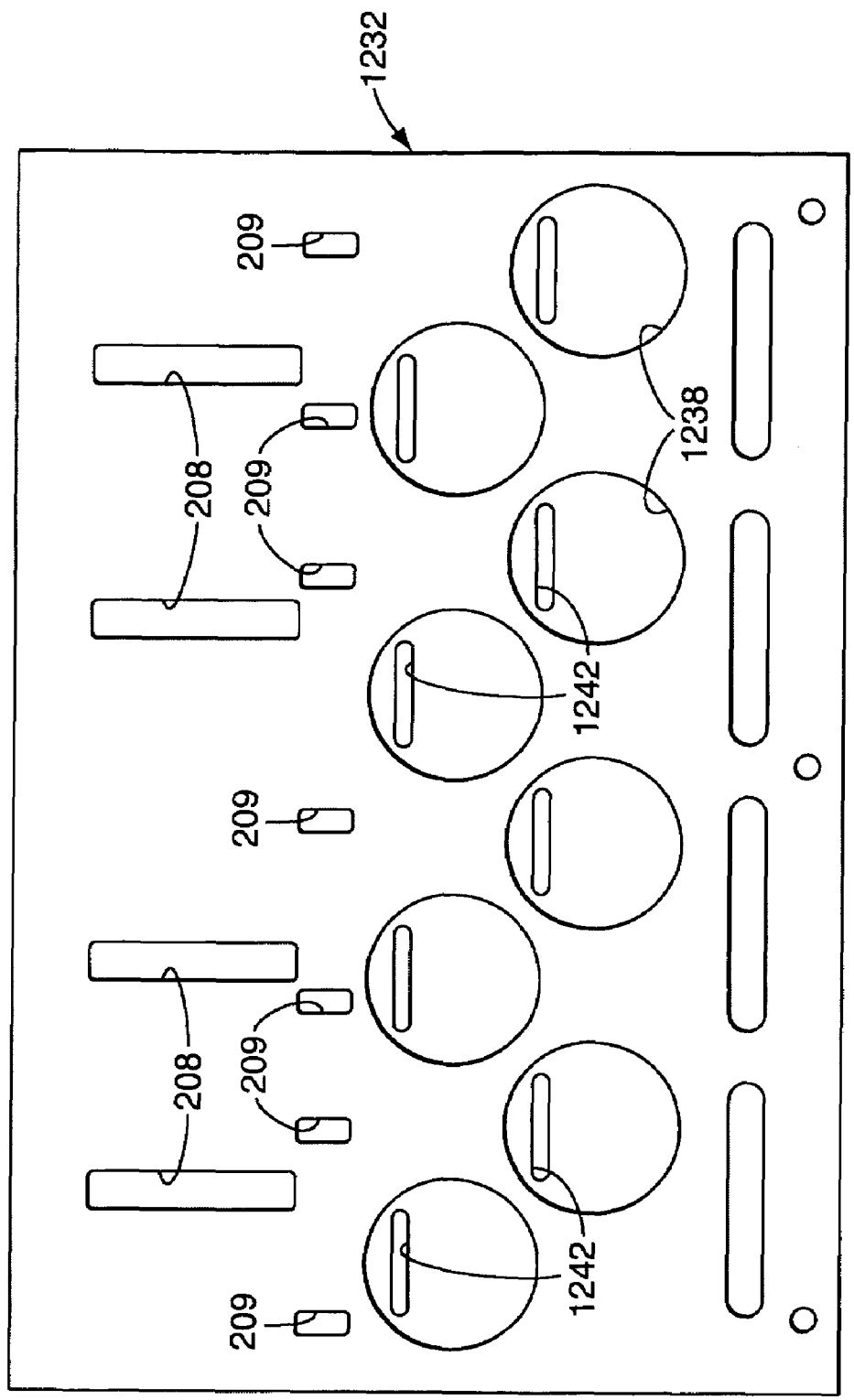
FIGS. 36-38 are alternate mold plate and fill slot arrangements for the patty-forming machine.
Figure 37:
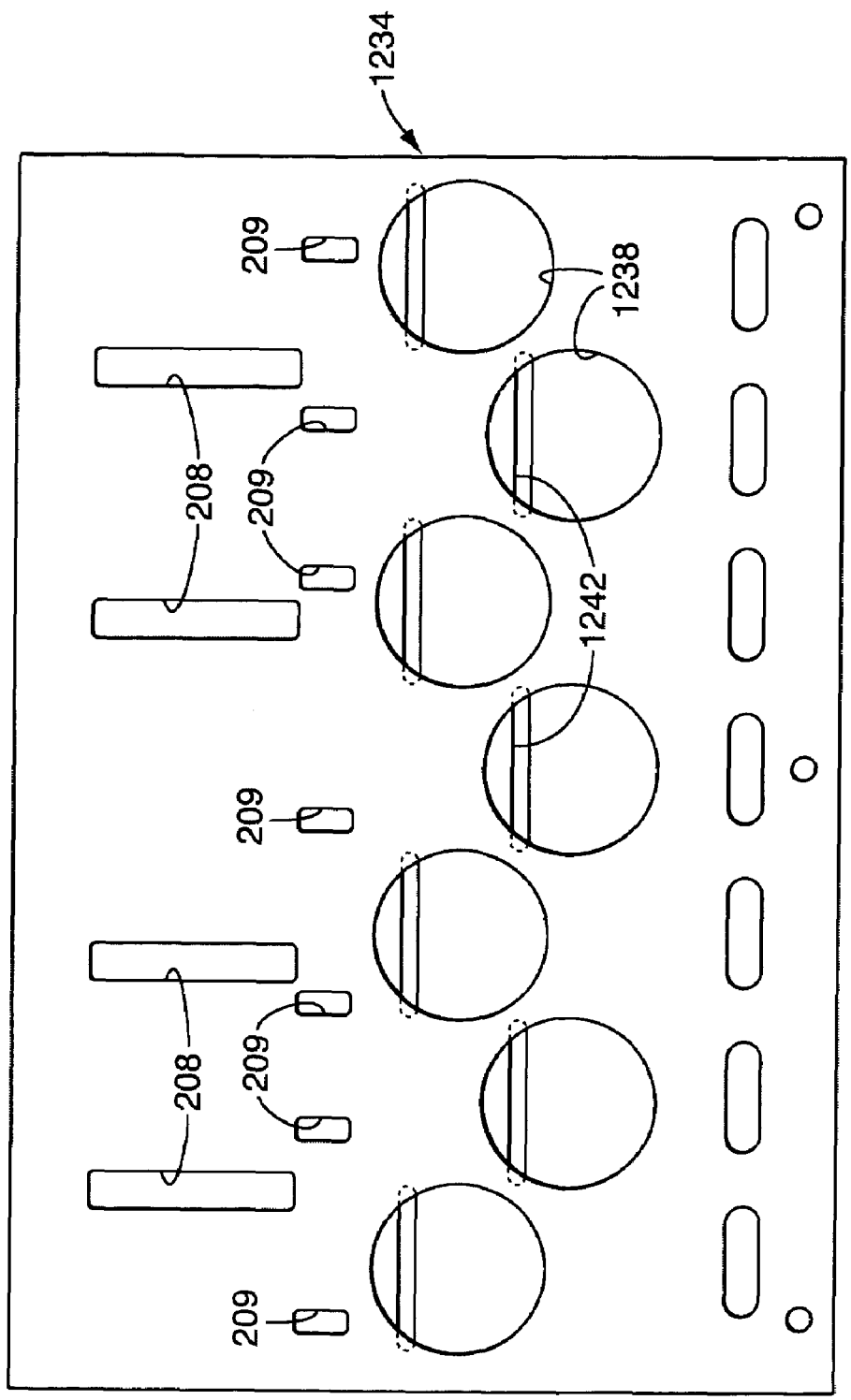
Figure 38:
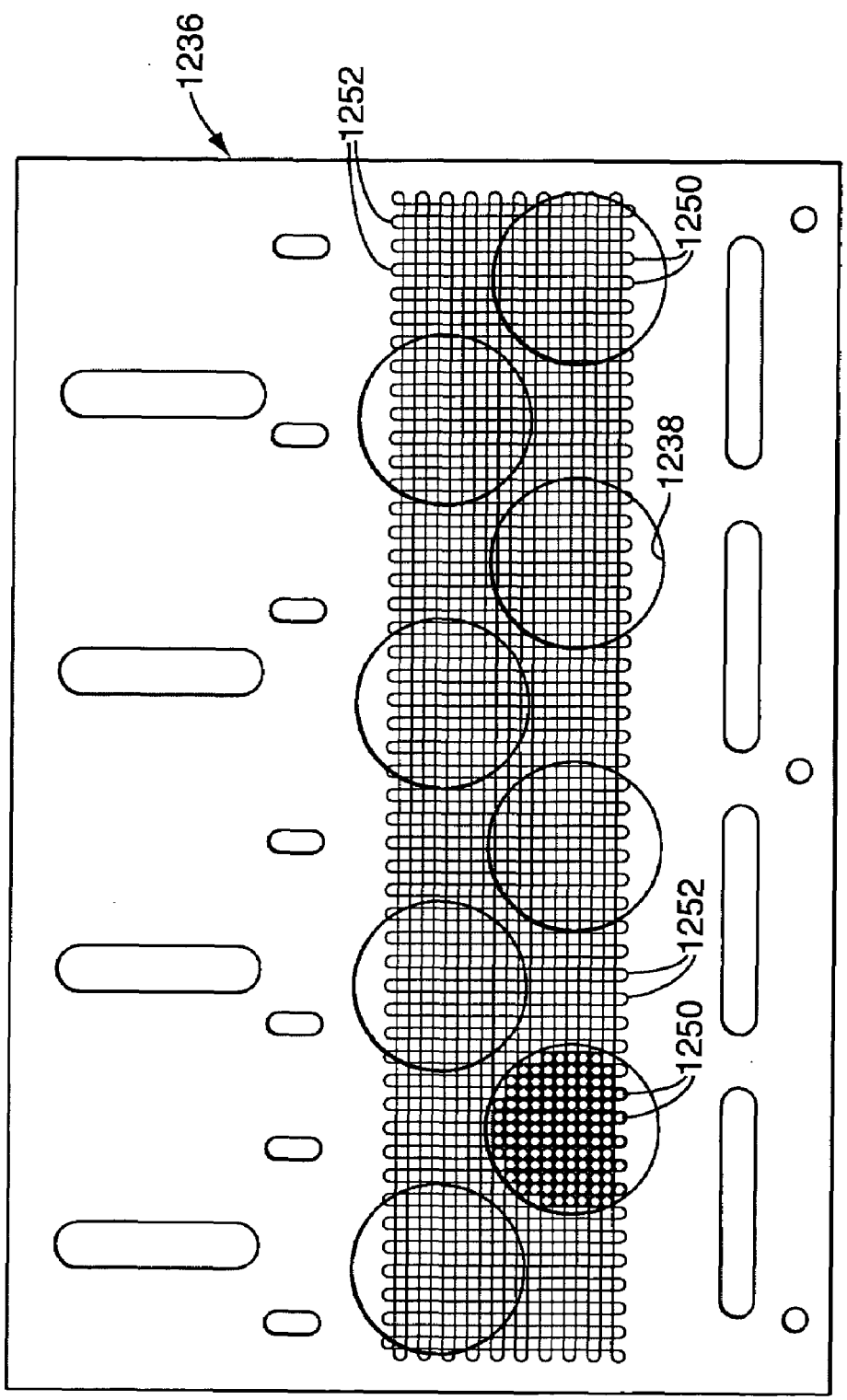

FIGS. 36-38 illustrate alternate mold plates 1232, 1234, 1236 having similar mold plate features as described above, but having two rows of cavities 1238 in staggered columns. In FIGS. 36 and 37 the cavities are filled by individual fill slots 1242 below the mold plates 1232, 1234. In FIG. 38, the cavities 1238 are filled by a plurality of fill apertures 1250 in registry with the cavities 1238. The apertures 1252 that are not in registry with the cavities are shown but are not drilled through the plate 1236.

Furthermore, the apparatus 20 can also have, in conjunction with the mold plate and fill plate arrangements, a stripper or seal off mechanism such as described in U.S. Pat. Nos. 4,821,376; 4,697,308; and/or 4,372,008, all herein incorporated by reference, or as available on current FORMAX F-26 machines.

Figure 12:
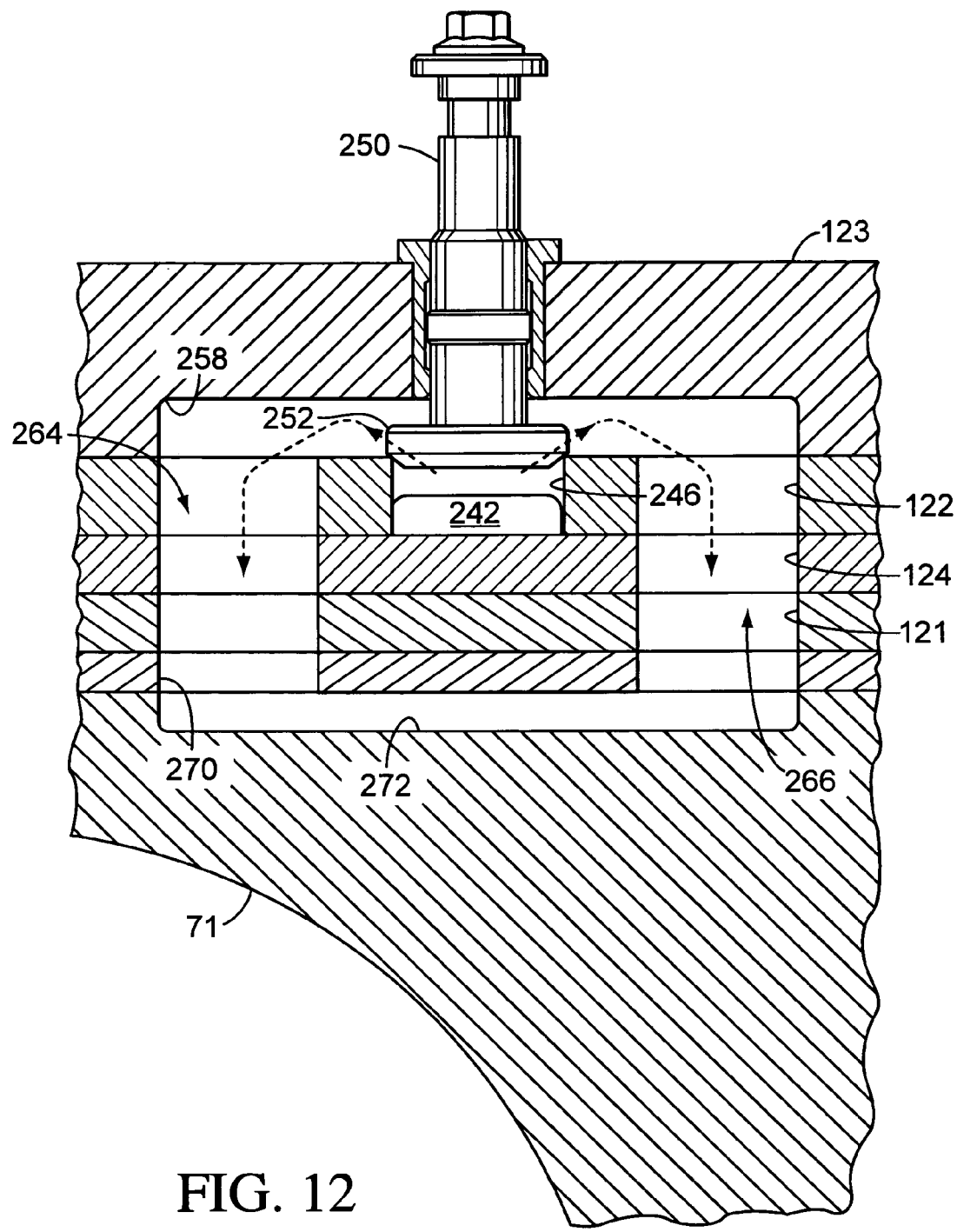
FIG. 12 is a fragmentary sectional view taken generally along line 12-12 of FIG. 9B, with components and/or panels removed for clarity.
Figure 39:
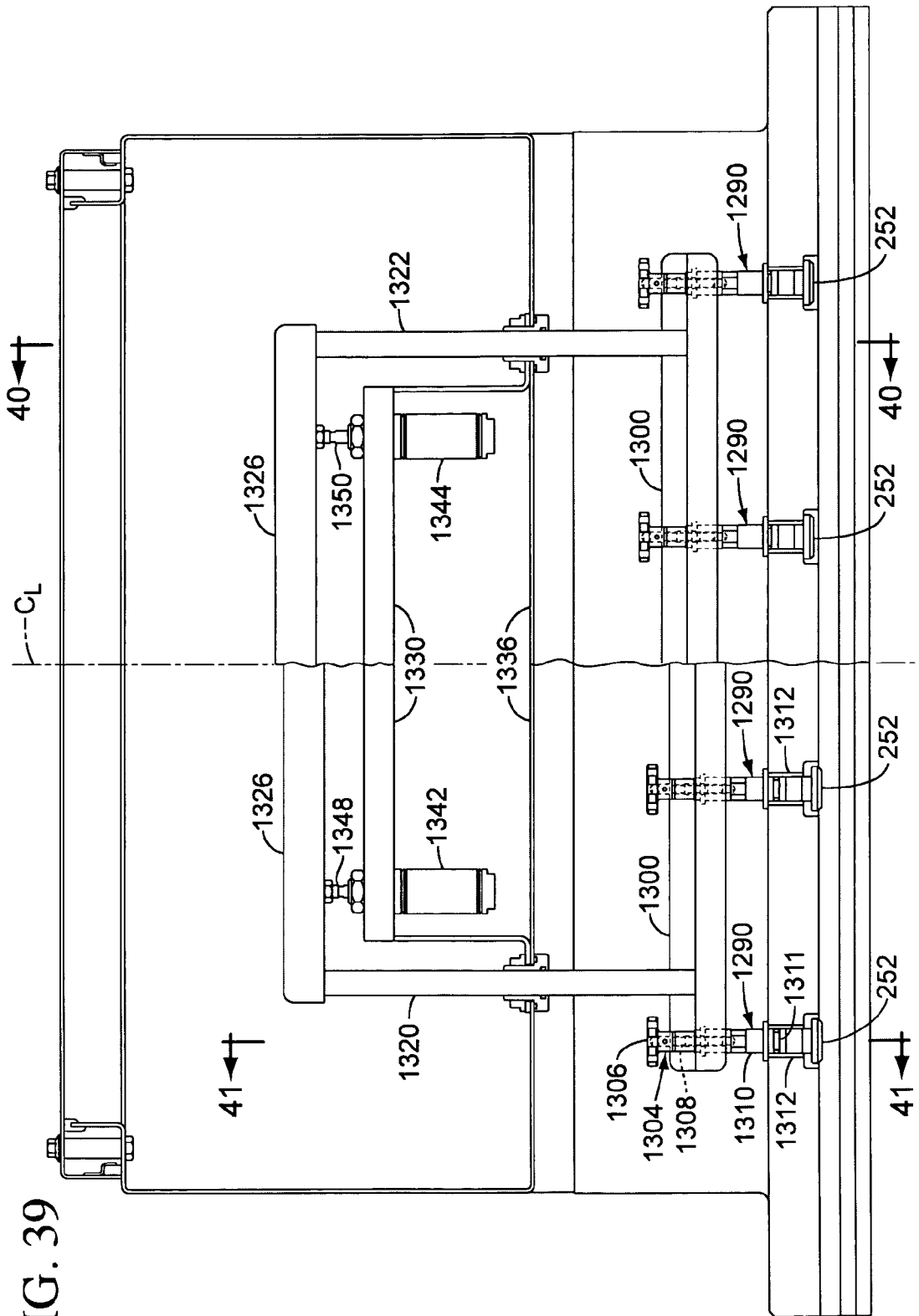
FIG. 39 is a sectional view of an alternate embodiment of the valve arrangement shown in FIG. 12, taken generally along line 39-39 from FIG. 9A.
Figure 41:
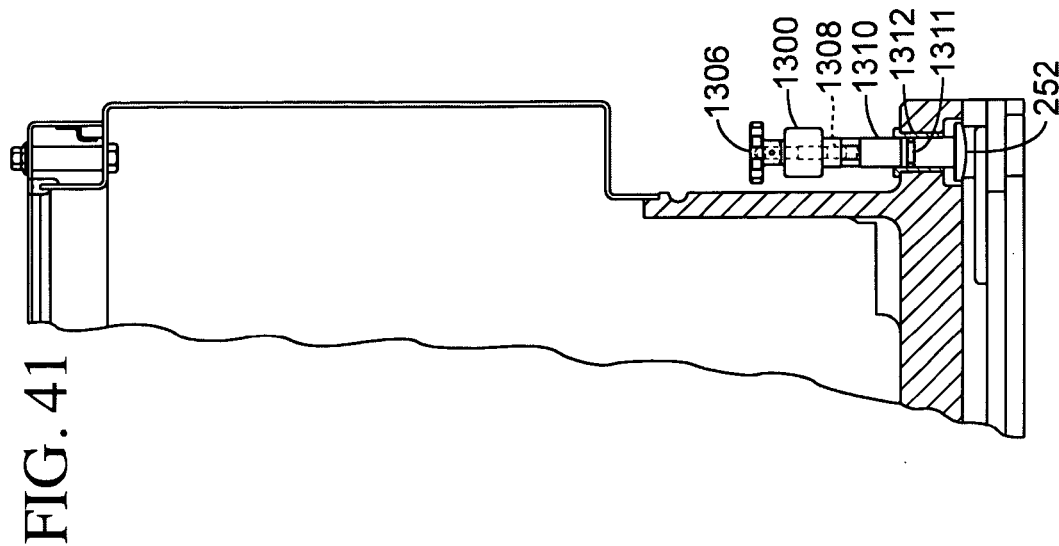
FIG. 41 is a sectional view taken generally along line 41-41 of FIG. 39.
Figure 40:
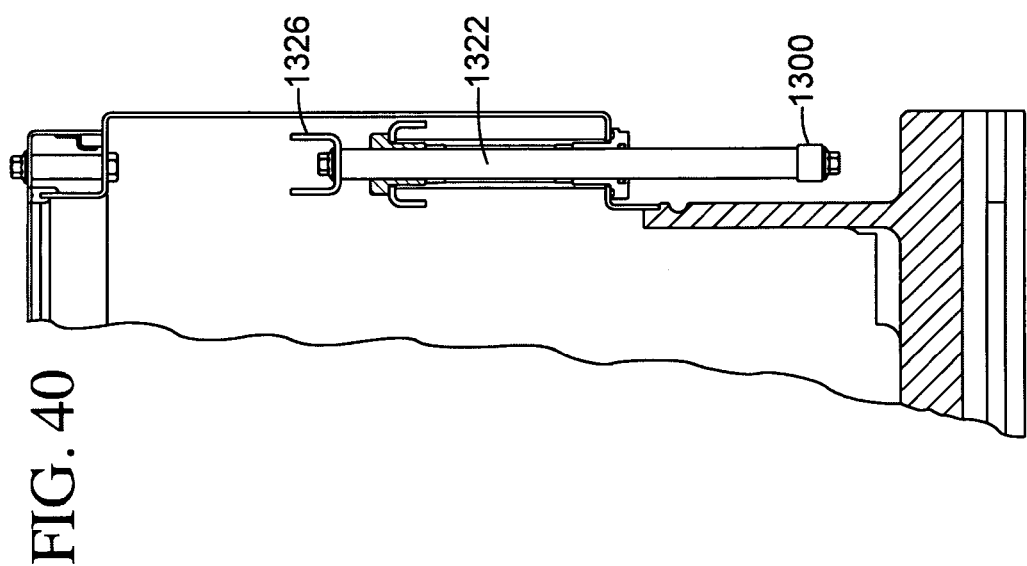
FIG. 40 is a sectional view taken generally along line 40-40 of FIG. 39.
Figures 42, 43:
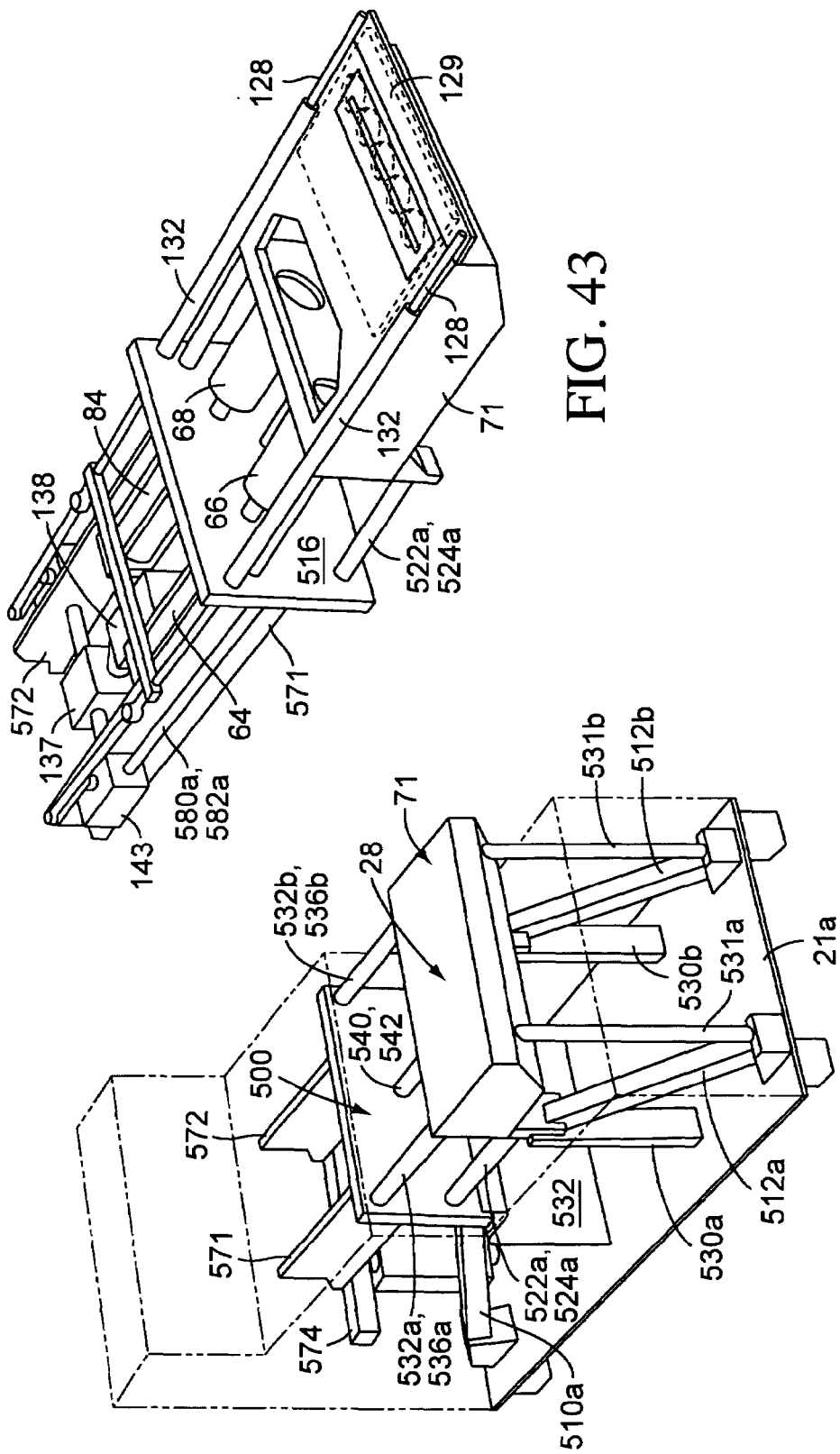
FIG. 42 is a diagram of the frame system of the patty-forming machine.
FIG. 43 is an enlarged view of a portion of the frame system taken from FIG. 42.

FIGS. 39-41 illustrates an alternate valve arrangement than described with regard to FIG. 12. The porting of the valve elements 252 remains the same. The mechanism for opening and closing the valve elements 252 is modified. The sectional view is broken along its vertical centerline CL to show two valves 1290 with elements 252 lowered, and closed, to the left of the centerline CL, and two valves 1290 with elements 252 raised, and opened, shown to the right of the centerline CL. It should be understood however that in operation all four valve elements raise-and-lower together to open and close the valves.

The valves 1290 are mounted on a support bar 1300. The valves 1290 are mounted to the bar by a threaded adjustment mechanism 1304. The adjustment mechanism includes a handle 1306 locked onto a threaded shaft 1308 that is threaded into a valve stem assembly 1310 such that when the threaded shaft 1308 is turned by the handle 1306, the threaded shaft selectively raises or lowers the valve element 252 by precise amounts to set valve clearance and to ensure that the valves seat at the same time given their common movement. The valve stem assembly includes a ring seal 1311 to seal against a stationary sleeve 1312 of the valve 1290.

The support bar 1300 is supported on two rods 1320, 1322. A crossbar 1326 spans between the rods 1320, 1322 and is fastened thereto. A bracket 1330 is supported on a machine wall 1336. A pair of pneumatic cylinders 1342, 1344 are fixed to the bracket 1330 and have actuation rods or piston rods 1348, 1350 fixed to the crossbar 1326. When the rods 1348, 1350 extend together from the cylinders 1342, 1344, the crossbar 1326 raises the rods 1320, 1322, which raises the support bar 1300, which raises the valve stems 1310 and the valve elements 252. This opens the valves 1290.

Contracting the rods 1348, 1350 into the cylinders 1342, 1344 has the opposite effect, lowering the valve elements 252 and closing the valves 1290.

The pneumatic cylinders 1342, 1344 are signal-connected via pneumatic tubing and electronics to the machine controller that can precisely control the raising and lowering of the valve element to be synchronized with the mold plate movements. The valve element can be positively raised and lowers according to a precisely controlled timing sequence rather than being controlled by vacuum or positive pressure in the suction chamber or pump chamber.

Figure 15:
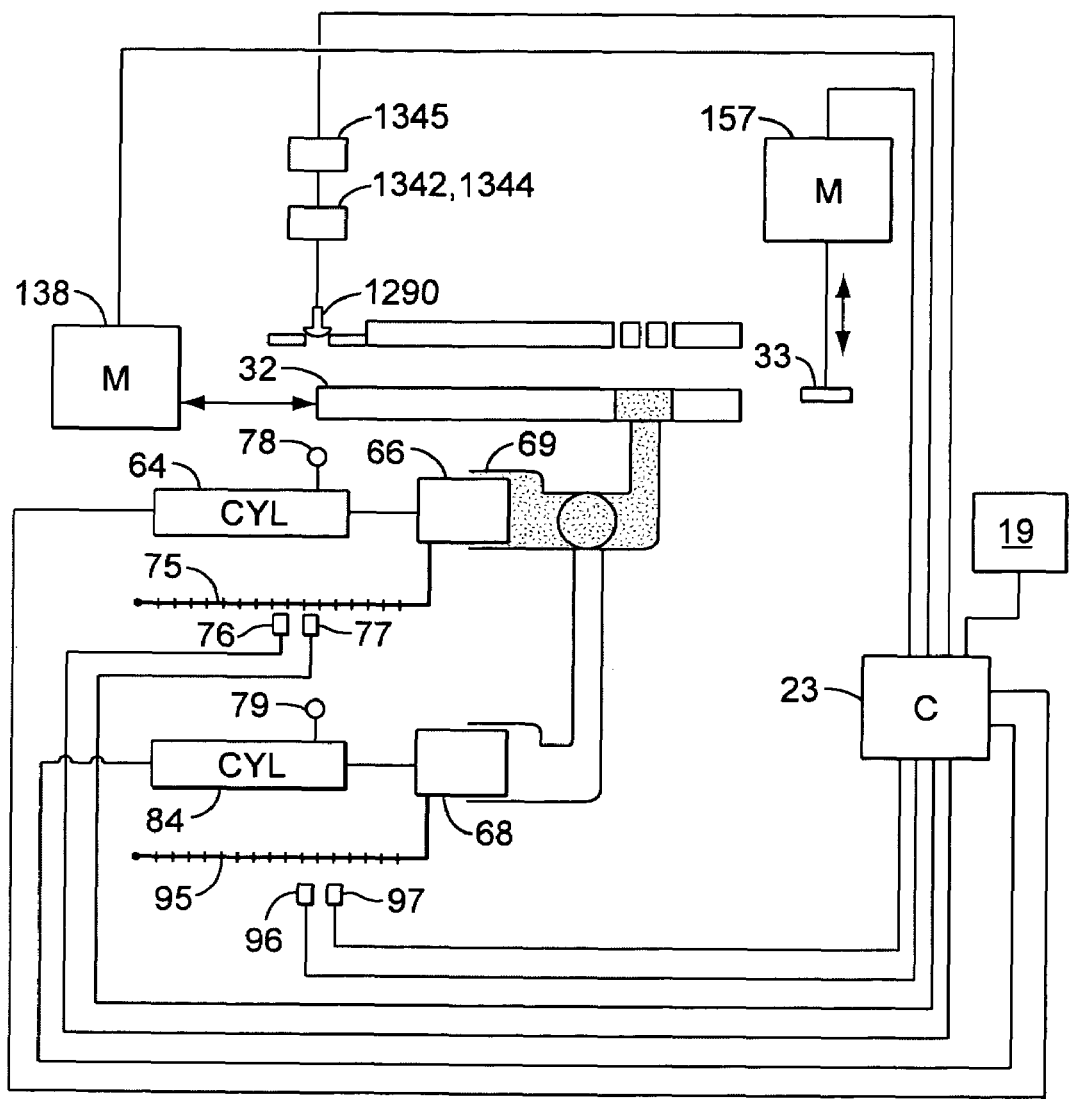
FIG. 15 is a schematic block diagram showing a control system of the patty-forming machine

FIG. 15 illustrates in schematic form, the control system of the present invention. The machine controller 23 can be programmed to control the servo motor drives 138, 157 and the pneumatic cylinders 1342, 1344, via the interface 1345, to be properly sequenced to coordinate the movements of the knockout cups and the valves 1290 with the movement and position of the mold plate 32. The controller can be pre-programmed, or programmed through the control panel 19, to control the mold plate accelerations, decelerations, advance and retract speeds, and dwell durations. These mold plate movement parameters can be selected depending on the particular product being molded, the characteristics of the food material, the selected production output rate of the machine, or other factors. The controller can control the advance and retract speeds, the accelerations and decelerations, and the dwell durations of the knock out cups 33 as well. These knock out cup movement parameters can be selected depending on the particular product being molded, the characteristics of the food material, the selected production output rate of the machine, or other factors. The controller can have pre-programmed routines for a selectable product and output rate that are selectable via the control panel 19 that sets and coordinates the mold plate 32 movements, the knock out cup 33 movements and the valve 1290 movements.

The controller also controls the operation of the hydraulic cylinders 64, 84 to control the food pumps 61, 62.

Machine Frame System

The preferred embodiment apparatus 20 of the present invention utilizes an exemplary frame 500 as illustrated in FIGS. 2, 3, 5-8 and 26-28, 42-43, and 56-58.

The frame 500 includes a thick base plate 21*a*. The base plate 21*a* comprises a stainless steel plate, ½ inch thick. Two rear anchors 506*a*, 506*b* and two forward anchors 508*a*, 508*b* are fastened to the base plate 21*a* with fasteners 507*a* and keys 507*b*, in a rectangular pattern. The base plate 21*a* and the anchors have recesses or keyways to receive the keys 507*b*.

Two rear struts 510*a*, 510*b* extend obliquely forward in parallel from the rear anchors 506*a*, 506*b* and are fastened thereto using fasteners and shims. Two forward struts 510*a*, 510*b* extend obliquely rearward in parallel from the front anchors 508*a*, 508*b* and are fastened thereto using fasteners and shims.

As illustrated in FIGS. 2, 26, 28, and 56 each rear strut 510*a*, 510*b* comprises a rectangular tube column 510*c* having a plate flange 510*d*, 510*e* welded to each end thereof. The tube columns preferably have 3 inch by 2 inch by ¼ inch thick cross sections. The bottom plate flange 510*d* is fastened to the respective anchor 506*a*, 506*b* using fasteners and shims. Each anchor includes a central stud threaded into the anchor and abutting the respective base plate and used for positioning and spacing the bottom flange 510*d* so that the shims may be installed before the strut is fastened to the anchor. The top plate flange 510*e* is fastened to a vertical backing plate 516 using fasteners 507*a* and a key 507*b* fit into keyways in the flange 510*e* and the backing plate 516.

Figure 56:
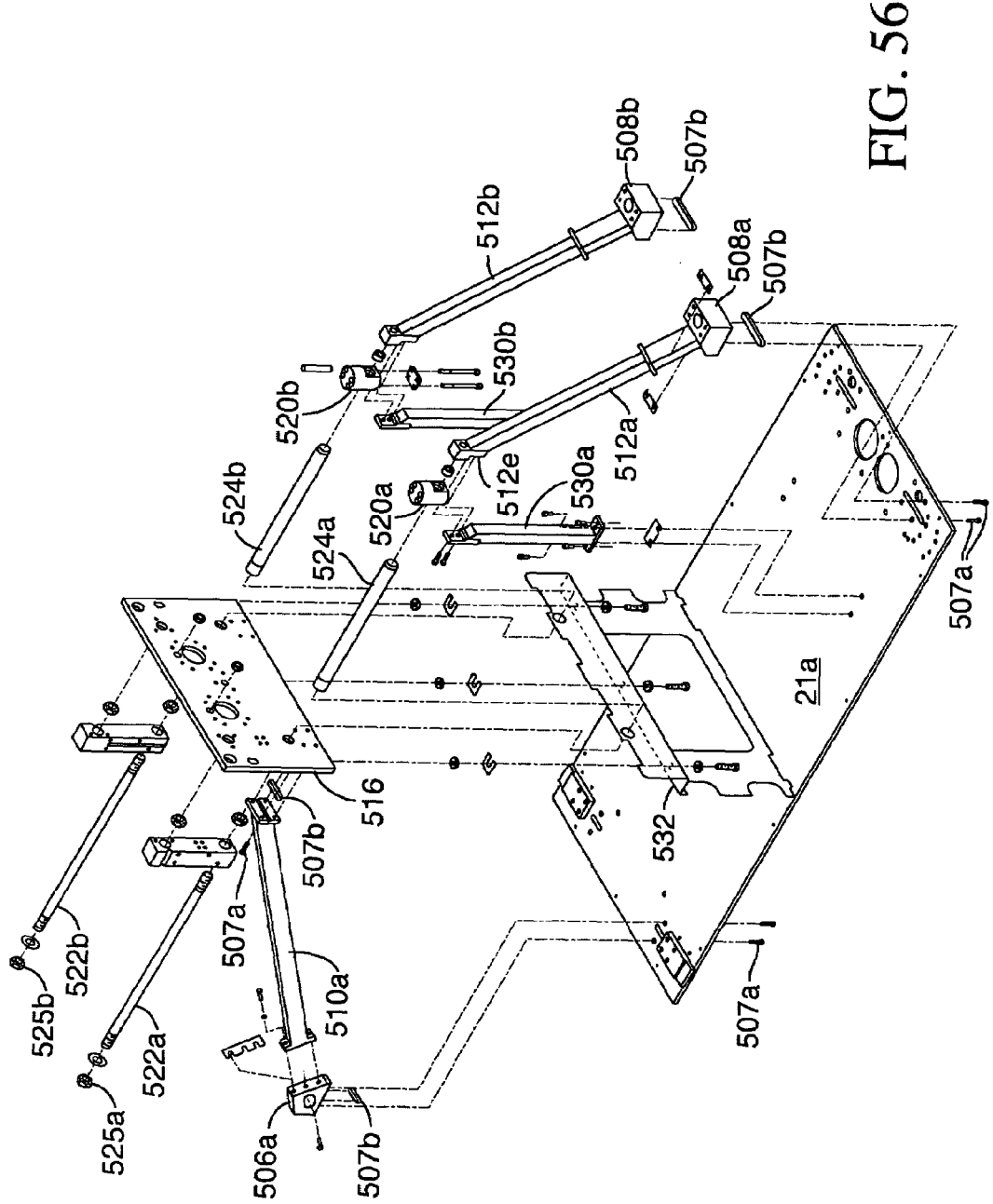
FIG. 56 is an exploded perspective view of a portion of the frame structure of the apparatus.

As illustrated in FIGS. 2, 5 and 56, each of forward struts 512*a*, 512*b* comprises a rectangular tube column 512*c* having a plate flange 512*d* welded to each bottom end thereof and a block flange 512*e* welded to each top end thereof. The tube columns preferably have 3 inch by 2 inch by ¼ inch thick cross sections. Each bottom plate flange 512*d* is fastened to a respective anchor 508*a*, 508*b*. The top block flanges 512*e*, 512*e* are fastened to a respective connection block 520*a*, 520*b*, by a tie rod 522*a*, 522*b* that is threaded into the respective block flange 512*e*. The connection blocks 520*a*, 520*b* are fastened to the manifold 27.

The tie rods 522*a*, 522*b* are surrounded by respective surrounding sleeves or spacers 524*a*, 524*b* located between respective connection block 520*a*, 520*b* and the vertical backing plate 516. The tie rod 522*a*, 522*b* are tensioned by nuts 525*a*, 525*b* via tie backing blocks 526*a*, 526*b*. The spacers 524*a*, 524*b* are compressed between the connection blocks 520*a*, 520*b* and the backing plate 516 when the nuts 525*a*, 525*b* are tightened.

The tie rods 522*a*, 522*b* are preferably 1¼ inch in diameter and the spacers are 2¾ inch in outside diameter.

The connection blocks 520*a*, 520*b* are supported by internal columns 530*a*, 530*b* that are fastened to the base plate 21*a* (FIGS. 2 and 13) and the block flanges 512*e*. The internal columns 530*a*, 530*b* are preferably square tubes having a 2 inch by 2 inch by ¼ inch thick cross section. The vertical backing plate 516 is supported by a wall 532 provided within the machine base 21. The plate 516 is fastened to the wall 532.

Figure 8:
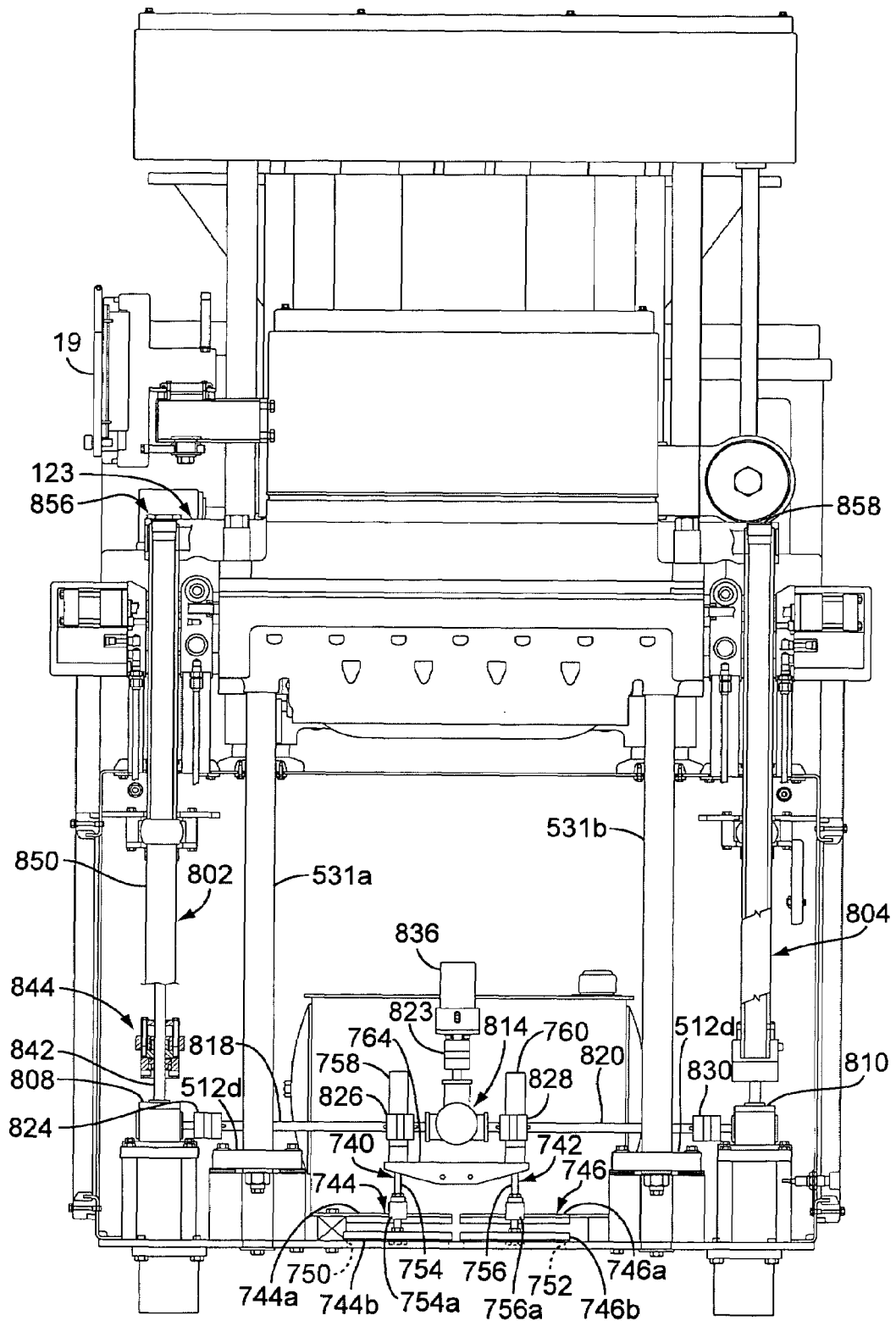
FIG. 8 is a sectional view taken generally along line 8-8 of FIG. 2, with components and/or panels removed for clarity.
Figure 58:
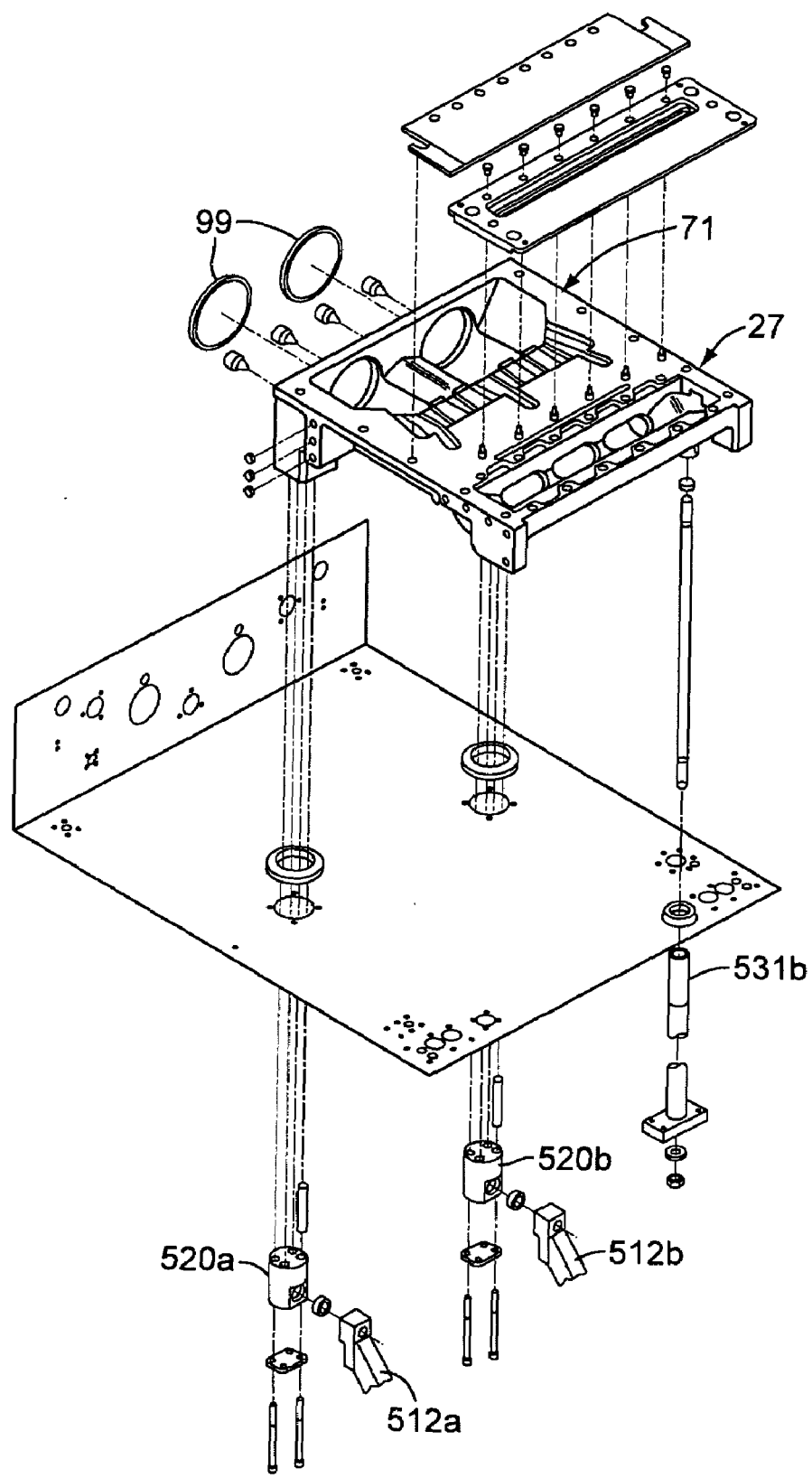
FIG. 58 is an exploded perspective view of a front portion of the frame structure of the apparatus.

A pair of columns 531*a*, 531*b* supports the manifold 27 at a front of the machine (FIGS. 2, 8, and 58). The columns are formed by tie rods 531*c* surrounded by tubular spacers 531*d*. The tie rods 531*c* are fastened to the anchors 508*a*, 508*b* using nuts 531*e*. The upper end of the tie rod can be threaded into the manifold 27. The tubular spacer is compressed between the manifold 27 and the respective anchor 508*a*, 508*b* when the nuts 531*e* are tightened.

As shown in FIGS. 3 and 6, three more tie rods, with associated spacers or sleeves are used. Two top level tie rods 532*a*, 532*b*, surrounded by spacers or sleeves 536*a*, 536*b*, and located laterally outside the pump cavities 69, 89 are threaded into threaded bores in the pump housing 71. The tie rods 532*a*, 532*b* are tensioned with nuts 537*a*, 537*b* on a rear side of backing plate 516, via the backing blocks 526*a*, 526*b*. A central tie rod 540 surrounded by a spacer or sleeve 542 and located laterally between the pump cavities 69, 89 is threaded into a threaded bore in the pump housing 71 and is tensioned by a nut 543 and washer pressed directly against the backing plate 516.

The tie rods, when tensioned, compress the spacers or sleeves 525*a*, 525*b*, 536*a*, 536*b* and 542 tightly between the backing plate 516 and the pump housing 71 and the connection blocks 520*a*, 520*b* which are fastened to, or formed as part of the manifold housing 71.

The tie rods 532*a*, 532*b*, 540 have a diameter of 1¼ inch and the spacers 536*a*, 536*b* and 542 have a 2¾ inch outside diameter.

The hydraulic cylinders 64, 84 have front flanges 64*a*, 84*a* bolted to the backing plate 516 via two reinforcing washer plates 548*a*, 548*b*. Thus, when one of the hydraulic cylinders 64, 84 drives the respective piston 66, 68 into the pump cavity 69, 89 to pressurize the food product therein, a reaction force is created that tends to separate the backing plate 516 from the pump housing 71. The five tie rods oppose this reaction force by tension in the tie rods. Because the tie rods take up this reaction force, instead of the machine frame, the associated stress within the machine frame is reduced, or eliminated.

Figure 29:
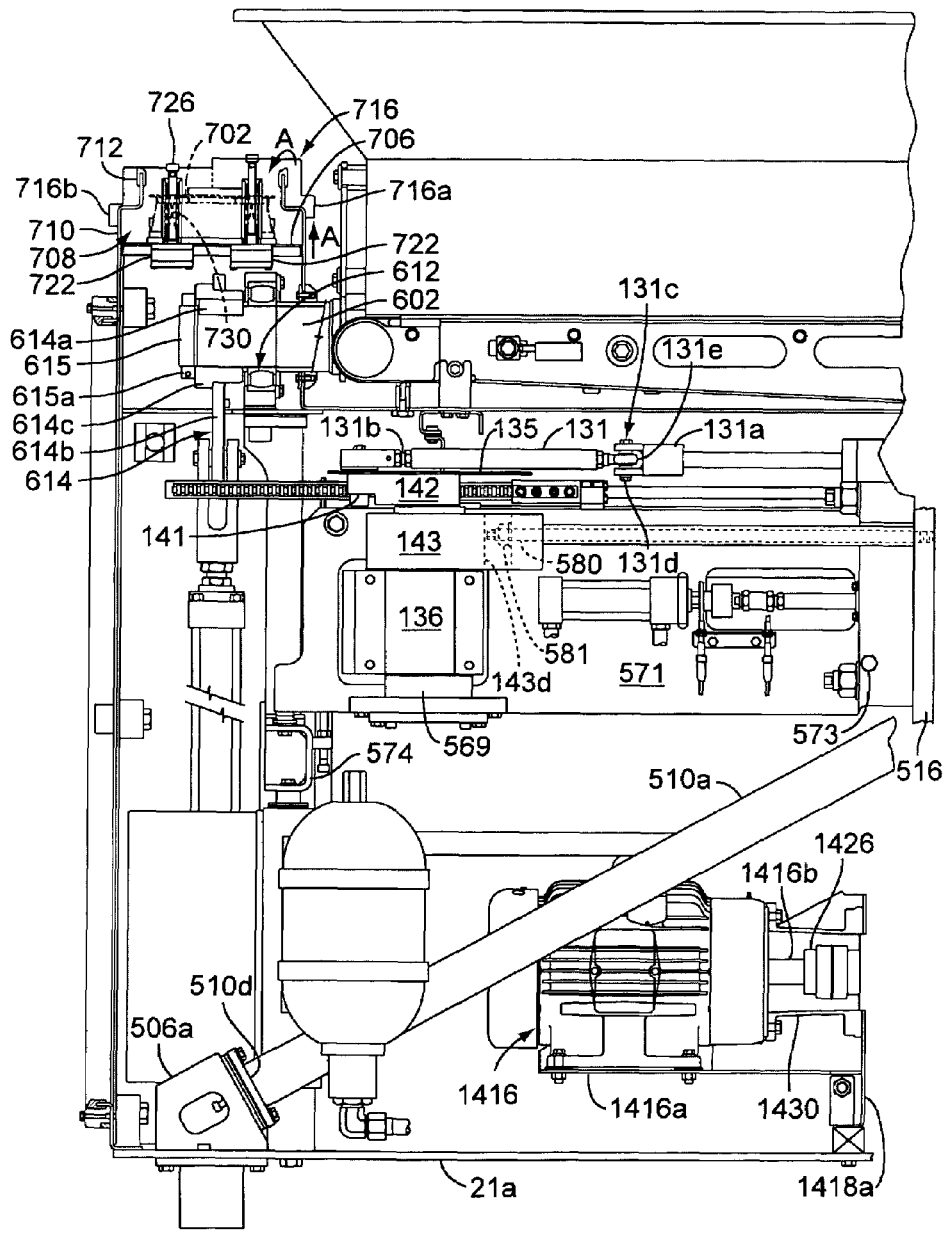
FIG. 29 is an enlarged, fragmentary sectional view taken from the left side of FIG. 2.

As shown in FIGS. 3 and 6, the T gear box 137 is supported from a pedestal 568 on a support plate 570. The right angle gearboxes 136 are also supported from pedestals 569 fastened to the plate 570 (FIG. 29). The support plate 570 is fastened to a bottom of two vertically oriented, parallel, longitudinally arranged plates 571, 572. The plates 571, 572 are supported at a rear by being fastened to a crossbeam 574 that is supported by sidewalls of the machine base 21.

Figure 57:
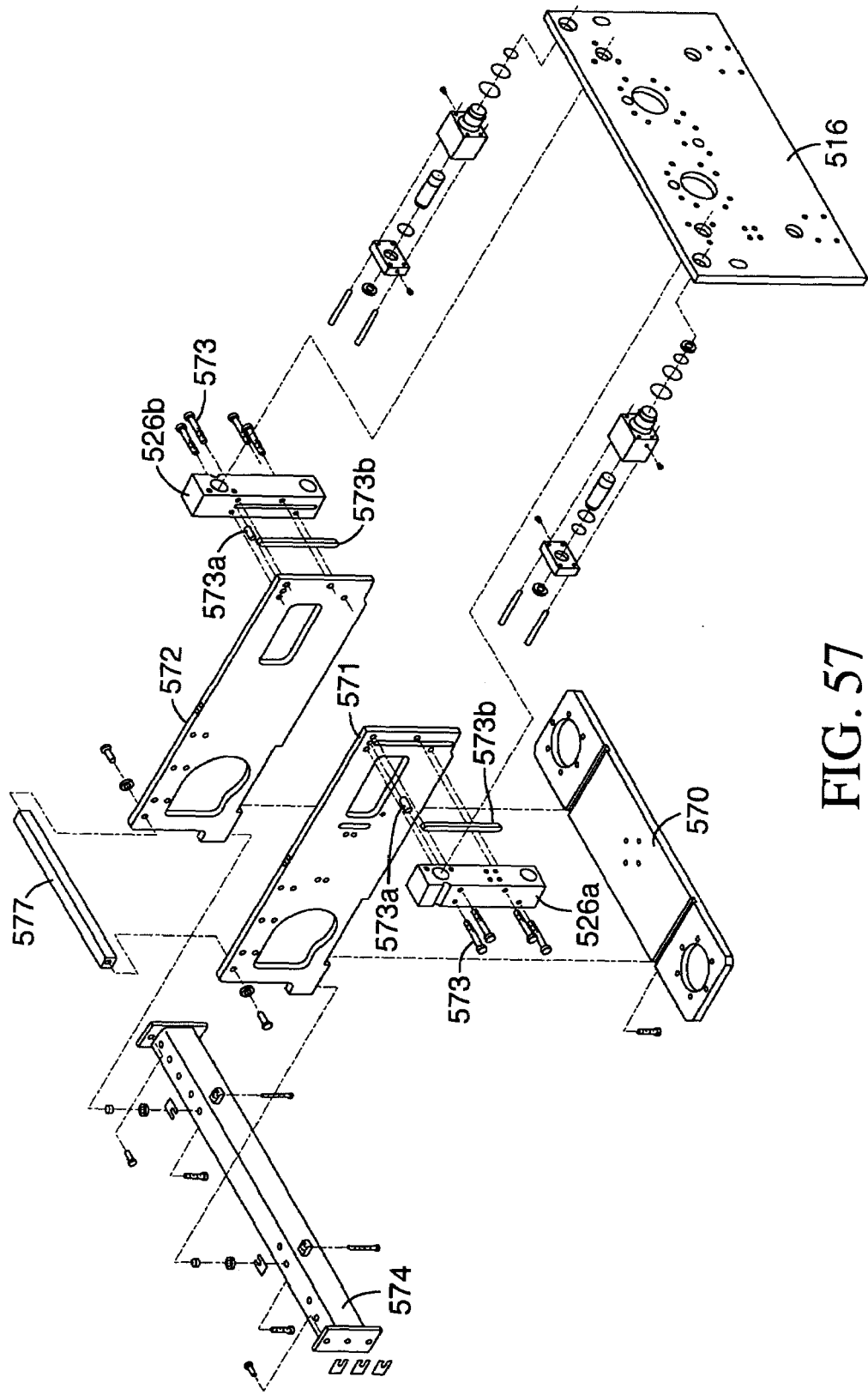
FIG. 57 is an exploded perspective view of a rear portion of the frame structure of the apparatus.

The longitudinally arranged plates 571, 572 are laterally braced by a cross brace 577. The plates 571, 572 extend to the backing plate 516 and are fastened thereto by being fastened to the backing blocks 526*a*, 526*b* respectively by fasteners 573, locating pins 573a, and keys 573b fit into corresponding keyways in the blocks 526a, 526b and the plates 571, 572 (FIG. 57).

According to the preferred embodiment, the backing plate 516 has a thickness of 1¼ inches. The plates 571, 572 can have thicknesses of ¾ inches and heights of 13¼ inches. The support plate 570 can have a thickness of 1¼ inches.

For additional rigidity, the bearing housings 143 that are located above each right angle gear box 136, are connected by pre-stressed tie rods 580a, 580b to the backing plate 516. The tie rods 580a, 580b are threaded into tapped holes in the backing plate 516 and secured to each respective housing 143 by a nut 581. A vertical, rectangular opening 143d is provided through each bearing housing 143 to access the nuts 581 (FIG. 29). Each nut 581 is threaded onto an end of one rod 580a, 580b and tightened against the respective bearing housing 143. The tie rods 580a, 580b are surrounded by respective tubes 582a, 582b. The tubes 582a, 582b are compressed between a respective housing 143 and the backing plate 516 when the nuts 581 are tightened onto the tie rods 580a, 580b. The tie rods 580a, 580b, and the tubes 582a, 582b fix the bearing housings 143 with respect to the backing plate 516. The tie rod 580b and tube 582b are not shown in FIG. 29 but are identically configured and attached in parallel fashion as the tie rod 580a, 582a. The tie rods have a diameter of ¾ inches.

Figure 28:
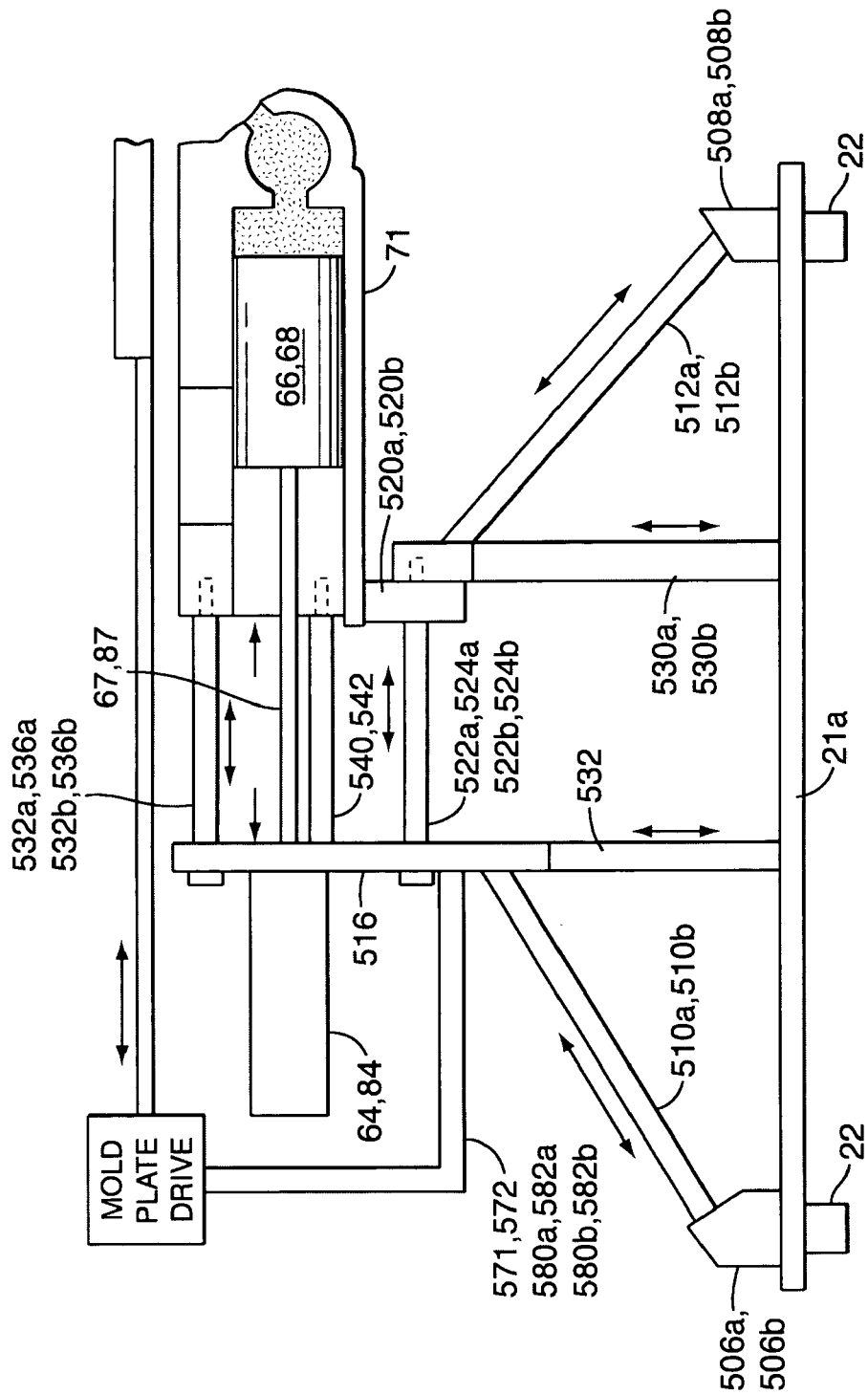
FIG. 28 is a diagrammatic view of the frame system of the invention.

As shown in FIG. 28, reciprocating forces from the mold plate and drive system originate substantially in the horizontal plane of movement of the mold plate. These reciprocating forces are resisted by forces transmitted through the plates 570, 571, 572 and the tie rod/tube combinations 580a, 582a and 580b, 582b to the vertical backing plate 516. The horizontal component of some of the reciprocation forces is transferred through the vertical backing plate through the rear struts 510a, 510b and into the base plate 21a.

The horizontal component of some of the reciprocation forces is transferred through the tie rod/tube combinations 532a, 536a; 532b, 536b; 540,542; 522a, 524a; and 522b, 524b to the pump housing 71 and the blocks 520a, 520b. These forces are transferred through the blocks 520a, 520b through the forward struts 512a, 512b and into the base plate 21a.

According to one aspect of the invention, the individual struts 510a, 510b, 512a, 512b are removable given the fact that they are fastened in place using fasteners and can be removed from the machine base 21 and replaced. This is particularly advantageous during assembly and replacement of other components, wherein the struts can be removed for access to other components within the machine base 21.

All of the internal structural members can be composed of structural steel, except the base plate 21a is preferably composed of stainless steel and the pump housing 71 and manifold 27 are preferably composed of stainless steel. FIG. 58 illustrates the pump housing 71 and the valve manifold 27 as a single cast stainless steel part. By forming these parts as a unitary part, significant assembly time is reduced, and the machine part count is reduced.

Hopper System

The hopper 25 can be constructed as a unitary, one piece part (FIG. 13), comprised of a 0.09 inch thick welded and polished stainless steel part. A one piece hopper is advantageous to reduce leakage.

As shown in FIG. 3, the hopper 25 is supported at a rear by a hinge shaft 602 via a rear bracket 604 that is fastened to a rear wall 25d of the hopper 25. The bracket 604 is fixed to the hinge shaft 602 to rotate therewith. The fixing can be by a press fit engagement, a keyed arrangement between the bracket and the shaft, or by the bracket being fastened to the shaft with fasteners, or by another known non-rotation fixation method.

As shown in FIGS. 4, 5, 16, 27 and 29, the hinge shaft 602 is supported from the machine base 21 and journaled for rotation by a rear support 606 (FIGS. 4 and 16) and by a front support 608 (FIG. 5). The rear support 606 includes a roller bearing 612 that surrounds the hinge shaft 602 and provides for a reduced-friction rotation of the hinge shaft. The front support 608 comprises a sleeve bearing that provides for a reduced-friction rotation of the hinge shaft.

Figure 44:
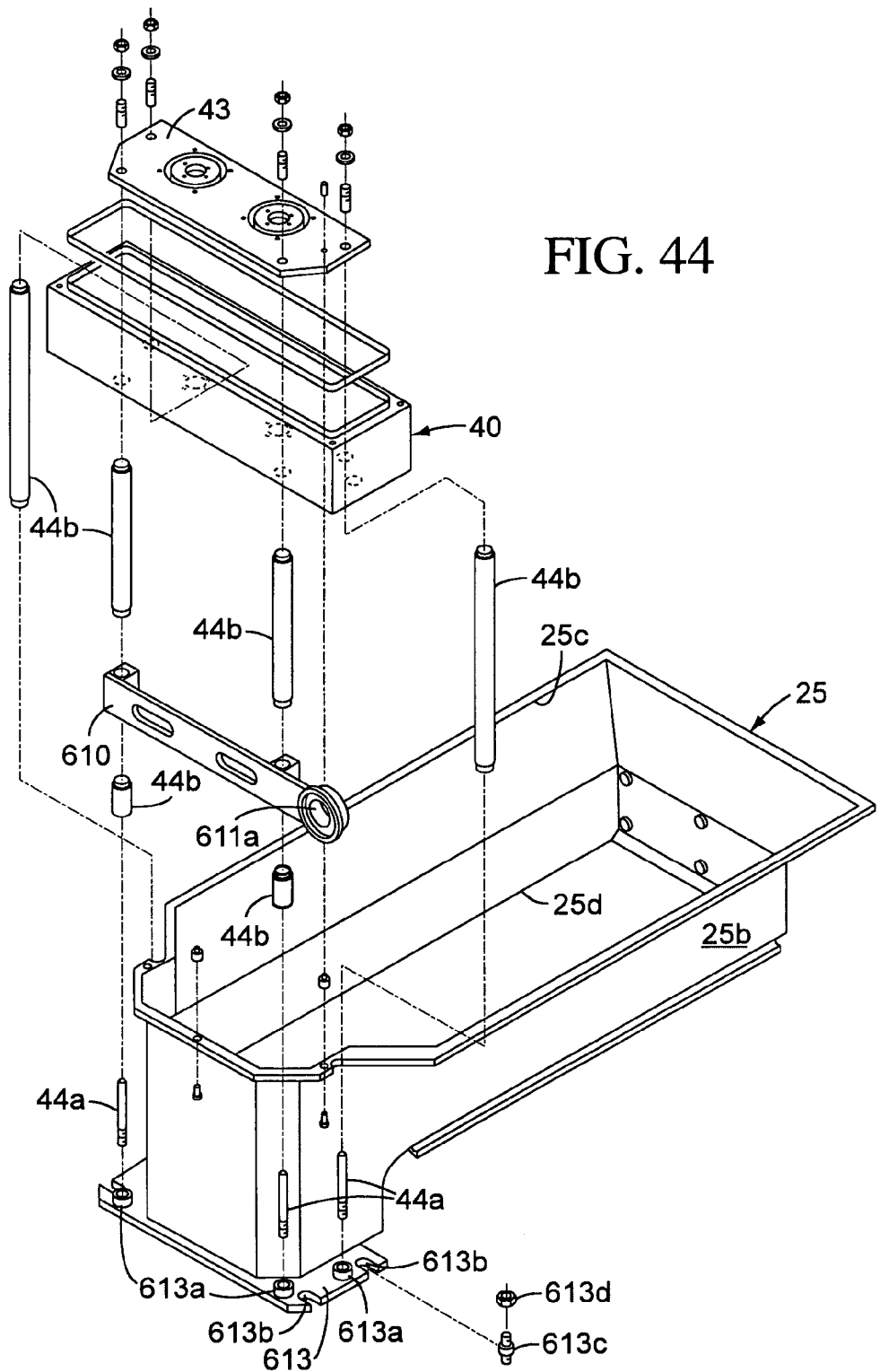
FIG. 44 is an exploded perspective view of a hopper and some attached components of the patty-forming machine.

As shown in FIGS. 5 and 44, the hopper 25 and feed screw frame 42 are fixed to the shaft 602 by a bracket 610 that includes two bosses 610a each with a bore 610b. The bracket 610 is fixed to rotate with the shaft 602 by use of a non-circular, hexagonal opening 611a in the bracket 610 (See FIG. 13) that fits tightly over a correspondingly shaped end protrusion 611b (FIG. 4) of the shaft 602. The bracket is then tightly clamped to the shaft by a bolt 609 and a washer 609b (FIGS. 4 and 5), the bolt 609 engaged into a threaded bore in the protrusion 611b. The bracket 610 is fixed to the frame 42 by the bosses 610a being fit within a gap along the spacers 44b of the front two spacers 44b and the associated tie rods 44a being inserted through the bosses 610a and spacers 44b and then tightened. The tie rods 44a are tightened via threaded inserts 613a to a horizontal plate 613 that forms part of the hopper assembly.

Also shown in FIG. 44, the base plate 613 includes four slots 613b, arranged symmetrically, two on each side of the hopper. Four studs 613c (one shown) are threaded into threaded holes in the pump housing 71, and fit within the slots 613b when the hopper is pivoted down to its operational position. Four nuts 613d secure the base plate 613 and the hopper 25 to the pump housing 71.

Figure 16A:
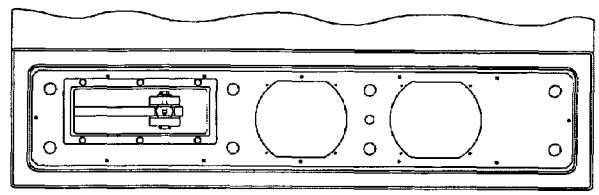
FIG. 16A is a fragmentary sectional view taken generally along line 16A-16A of FIG. 16.
Figure 16:
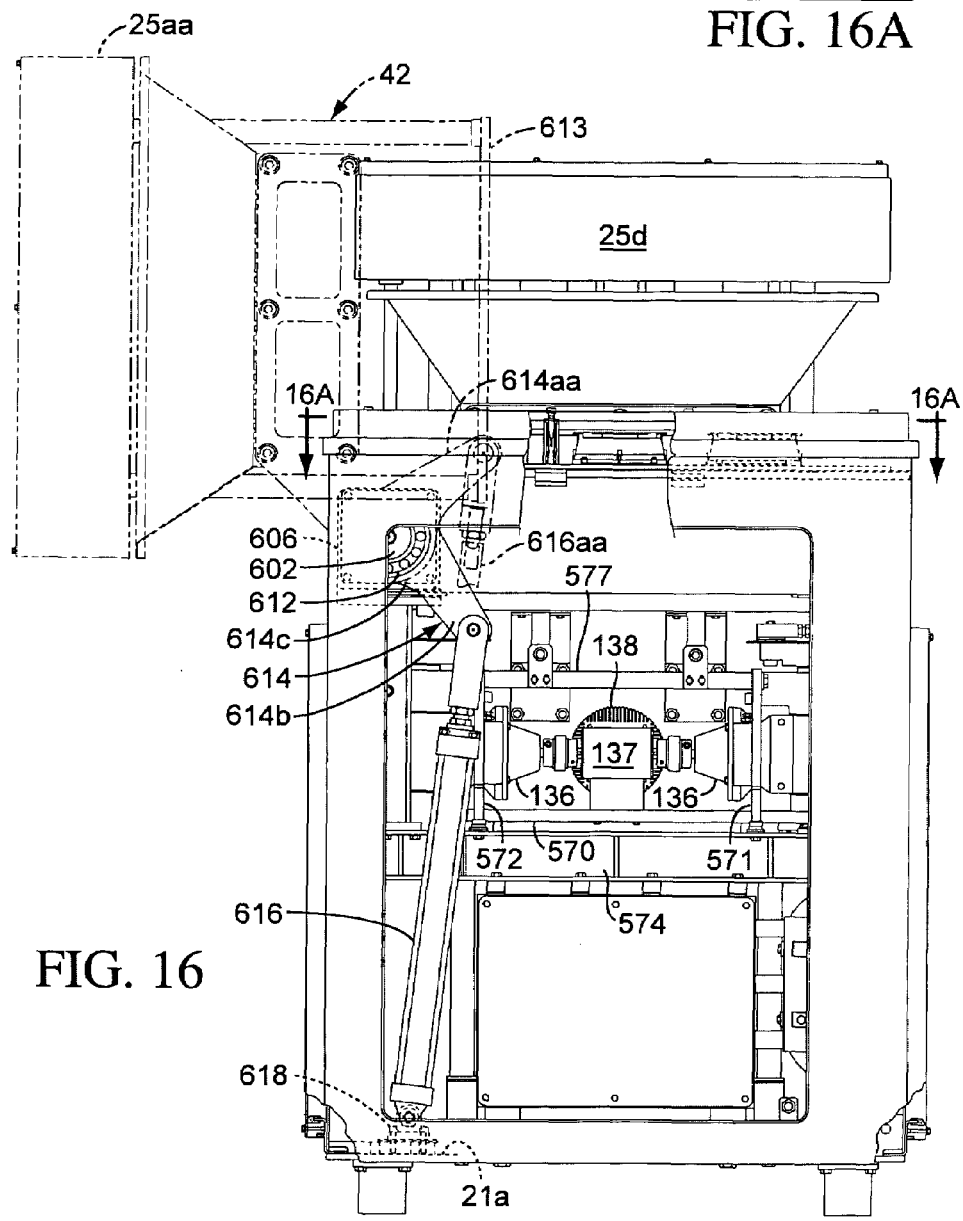
FIG. 16 is a fragmentary sectional view taken generally along line 16-16 of FIG. 2.

At a rear of the apparatus, as shown in FIGS. 16 and 29 a crank lever 614 is provided that is keyed by a key 614a to the shaft 602.

A large threaded lock nut or lock collar 615 is threaded tightly onto a threaded end of the shaft and locked with a set screw 615a. The crank lever 614 is pivotally connected at a distal end to an actuator, such as a hydraulic cylinder 616. The cylinder 616 is pivotally connected at an opposite end thereof to an anchor lug 618 fixed to the base plate 21a. The cylinder is signal-connected via a hydraulic/electronic interface to the machine controller. Expansion of the cylinder 616 causes the crank lever 614 to be turned counterclockwise (FIG. 16) by about 85 degrees to the position shown as 614aa. The shaft 602 is thus turned about 85 degrees, as is the hopper 25 to the position marked 25aa.

By rotating the hopper 25 to the position shown as 25aa, the conveyor belt 31 is exposed for cleaning or removal. The plate 613, being a part of the hopper assembly, pivots with the hopper 25, as does the frame 42.

Figure 4:
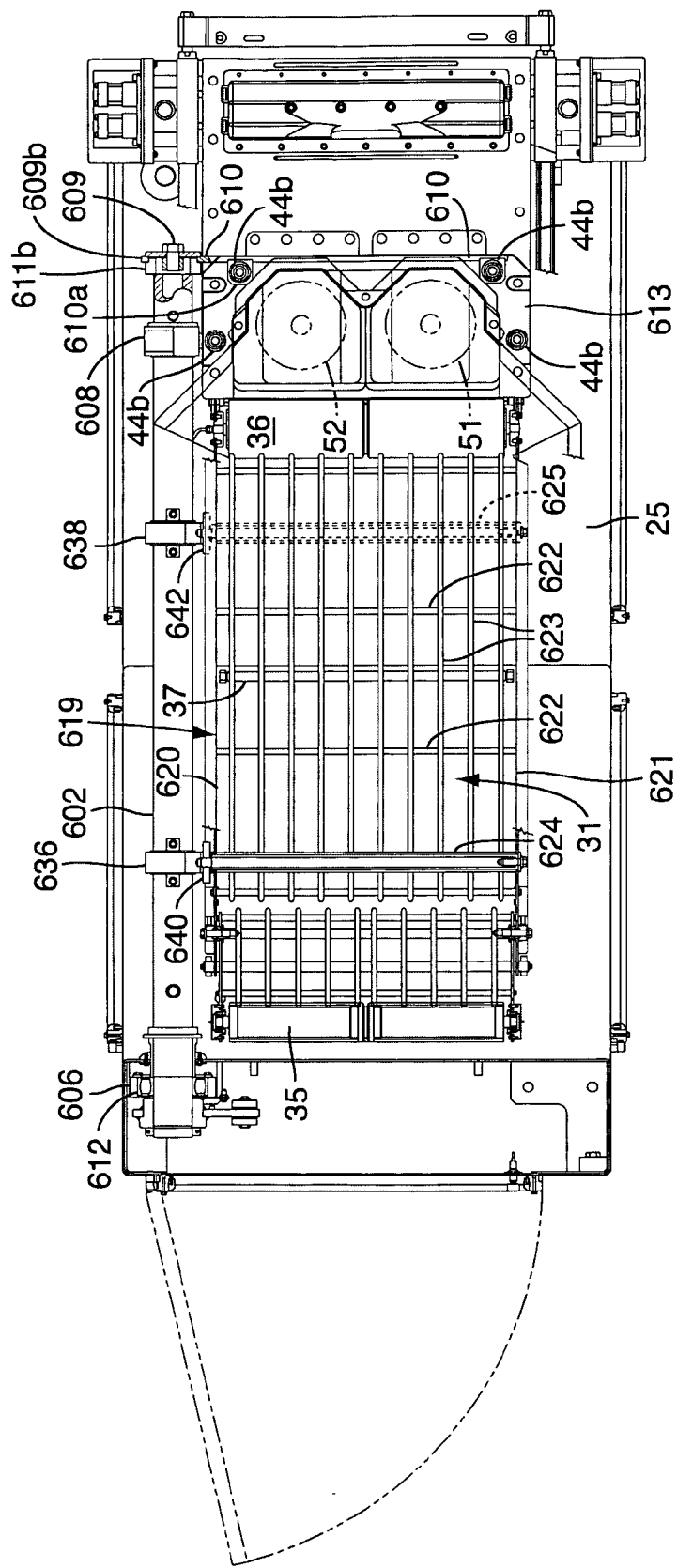
FIG. 4 is a sectional view taken generally along line 4-4 of FIG. 2, with components and/or panels removed for clarity.

As a further aspect of the embodiment, as shown in FIGS. 2 and 4, the conveyor 30 includes a frame 619 having a hinge-side sidewall 620, an opposite-side sidewall 621, a plurality of lateral tie rods 622, a plurality of longitudinal ribs 623 supported on the tie rods 622, and two lateral tie rod beams 624, 625. The lateral tie rods 622 and the tie rod beams 624, 625 each have surrounding sleeves or spacers between the sidewalls 620, 621 and are fixed at opposite ends by nuts or the like to the sidewalls 620, 621. The conveyor frame 619 is simply supported on the machine base along the opposite-side sidewall 621.

Two intermediate fixtures 636, 638 (FIGS. 4, 16B-16D) are welded or otherwise fixed to the wall 620 of the conveyor and surround the shaft 602. The intermediate fixtures 636, 638 are rotatable with respect to the shaft 602 about the axis of the shaft 602. The fixtures 636, 638 have cross pins 640, 642 respectively. The fixtures are in two pieces that are assembled around the shaft using fasteners 643. Two lift pins 644, 646 with enlarged heads extend from the shaft adjacent opposite sides of each fixture 636, 638. The pins are press fit and fixed into bores in the shaft 602 by fasteners 648. During rotation of the shaft 602 by about 85 degrees for the hopper 25 to assume the position indicated as 25aa in FIG. 10, the pins 644, 646 sweep a first portion of the 85 degrees freely until contact is made with the pins 640, 642. The pins 644, 646 sweep the last portion of the 85 degrees, lifting the pins 640, 642 and rotating the conveyor upward about 13 degrees. This raises the conveyor from its support on the opposite-side 621 of the frame 619. At this position, the conveyor can be cleaned or repaired as required. The surface area beneath the conveyor belt can be cleaned as well. The conveyor belt 31 can be removed and/or cleaned.

Although the 85 degree hopper tilt and 13 degree conveyor tilt are advantageous, it is anticipated that other angular tilts such as 45 degrees-90 degrees for the hopper and 10 degrees-30 degrees for the conveyor may be advantageous as well. The location and size or shape of the pins 644, 646 can be adjusted to select the hopper and conveyor tilt amounts.

The hopper 25 and conveyor 30 are pivoted by the actuator 616 via the machine controller, particularly by instructions give to the controller via the control panel 19.

The hopper tilt system is configured such that apparatus can be easily factory converted from a right side operating apparatus to a left side operating apparatus, that is, the hopper assembly is factory reversible across the longitudinal centerline of the apparatus. For example the crank lever 614 comprises a lever arm 614b that is welded to a collar 614c that is secured to the shaft 602. In the factory, the lever arm 614b can easily be switched for a right side operation by flipping over the lever arm and welding the lever arm the collar. The remaining shaft supports and brackets can be reused for mounting the system on the opposite side of the machine. Parts needing to be designed and manufactured can be reduced, given the bidirectional feature of the design.

Cooling Air System

The present invention also provides an improved cooling air system. The cooling air system includes two axial fans 702, 704 shown in FIGS. 16 and 29 that draw air in on a top side and discharge air downward into the machine base 21. The fans 702, 704 are mounted on elevated baffle plate 706 within a fan chamber 708. The baffle plate 706 provides openings beneath the fans 702, 704, for axial airflow into the machine base 21. The fan chamber includes a rectangular surrounding side wall 710 having a seal 712 around its upper lip.

A cover 716 is provided over top side wall 710. The cover 716 is movable up-and-down. In FIG. 29, the cover 716 is shown in broken fashion to illustrate the movement of the cover 716. It is understood however that the cover 716 is one part and is either raised her lowered as one part. The elevated position of the cover 716 is indicated as 716a shown on the right side half of the cover 716 and the lowered position is indicated as 716b shown on the left side half of the cover.

Plural pneumatic cylinders 722, eight according to the preferred embodiment, are fastened at base ends to the baffle plate 706. The pneumatic cylinders include extendable rods 726 that are fastened to the cover 716. The cylinders 722 are configured such that when energized with pressurized air the cylinders extend rods 726 to elevate the cover 716 to the position indicated as 716a, held above the seal 712. Outside air can be admitted under the cover and up and over the seal 712 to the inlet of the fans 702, 704 as indicated by the arrows "A." The cylinders 722 overcome the compression force of springs 730 within the cylinders 722 to elevate the cover 716 as shown in position 716a. If the cylinders 722 are de-energized, such as by loss of electrical power to the apparatus 20, the springs 730 urge the cover 716 downward onto the seal 712, as shown in position 716b, to close the inlet.

During operation, the cylinders 722 are energized, and the cover 716 is elevated as shown in position 716a. The fans 702, 704 force air through the machine base 21.

Figure 7:
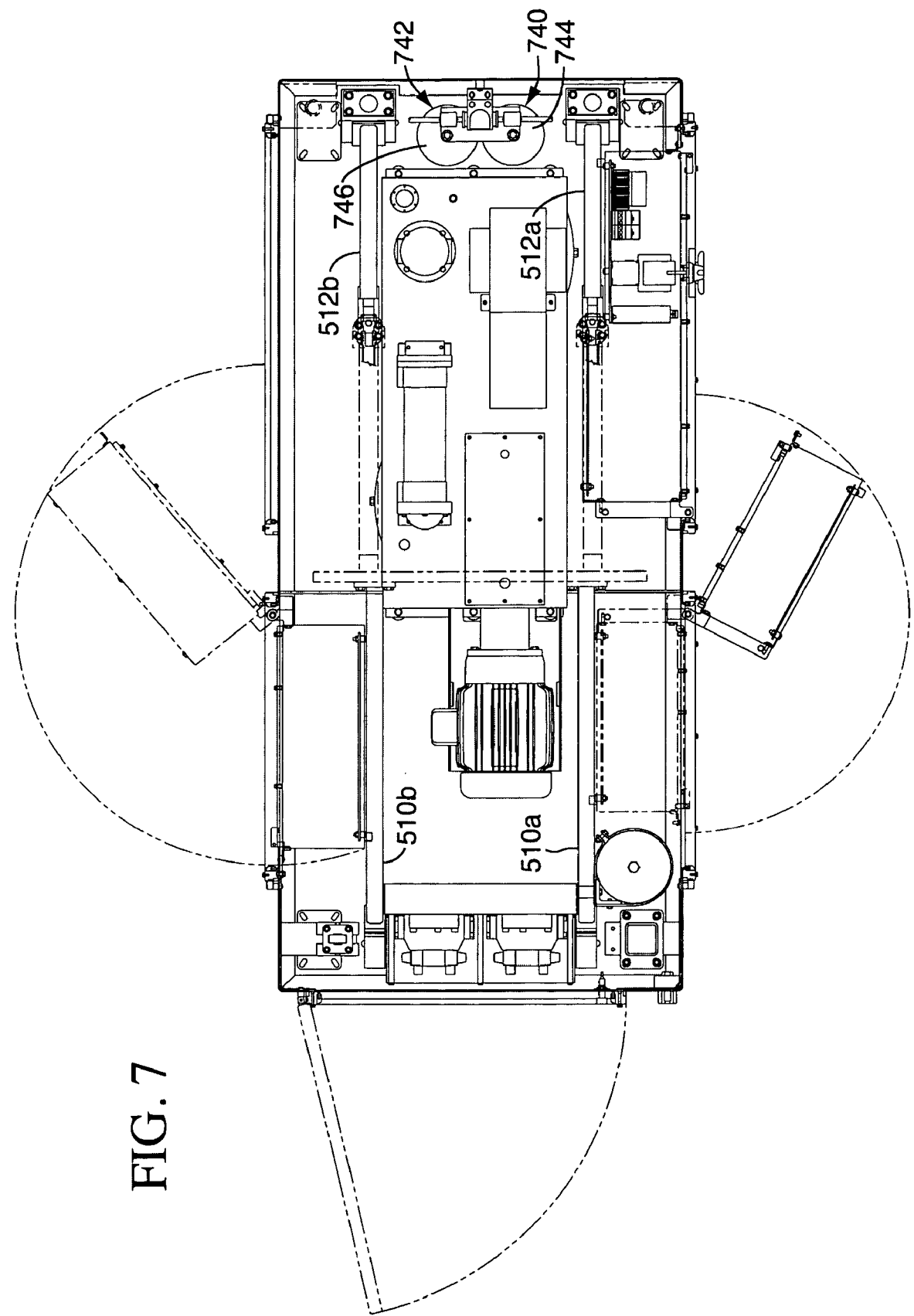
FIG. 7 is a sectional view taken generally along line 7-7 of FIG. 2, with components and/or panels removed for clarity.

Air passes through the machine and exits the machine base 21 at a front of the machine base 21. As shown in FIGS. 7 and 8, two air exit dampers 740, 742 are provided having shut off plates 744, 746. The shut off plates 744, 746 are positioned over air openings 750, 752 through the base plate 502. The plates 744, 746 are carried by rods 754, 756 via self aligning couplings 754a, 756a and are raised and lowered by cylinders 758, 760. The cylinders are supported by a bracket 764 from the machine base 21 or other stationary structure.

Within the cylinders 758, 760 are springs (not shown) that are configured to urge the plates 744, 746 downward from the elevated, open position indicated as 744a, 746a to the lowered, closed position indicated as 744b, 746b. During operation, cylinders 758, 750 are energized and pneumatic pressure elevates the plates 744, 746 to the position 744a, 746a, overcoming the urging of the springs within the cylinders 758, 760.

If power is interrupted to the apparatus 20, the plates 744, 746 are lowered by the springs within the cylinders 758, 760 to close the air exit dampers 740, 742.

When the apparatus 20 is washed and sanitized, power is normally shut off. Because power is interrupted, the cover 716 is automatically closed and the air exit dampers 740, 742 are automatically closed. Thus, spray, wash water and debris are prevented from entering the machine base 21.

The hopper tilt system, the control panel 23, and the cooling air system are configured such that apparatus can be easily factory converted from a right side operating apparatus to a left side operating apparatus, that is, factory reversible across the longitudinal centerline of the apparatus.

Hydraulic System

The apparatus incorporates a hydraulic system such as described in U.S. Pat. No. 3,887,964 or Re 30,096, herein incorporated by reference, or as currently used on FORMAX F-26 machines. In such systems a lower pressure, higher volume hydraulic pump and a higher pressure, lower volume hydraulic pump are used. The lower pressure pump is useful for moving the hydraulic piston and the associated plunger a large distance such as from a retracted position to a position wherein the food product is initially compressed within the cylinder by the plunger. The higher pressure pump is useful to move the plunger an incremental distance each mold plate reciprocation cycle, to deliver food product under pressure into the mold cavities.

One improvement in the present invention is the fact that the lower pressure pump 1410 and the higher pressure hydraulic pump 1414 are both driven by a common electric motor 1416, in series on the motor output shaft, wherein the pumps 1410, 1414 are located in the hydraulic fluid reservoir 1418, submerged below a hydraulic fluid fill line 1417. By being submerged, the pumps run quieter, cooler and more efficiently.

Figure 55:
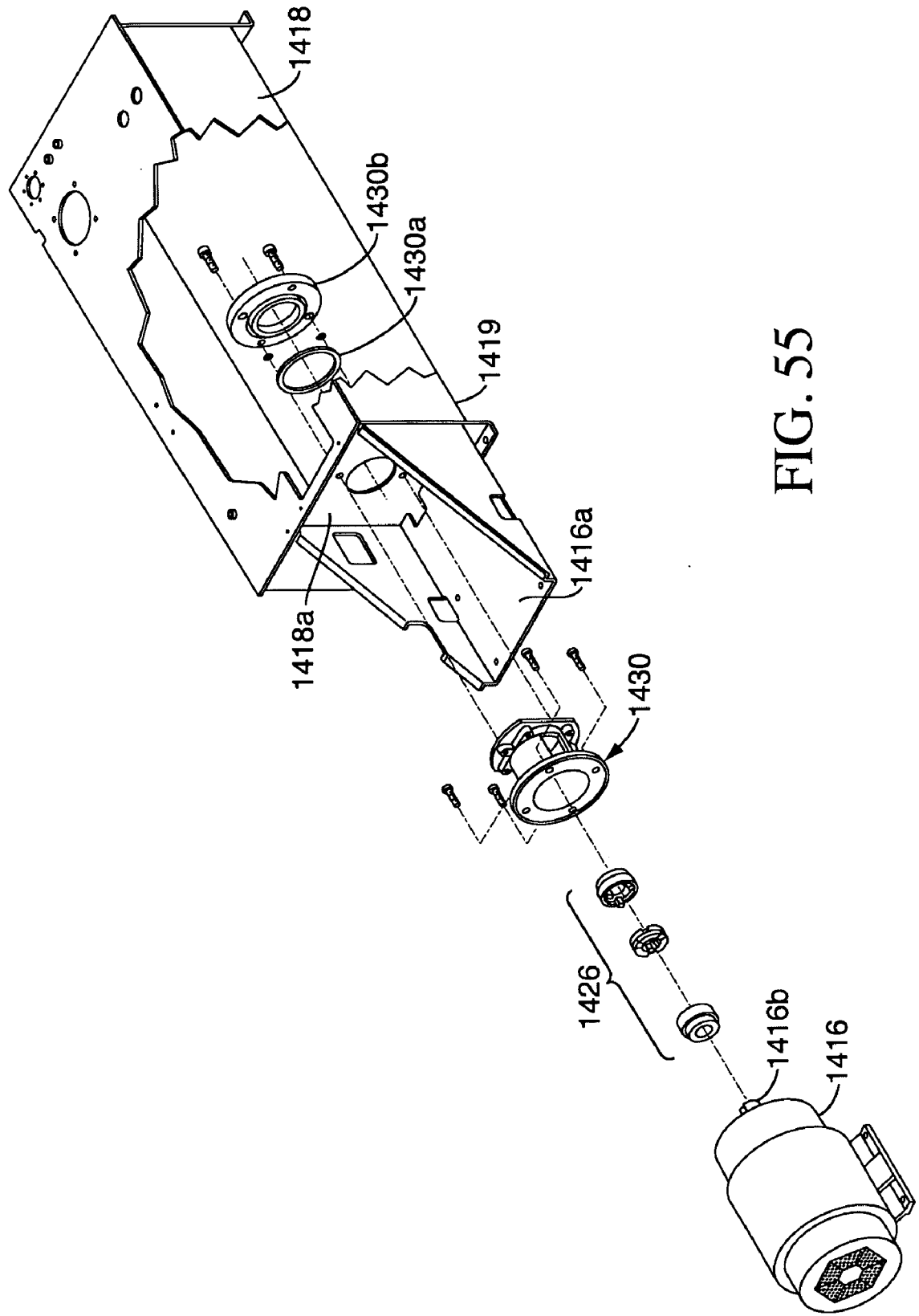
FIG. 55 is an exploded perspective view of a portion of FIG. 2.

The motor 1416 is preferably a 15 HP totally enclosed, fan cooled motor. As shown in FIGS. 29 and 55, the motor 1416 is supported on a platform 1416a that is supported in cantilever fashion from the reservoir 1416. The motor includes a rotary output shaft 1416b.

The reservoir 1418 is preferably a stainless steel tank. A bottom 1419 of the reservoir is advantageously visible for inspection and cleaning and sanitizing. The reservoir 1418 can be elevated from the base 21a on isolation mounts.

As shown in FIG. 2, the pumps 1410 and 1414 have pump shafts 1424a, 1424b connected by a coupling 1424c, shown dashed. As shown in FIGS. 29 and 55, the pump shaft 1424a is coupled to the motor output shaft 1416b by a mechanical coupling 1426. A motor mount 1430 surrounds the coupling 1426 as it is sealed to a wall 1418a of the reservoir 1418 by a ring seal 1430a clamped between a backing ring 1430b that is fastened through the wall 1418a to the motor mount 1430. The lower pressure pump 1410 is bolted to the backing ring in sealed fashion.

Mold Cover Lift System

During mold plate change or to clean the apparatus, it is necessary to lift the mold housing or mold cover 123 from above the mold plate 32. The bolts 125 are removed as a first step for lifting of the housing 123.

A mold housing lift mechanism 800 is mounted inside the machine base 21 and extends upward to the housing 123. The lift mechanism includes two jacks 802, 804 shown in FIGS. 8 and 27. The jacks are operatively connected to right angle drives 808, 810, which are operatively connected to a T type right angle drive 814, via drive shafts 818, 820 and respective couplings 823, 824, 826, 828, 830. The right angle drive 814 is driven into rotation by a hydraulic motor 836.

The jack 802 is described below with the understanding that the jack 804 is identically configured and functions identically, in tandem, as the jack 802.

As shown in FIGS. 8, 27 and 30-33, the drive 808 turns a threaded rod or jackscrew 842 that drives a nut drive assembly 844 vertically. The jack screw 872 is journaled for rotation at a top end by a guide 845. The jack screw 842 and guide 845 can include a bearing therebetween for smooth journaled rotation of the jackscrew. The drive assembly 844 is operatively connected to a lift column 850 via a bracket 851 which is vertically driven with the drive nut assembly. The columns 850 of the jacks 802, 804, are fixed to the housing 123 by bolts 856, 858. The columns 850 are hollow and can also serve as wire and tube conduits.

Figure 30:
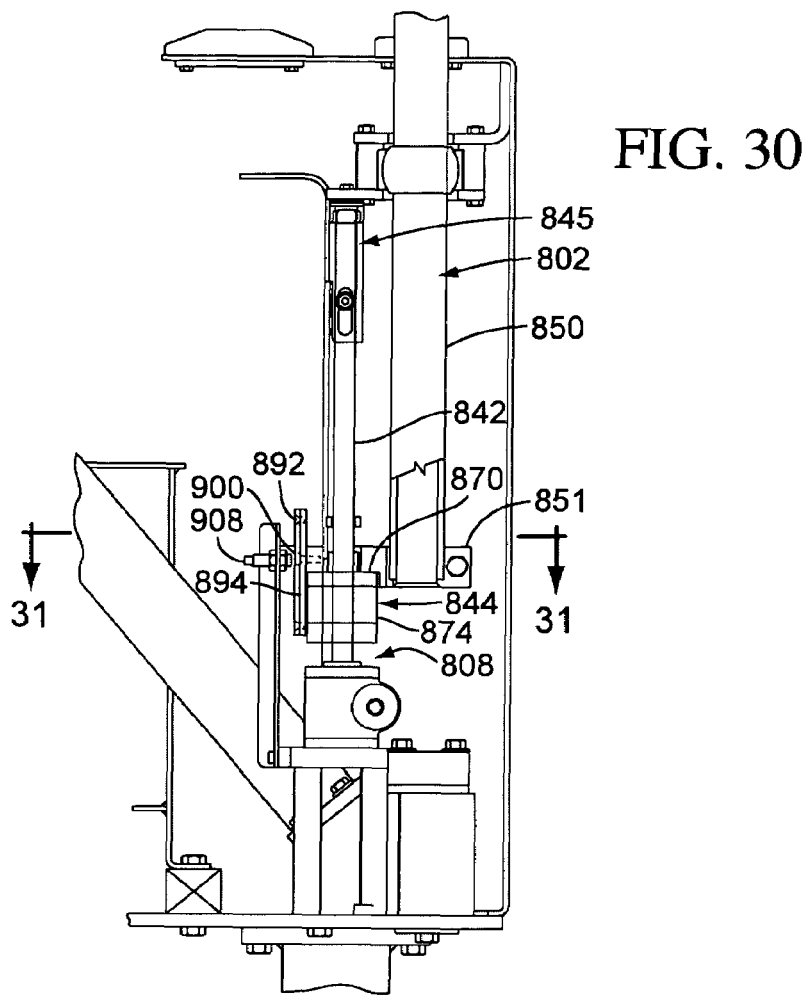
FIG. 30 is an enlarged, fragmentary sectional view taken from a front portion of FIG. 2, with components and/or panels removed for clarity.
Figure 31:
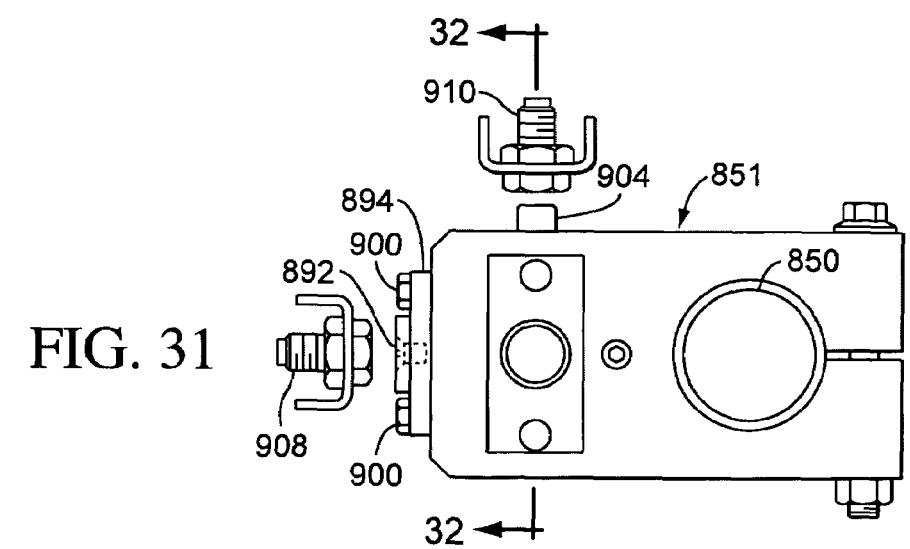
FIG. 31 is sectional view taken generally along line 31-31 of FIG. 30.

As shown in FIGS. 30-31, the bracket 851 is clamped onto a bottom of column 850. The bracket 851 rests on a drive nut 870 that is driven by the drive rod 842. A limit plate 862 is fastened to the drive nut 870 by spacers 867 and fasteners 866. A collar 874 is fastened to the bottom of the drive nut 870 with fasteners 875.

The drive nut 870 has inside threads engaged to the outside threads of the drive rod 842. A secondary nut 882 is threaded onto the jackscrews 842 beneath the drive nut 870.

Proximity target, magnetic plate 892 is fastened to a mounting plate 894 which is fastened to the bracket 851 by fasteners 900. A proximity sensor 908 is mounted within the machine base 21 along the vertical path of the magnetic plate 892 and set at a maximum acceptable. The magnetic plate 892 sets an acceptable vertical range for a mold cover operating elevation. If the mold cover is elevated beyond this range, the sensor 908 will be below the magnetic plate 892 and will so signal the machine controller which will prevent operation of the machine.

A further proximity target 904 is fastened to a lateral side of the bracket 851. Proximity sensor 910 is mounted at an elevated position within the machine base along the vertical path of the target 904 and signals a pre-determined raised maximum height of the mold cover casting for a mold plate change out procedure. The proximity sensor 910 signals the machine controller to stop the motor 836 at that point.

The collar 874 has internal protruding pins 878, surrounding the jackscrew 842 and a secondary nut 882. The secondary nut includes notches 886 for receiving the pins 878. During normal lifting operation, the pins will be engaged to, or will engage, the secondary nut 882 as shown in FIG. 14. The secondary nut 882 ceases to rotate freely with the jackscrew 842 and thereafter travels with the assembly 844 up and down on the jackscrew 842. The secondary nut 882 provides backup support for the drive nut 870 in the unlikely event that the drive nut fails to support the bracket 851.

Figure 32:
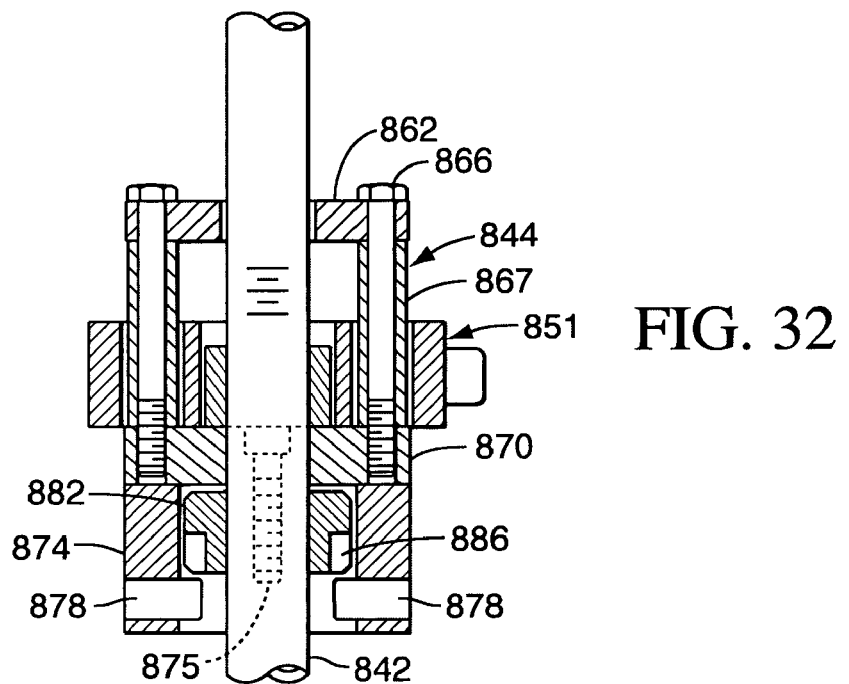
FIG. 32 is sectional view taken generally along line 32-32 of FIG. 31 in a first stage of operation.

As shown in FIG. 32, before engagement with the pins of the drive nut assembly 844, the secondary nut 882 is free to rotate with the jackscrew 842 between the nut 870 and the pins 878. Once the pins 878 are relatively elevated with respect to the nut 882 to engage the notches 886 the secondary nut moves vertically with the assembly 844. If the drive nut 870 fails during lifting, the secondary nut 882 is in a position to support the drive nut assembly and bracket 851, but will not function to lift the nut assembly 844. If the jackscrew is turned, the secondary nut 882 will rise to the point until it disengages from the pins 878 and then turn substantially freely with the rotating jackscrew 842.

Figure 33:
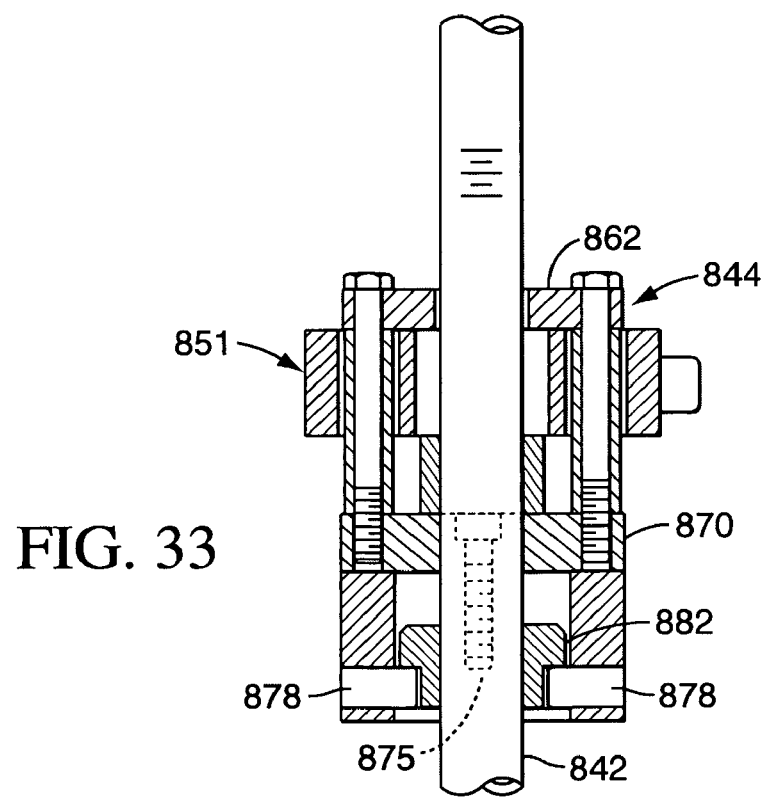
FIG. 33 is sectional view similar to FIG. 31 in a second stage of operation.

FIG. 33 illustrates the assembly with the mold cover lowered and the nut 870 lowered a further amount with the plate 862 contacting, or adjacent to, the bracket 851. Thus, the nut assembly 844 can completely disengage from the bracket 851.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. In a patty-forming apparatus having a machine base having an enclosing wall and containing equipment within said machine base that generates heat during normal operation of said patty-forming apparatus when electric power is provided to said patty-forming apparatus, the improvement comprising:
    an air inlet opening and an air outlet opening through said enclosing wall;
    an air fan arranged to move outside air from said air inlet opening to said air outlet to cool said equipment during normal operation of said patty-forming apparatus; and
    a first air damper arranged to close one of said air inlet opening or said air outlet opening, said first air damper configured to automatically close if electric power is interrupted to said patty-forming apparatus.

2. The improvement according to claim 1, wherein said first air damper is arranged to close said air inlet opening, and further comprising a second air damper arranged to close said air outlet opening, said second air damper configured to automatically close if power is interrupted to said patty-forming apparatus.

3. The improvement according to claim 2, wherein said inlet opening is located on a top side of said machine base, and said first damper comprises a cover and at least one inlet pneumatic cylinder that elevates said cover above said inlet opening when energized, allowing outside air to enter said inlet opening, and at least one inlet spring configured such that when said inlet pneumatic cylinder is de-energized, said inlet spring urges said cover onto said inlet opening to close said inlet opening.

4. The improvement according to claim 3, wherein said outlet opening is located on a bottom of said machine base, and said second damper comprises a plate over said outlet opening and an outlet pneumatic cylinder operatively connected to said plate to elevate said plate above said outlet opening to open said outlet opening when said outlet pneumatic cylinder is energized, and an outlet spring arranged to urge said plate onto said outlet opening to close said outlet opening when said outlet pneumatic cylinder is de-energized.

5. The improvement according to claim 1, wherein said inlet opening is located on a top side of said machine base, and said first damper comprises a cover and at least one inlet pneumatic cylinder that elevates said cover above said inlet opening when energized, allowing outside air to enter said inlet opening, and at least one inlet spring configured such that when said inlet pneumatic cylinder is de-energized, said inlet spring urges said cover onto said inlet opening to close said inlet opening.

6. The improvement according to claim 1, wherein said outlet opening is located on a bottom of said machine base, and said first damper comprises a plate over said outlet opening and an outlet pneumatic cylinder operatively connected to said plate to elevate said plate above said outlet opening to open said outlet opening when said outlet pneumatic cylinder is energized, and an outlet spring arranged to urge said plate onto said outlet opening to close said outlet opening when said outlet pneumatic cylinder is de-energized.

7. The improvement according to claim 1, wherein said air inlet opening is formed through an upper portion of said enclosing wall and said air outlet is formed through a lower portion of said enclosing wall.

8. The improvement according to claim 1, wherein said first damper comprises a cover that is pneumatically powered to lift away from said air inlet opening to open said air inlet opening.

9. The improvement according to claim 1, wherein said second damper comprises a cover that is pneumatically powered to lift away from said air outlet opening to open said air outlet opening.

10. The improvement according to claim 1, wherein said first air damper is arranged to close said air inlet opening and further comprising a second air damper arranged to close said air outlet opening, said first air damper arranged outside of said enclosing wall and said second air damper arranged within said enclosing wall.

11. In a food processing apparatus having a machine base having an enclosing wall and containing equipment within said machine base that generates heat during normal operation of said food processing apparatus and electric power is applied to said food processing apparatus, the improvement comprising:
an air inlet opening and an air outlet opening through said enclosing wall;
an air fan arranged to move outside air from said air inlet opening to said air outlet to cool said equipment during normal operation of said food processing apparatus; and
a first air damper arranged to close one of said air inlet opening or said air outlet opening, said first air damper configured to automatically close if electric power is interrupted to said food processing apparatus.

12. The improvement according to claim 11, wherein said first air damper is arranged to close said air inlet opening, and further comprising a second air damper arranged to close said air outlet opening, said second air damper configured to automatically close if power is interrupted to said food processing apparatus.

13. The improvement according to claim 12, wherein said inlet opening is located on a top side of said machine base, and said first damper comprises a cover and at least one inlet pneumatic cylinder that elevates said cover above said inlet opening when energized, allowing outside air to enter said inlet opening, and at least one inlet spring configured such that when said inlet pneumatic cylinder is de-energized, said inlet spring urges said cover onto said inlet opening to close said inlet opening.

14. The improvement according to claim 13, wherein said outlet opening is located on a bottom of said machine base, and said second damper comprises a plate over said outlet opening and an outlet pneumatic cylinder operatively connected to said plate to elevate said plate above said outlet opening to open said outlet opening when said outlet pneumatic cylinder is energized, and an outlet spring arranged to urge said plate onto said outlet opening to close said outlet opening when said outlet pneumatic cylinder is de-energized.

15. The improvement according to claim 11, wherein said inlet opening is located on a top side of said machine base, and said first damper comprises a cover and at least one inlet pneumatic cylinder that elevates said cover above said inlet opening when energized, allowing outside air to enter said inlet opening, and at least one inlet spring configured such that when said inlet pneumatic cylinder is de-energized, said inlet spring urges said cover onto said inlet opening to close said inlet opening.

16. The improvement according to claim 11, wherein said outlet opening is located on a bottom of said machine base, and said first damper comprises a plate over said outlet opening and an outlet pneumatic cylinder operatively connected to said plate to elevate said plate above said outlet opening to open said outlet opening when said outlet pneumatic cylinder is energized, and an outlet spring arranged to urge said plate onto said outlet opening to close said outlet opening when said outlet pneumatic cylinder is de-energized.

17. The improvement according to claim 11, wherein said air inlet opening is formed through an upper portion of said enclosing wall and said air outlet is formed through a lower portion of said enclosing wall.

18. The improvement according to claim 11, wherein said first damper comprises a cover that is pneumatically powered to lift away from said air inlet opening to open said air inlet opening.

19. The improvement according to claim 11, wherein said second damper comprises a cover that is pneumatically powered to lift away from said air outlet opening to open said air outlet opening.

20. The improvement according to claim 11, wherein said first air damper is arranged to close said air inlet opening and further comprising a second air damper arranged to close said air outlet opening, said first air damper arranged outside of said enclosing wall and said second air damper arranged within said enclosing wall.

21. In a food processing apparatus having a machine base having an enclosing wall and containing equipment within said machine base that generates heat during normal operation of said food processing apparatus and electric power is applied to said food processing apparatus, the improvement comprising:

an air inlet opening and an air outlet opening through said enclosing wall;

an air fan arranged to move outside air from said air inlet opening to said air outlet to cool said equipment during normal operation of said food processing apparatus; and wherein said air inlet opening is located through an upper portion of said enclosing wall and said outlet opening is located through a lower portion of said enclosing wall, said inlet opening at a higher elevation than said outlet opening.

22. The improvement according to claim 21, further comprising:

a first air damper arranged to close one of said air inlet opening or said air outlet opening, said first air damper configured to automatically close if electric power is interrupted to said food processing apparatus.

23. The improvement according to claim 21, wherein said air fan is located adjacent to said air inlet opening.

24. The improvement according to claim 23, further comprising a first damper arranged to close said air inlet opening, said first air damper configured to automatically close if electric power is interrupted to said food processing apparatus, wherein said first damper comprises a cover and at least one inlet pneumatic cylinder that elevates said cover above said inlet opening when energized, allowing outside air to enter said inlet opening, and at least one inlet spring configured such that when said inlet pneumatic cylinder is de-energized, said inlet spring urges said cover onto said inlet opening to close said inlet opening.

25. The improvement according to claim 24, comprising a second damper that comprises a plate over said outlet opening and an outlet pneumatic cylinder operatively connected to said plate to elevate said plate above said outlet opening to open said outlet opening when said outlet pneumatic cylinder is energized, and an outlet spring arranged to urge said plate onto said outlet opening to close said outlet opening when said outlet pneumatic cylinder is de-energized.

26. The improvement according to claim 21, comprising a damper that comprises a plate over said outlet opening and an outlet pneumatic cylinder operatively connected to said plate to elevate said plate above said outlet opening to open said outlet opening when said outlet pneumatic cylinder is energized, and an outlet spring arranged to urge said plate onto said outlet opening to close said outlet opening when said outlet pneumatic cylinder is de-energized.

* * * * *